(12) United States Patent
Ediger et al.

(10) Patent No.: US 9,966,746 B1
(45) Date of Patent: May 8, 2018

(54) ADJUSTABLE ELECTRIC BOX AND BRACKET COMBINATION

(71) Applicant: Cantex, Inc., Fort Worth, TX (US)

(72) Inventors: Steve D. Ediger, Fort Worth, TX (US); Paul R. Metcalfe, Solon, OH (US); Weston Skye, University Heights, OH (US); Scott E. Urban, University Heights, OH (US)

(73) Assignee: Cantex, Inc., Fort Worth, TX (US)

( * ) Notice: Subject to any disclaimer, the term of this patent is extended or adjusted under 35 U.S.C. 154(b) by 0 days. days.

(21) Appl. No.: 15/438,539

(22) Filed: Feb. 21, 2017

(51) Int. Cl.
  *H02G 3/12* (2006.01)
  *H02G 3/08* (2006.01)
(52) U.S. Cl.
  CPC ............. *H02G 3/126* (2013.01); *H02G 3/081* (2013.01)
(58) Field of Classification Search
  CPC ............................... H02G 3/126; H02G 3/081
  USPC .............................................................. 174/50
  See application file for complete search history.

(56) References Cited

U.S. PATENT DOCUMENTS

| | | | |
|---|---|---|---|
| 5,289,934 A | 3/1994 | Smith | |
| 5,480,053 A * | 1/1996 | Jorgensen | H02G 3/081 220/3.9 |
| 6,956,172 B2 | 10/2005 | Dinh | |
| 7,214,876 B1 * | 5/2007 | Haberek | H02G 3/126 174/135 |
| 7,628,286 B2 | 12/2009 | Lalancette | |
| 9,397,491 B2 | 7/2016 | Birli | |

\* cited by examiner

*Primary Examiner* — Dhirubhai R Patel
(74) *Attorney, Agent, or Firm* — Miles & Stockbridge P.C.; David R. Schaffer

(57) ABSTRACT

Electric boxes and hanging brackets and more particularly adjustable electric boxes with parallel rails for connection with reciprocal parallel grooves in a hanging bracket that is configured to connect to a support, for example, a wall stud.

39 Claims, 58 Drawing Sheets

ADJUSTABLE ELECTRIC BOX AND BRACKET COMBINATION

TECHNICAL AREA

Electric boxes and hanging brackets and more particularly adjustable electric boxes with parallel rails for connection with reciprocal parallel grooves in a hanging bracket that is configured to connect to a support, for example, a wall stud.

SUMMARY

Twenty years ago, the US Occupational Safety and Health Administration (OSHA) issued its Process Safety Management (PSM) of Highly Hazardous Chemicals standard. The objective was to spell out the requirements for preventing or minimizing the consequences of catastrophic releases of toxic, reactive, flammable, or explosive chemicals that could result in toxic, fire, or explosion hazards.

Recent analysis of abnormal events in the process industry by both the AIChE—Center for Chemical Safety and the US Chemical Safety Board indicates that, though major progress has been made, the improvement trajectory seems to have plateaued. Most companies affected by the regulation have deployed a combination of solutions involving human behavior management, equipment safety systems, and more extensive operating procedures as depicted in FIG. 1.

Not only have improvements in avoiding abnormal events tapered off, a deeper investigation reveals that the severity of these less-frequent incidents is climbing at a disturbing and surprising rate from the perspective of injury, illness, environmental exposure, and property damage (FIG. 2).

This raises the questions: "What is different?" and "Have the failure mechanisms that initiate abnormal events changed?"

The most recent investments in technology, training, and enforcement have not succeeded in eliminating the root causes of these complex events.

BRIEF DESCRIPTION OF THE DRAWINGS

Non-limiting and non-exhaustive embodiments of the present invention are described with reference to the following figures, wherein like reference numerals and/or indicia refer to like parts throughout the various views unless otherwise precisely specified.

DETAILED DESCRIPTION

In general, one or more embodiments of the disclosed subject matter include (i.e., comprise) an adjustable electrical box and hanger bracket assembly where both the electrical box and the hanger bracket are made from plastic, for example, but not limited to, a recycled polycarbonate, which can be an unfilled polycarbonate or a glass-filled polycarbonate. Benefits of the new design include lower weight and costs, added electrical insulation and non-rusting due to not using metal for the hanger bracket.

The one or more embodiments of the an apparatus including (i.e., comprising) an electrical box being substantially rectangular and enclosed on five of six sides by contiguous wall portions and open on one of the six sides, the electrical box including a plurality of ribs formed on at least one of the five wall portions and a plurality of channels formed on a contiguous three of the five of six side wall portions; and a bracket having a substantially "U"-shape and including a body and top and bottom arms extending away from an inside of the body, a plurality of the channels and ribs on interior surfaces of the bracket body and top and bottom arms, the plurality of the bracket channels and ribs being configured to slidingly connect with the electrical box plurality of ribs and plurality of channels and enable adjustment of the position of the electrical box relative to the bracket, and a flange extending substantially perpendicularly away from one side of a back side of the bracket, the flange including at least one opening formed there through.

Figure 1:
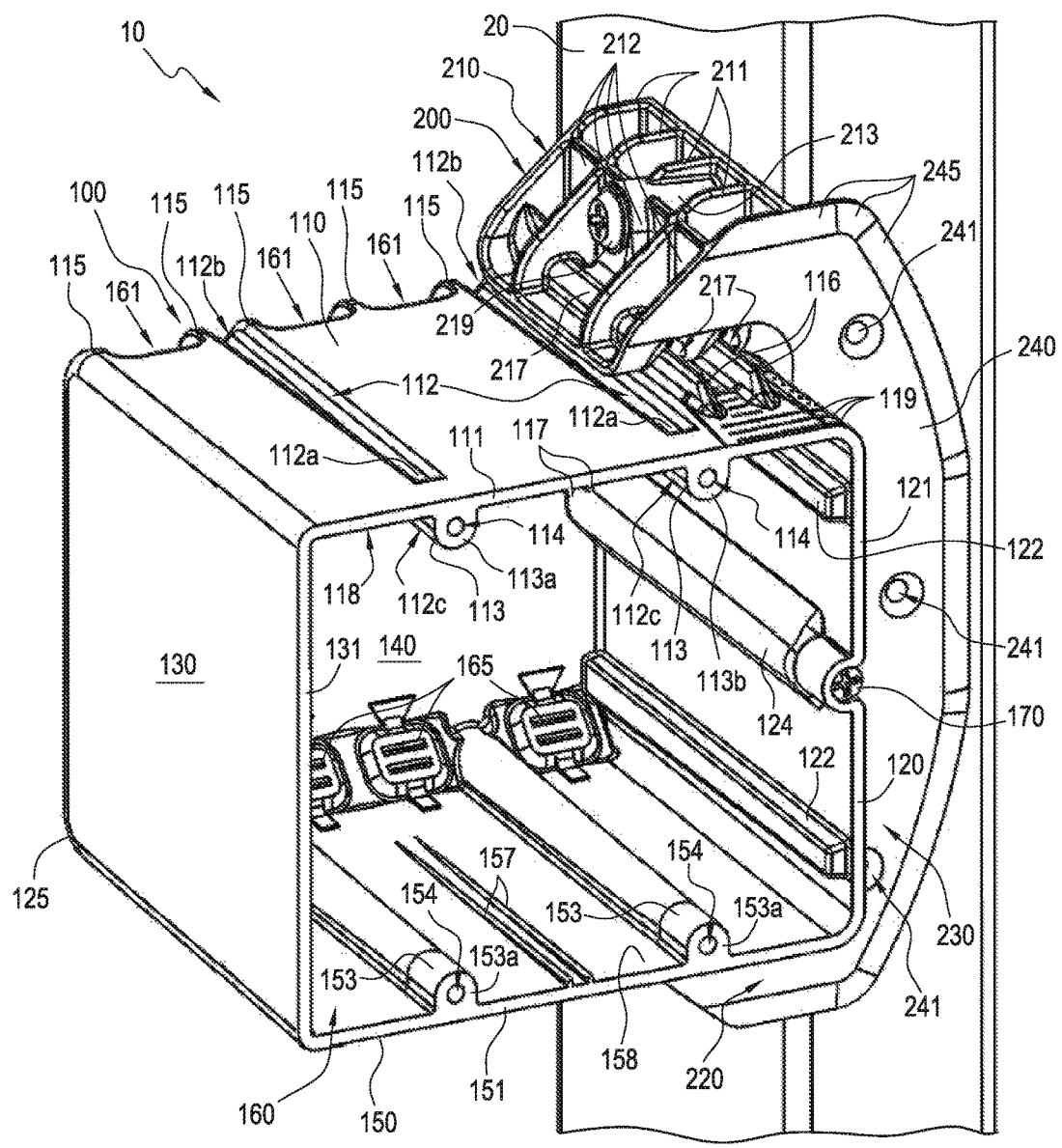
FIG. 1 is a top, front left perspective view of an electrical box and bracket apparatus shown attached to a support member, in accordance with an embodiment of the disclosed subject matter.

FIG. 1 is a top, front left perspective view of an electrical box and bracket apparatus 10 shown attached to a support member, in accordance with an embodiment of the disclosed subject matter. In FIG. 1, the electrical box and bracket apparatus 10 includes an electrical box ° connected to a substantially "U"-shaped bracket 200 that is shown fastened to a left side of a support member 20, for example, a wood or metal wall stud 20. The apparatus is vertically symmetric, so to attach the assembly 10 to a right side of the support member 20, the entire assembly is simply flipped over so the top wall becomes the bottom wall and the bottom wall becomes the top wall and the flange remains on the wall board side of the support member 20. The electrical box 100 includes a top wall 110 connected along a first edge to top edge of a first sidewall 120 and along a second edge to a top edge of a second sidewall 130. The top wall 110 connects along a back edge via a rounded top corner 115 to a top edge of a back wall 140 and a flat front edge 111 of the top wall 110 defines a first side of an opening 160 into the electrical box 100. The first sidewall 120 is further connected along a back edge to a first side edge of the back wall 140 and along a bottom edge to a first side edge of a bottom wall 150 and a flat front edge 121 of the first sidewall 120 defines a second side of the opening 160 into the electrical box 100. The bottom wall 150 connects along a second side edge to a bottom edge of the second sidewall 130 and connects along a back edge via a rounded top corner 125 to the bottom edge of the back wall 140 and a flat front edge 151 of the bottom wall 150 defines a third part of the opening 160 into the electrical box 100. The second sidewall 130 connects along a back edge to a second side edge of the back wall 140 and a flat front edge 131 of the second sidewall 130 defines a last side of the opening 160 into the electrical box 100.

In FIG. 1, a pair of substantially parallel grooves 112 are formed in the top wall 110 and protrude into the inside of the electrical box 100 and the grooves 112 extend from a front end 112a that is adjacent the top wall flat front edge 111 to a back end 112b that opens out through the curved corner edge between the top wall 110 and the back wall 140. Each protrusion 112c formed inside the electrical box 100 by the groove 112 extends from a solid front end portion 113 with a flat front face 113a that is contiguous with the top wall front face 111 back toward the back wall and connects with an inside of the rounded top corner 115 between the back of the top wall 110 and the top of the back wall 140. A channel 114 is formed in and through each protrusion solid front end portion 113 and into the grooves 112a, 112b and the channel 114 is configured and adapted to receive and engage fasteners from plugs, switches and the like. Each of the substantially parallel grooves 112 taper from a narrower front end 112a to a wider open back end 112b at the rounded top corner 115. A pair of raised ribs or rails 116 are formed on the top wall 110 between the first edge of the top wall 110 and the groove 112 on that side of the top wall 110. The front ends of the pair of raised ribs or rails 116 start at about the front end 112a of the groove 112 and extend backward toward and end before the back edge of the top wall, although not clearly seen in FIG. 1 due to the position of the bracket 200. Additional details on the pair of raised ribs or rails 116 is provided herein below beginning with the description of FIG. 9.

Figure 5:
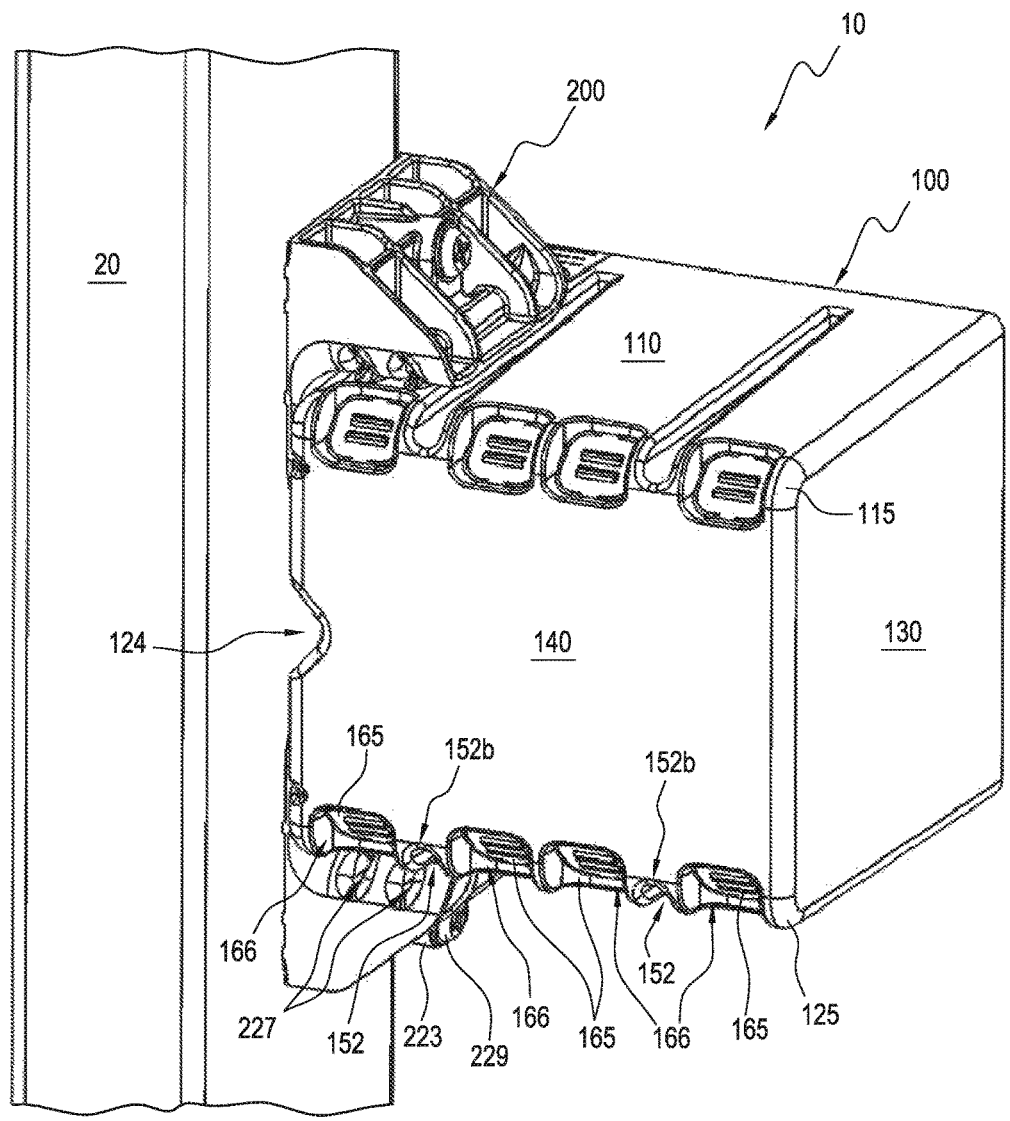
FIG. 5 is a top, rear left perspective view of the electrical box and bracket apparatus shown attached to a support member of FIG. 1, in accordance with an embodiment of the disclosed subject matter.

In FIGS. 1 and 5, although only visible from their back sides on the bottom wall 150 a bottom pair of substantially parallel grooves 152 are formed in the bottom wall 150 and protrude into the inside of the electrical box 100 and the grooves 152 extend from a front end 152a that is adjacent the bottom wall flat front edge 151 to a back end 152b that opens out through the curved corner edge between the bottom wall 150 and the back wall 140. Each protrusion 152c formed inside the electrical box 100 by the groove 152 extends from a solid front end portion 153 with a flat front face 153a that is contiguous with the bottom wall front face 151 back toward the back wall and connects with an inside of the rounded bottom corner 125 between the back of the bottom wall 150 and the bottom of the back wall 140. A channel 154 is formed in and through each protrusion solid front end portion 153 and into the grooves 152a, 152b and the channel 154 is configured and adapted to receive and engage fasteners from plugs, switches and the like. Each of the substantially parallel grooves 152 taper from a narrower front end 152a to a wider open back end 152b at the rounded bottom corner 155. A pair of raised ribs or rails 156 are formed on the bottom wall 150 between the first edge of the bottom wall 150 and the groove 152 on that side of the bottom wall 150. The front ends of the pair of raised ribs or rails 156 start at about the front end 152a of the groove 152 and extend backward toward and end before the back edge of the bottom wall 150, although not clearly seen in FIG. 1 due to the position of the bracket 200. Additional details on the pair of raised ribs or rails 156 is provided herein below beginning with the description of FIG. 9.

Figure 3:
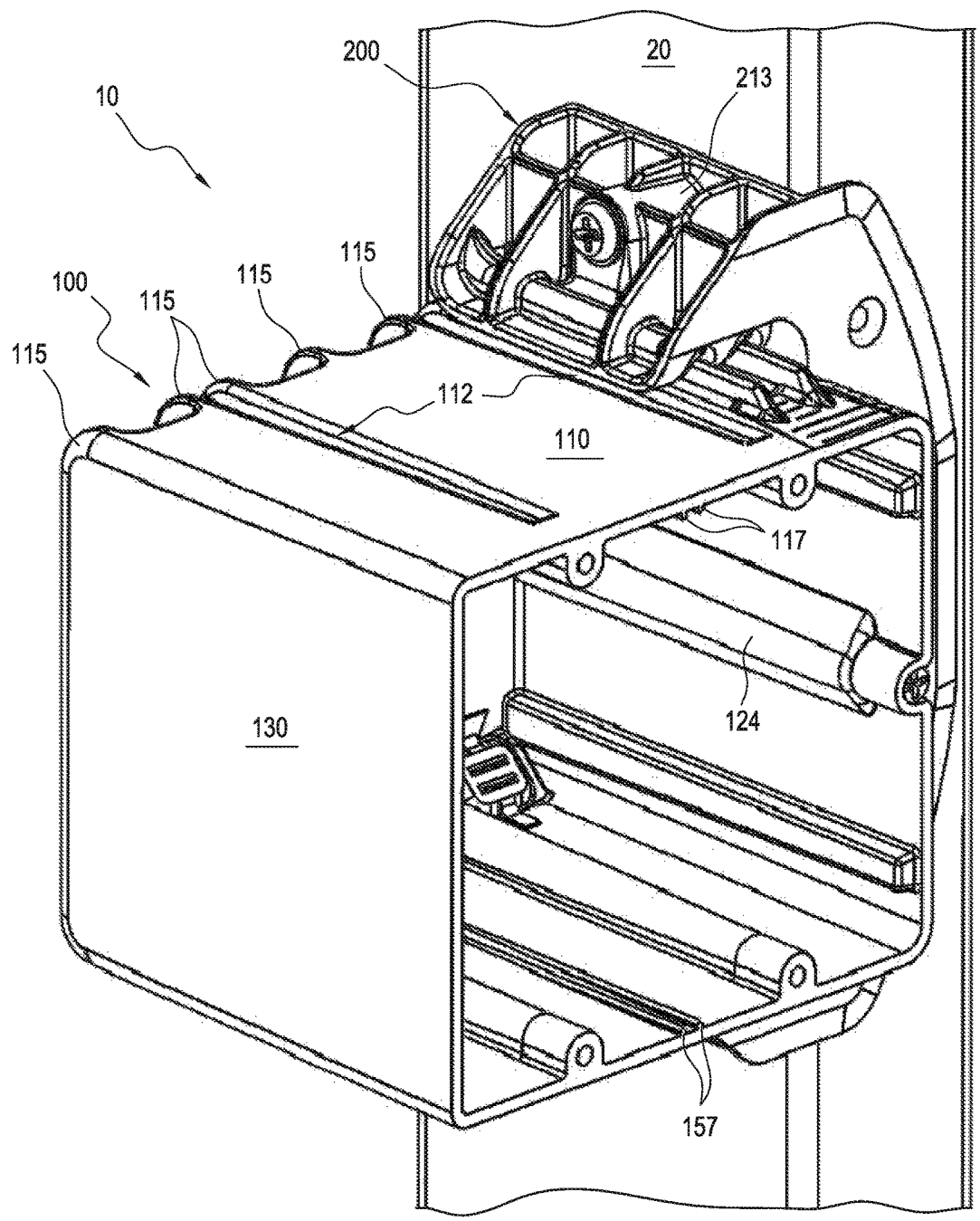
FIG. 3 is a left, top front perspective view of the electrical box and bracket apparatus shown attached to a support member of FIG. 1, in accordance with an embodiment of the disclosed subject matter.

In FIGS. 1 and 3, multiple, evenly spaced, shallow grooves or depth marks 119 are formed in the top wall 110 adjacent a front end of and substantially perpendicular to the pair of raised ribs or rails 116. These depth marks line up with the front face of the flange portion 240 of the bracket 200 to indicate adjustment depth. Each depth mark 119 extends from an inside one of the pair of raised ribs or rails 116 and extends to and around the edge between the top wall 110 and the first sidewall 120 and extends down the entire length of the first sidewall 120 to and around the edge between the first sidewall 120 and the bottom wall 150 adjacent to a front end of and substantially perpendicular to a bottom pair of raised ribs or rails formed on the bottom wall 150 (best shown in FIG. 13). In the embodiment in FIG. 1, the depth marks 119 are spaced at about ⅛ inches apart and permit adjustment of the electrical box from about ⅛ inches up to about 1¾ inches. The pair of raised ribs or rails on the bottom wall are formed as mirror images of the pair of raised ribs or rails 116 on the top wall.

Figure 2:
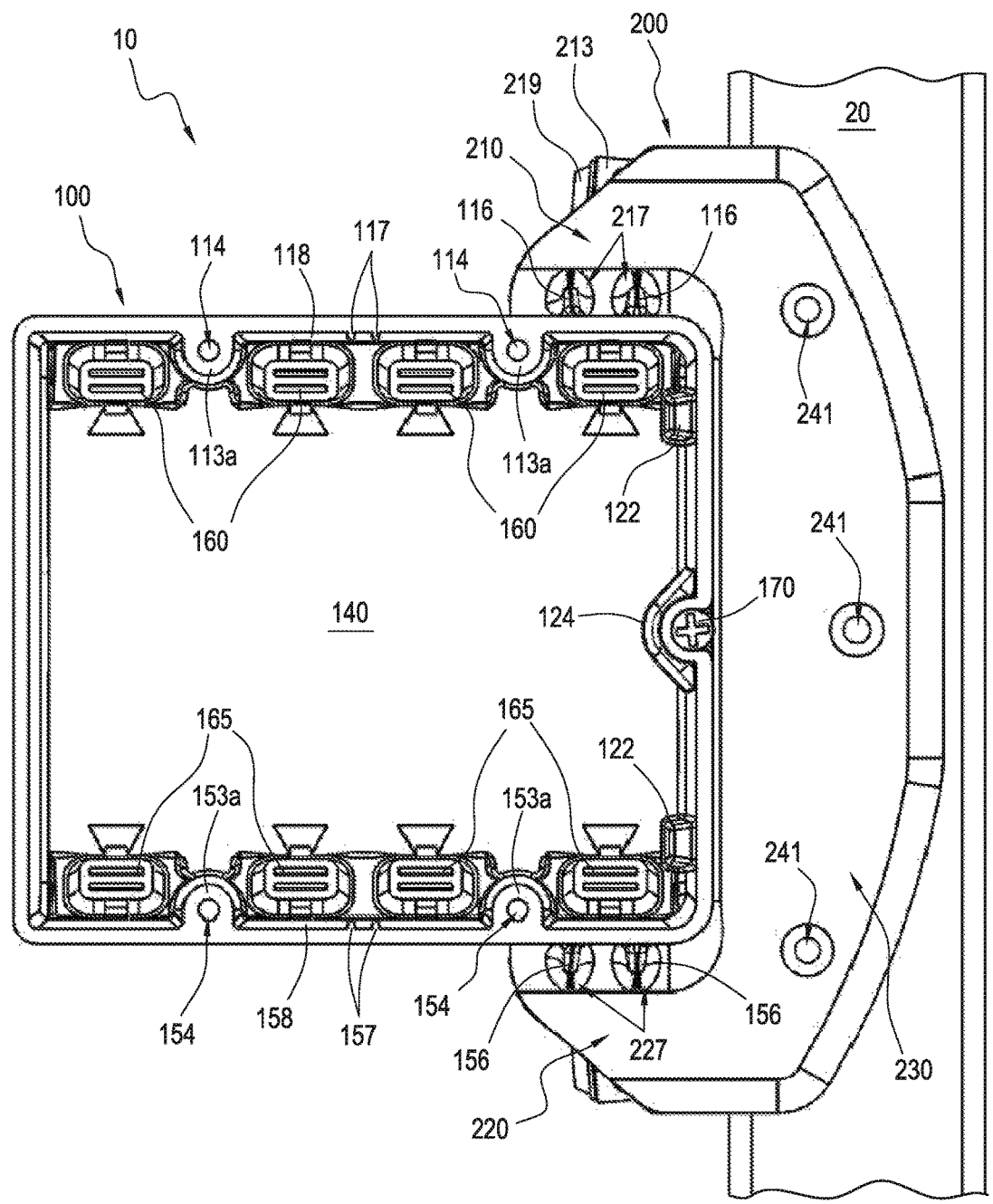
FIG. 2 is a front view of the electrical box and bracket apparatus shown attached to a support member of FIG. 1, in accordance with an embodiment of the disclosed subject matter.

In FIGS. 1, 2 and 3, an opposite pair of raised ribs 117, 157 extend from an inside surface 118 (best seen in FIG. 2) of the top wall 110 and an inside surface 158 of the bottom wall 157, respectively, and are configured and adapted to cooperatively receive and hold an optional, removable divider wall (not shown). Four top knockout openings 161 are formed in the rounded top corner 115, although only three are visible in FIG. 1, because the fourth is obscured by the bracket 200. Four removable top knockout tabs 160 (best seen in FIG. 2) are formed in the top knockout openings 161. Similarly, four bottom knockouts 165 and bottom knockout openings 166 are formed across the rounded bottom corner 125, although only three are visible in FIG. 1, because the fourth is obscured by the second sidewall 130.

In FIG. 1, in the first sidewall 120 the inside surfaces of a pair of substantially parallel grooves 122 are shown formed in the first sidewall 120 and extend backward from just adjacent the flat front edge 121 of the first sidewall 120 to and through the corner connection between the back wall 140 and the first sidewall 120. In between the pair of substantially parallel grooves 122 a central groove 124 is also formed in the first sidewall 120 and extends backward from the flat front edge 121 of the first sidewall 120 to and through the corner connection between the back wall 140 and the first sidewall 120. The central groove is configured and adapted to receive an adjustment screw 170 with the head of the screw 170 being shown positioned in the central groove 124 and adjacent the flat front edge 121 of the first sidewall 120.

In FIG. 1, the bracket 200 includes a top arm 210 connected at a substantially perpendicular angle to a body 230 that extends toward and connects to a bottom arm 220 at a substantially perpendicular angle to the body 230 so that the top arm 210 and the bottom arm 220 are substantially parallel to each other and the bracket has a substantially "U"-shape. The top arm 210 includes a plurality of gussets 211 that extend and taper down from the top arm 210 and body 230 connections to a front end of top arm 210. In some of the various embodiments, the gussets 211 can have a thickness of, for example, but not limited to, between about 70/1000 to about 86/1000 inches. A top positioning portion 213 is located in a center of the first arm 210 and between pairs of the gussets 211. A plurality of cross gussets 212 connect at substantially perpendicular angles to and between the gussets 211 and the top positioning portion 213 to provide additional stability and support. A large flange head fastener 219, for example, but not limited to, a pan head screw, is positioned through the positioning portion 213 and into the support member 20 to hold the assembly 10 in position and reduce stress on the positioning portion 213. Although not seen, a second large flange head fastener 219 is positioned through a substantially identical positioning portion on the lower arm 220 and into the support member 20 to hold the assembly 10 in position at the bottom. The flange side openings of a pair of grooves 217 are formed in and extend across the width of an inside surface of the top arm 210 to and out substantially identical back side openings of the pair of grooves 217 (not shown) and are configured and adapted to slidingly engage the pair of raised ribs or rails 116 on the top wall 110.

In FIG. 1, the bracket 200 includes a flange portion 240 on the side of the bracket adjacent to the front opening 160 of the electrical box and extending substantially perpendicularly away from a back side of the body portion 230 of the bracket, which forms a substantially right angle inside corner to be positioned against a substantially right angle outside corner of the support member 20. The flange 240 has a minimal thickness and a slightly inwardly tapering outer edge 245 and includes multiple fastener openings 241 formed through it to permit the bracket 200, either with or without the electrical box 100 being attached to it, to be initially positioned against the support member 20 using one or more fasteners. The tapering outer edge 245 helps form a more even or smooth positioning of the wallboard when it is placed over the flange 240. For example, but not limited to, in the embodiment in FIG. 1, the flange 240 can have a thickness of about 78/1000 inches. The fastener openings 241 are counter-sunk to enable a fastener head to recess to about the same level as a front of the flange to minimize the thickness offset behind the wallboard, for example, but not limited to, drywall.

FIG. 2 is a front view of the electrical box and bracket apparatus shown attached to a support member of FIG. 1, in accordance with an embodiment of the disclosed subject matter. In FIG. 2, the four top knockout tabs 160 and the top knockout openings 161 and the four bottom knockout tabs 165 and the bottom knockout openings 166 are shown and include substantially rounded corners with approximately 0.15 inch radii. Ends of the bottom raised ribs or rails 156 on the bottom wall 150 are seen positioned inside a bottom pair of grooves 227 formed in and extending across the width of an inside surface of the bottom arm 220 to and out substantially identical back side openings of the pair of grooves 227 (not shown) and are configured and adapted to slidingly engage the bottom pair of raised ribs or rails 156.

FIG. 3 is a left, top front perspective view of the electrical box and bracket apparatus shown attached to a support member of FIG. 1, in accordance with an embodiment of the disclosed subject matter. In FIG. 3, the positioning portion 213 has a substantially cylindrical body extending at a slight downward angle from about the middle of the top arm 210 to and connecting to the back side the wall of the bracket body 230. This is best seen and described below in and in relation to FIGS. 9 and 10.

Figure 4:
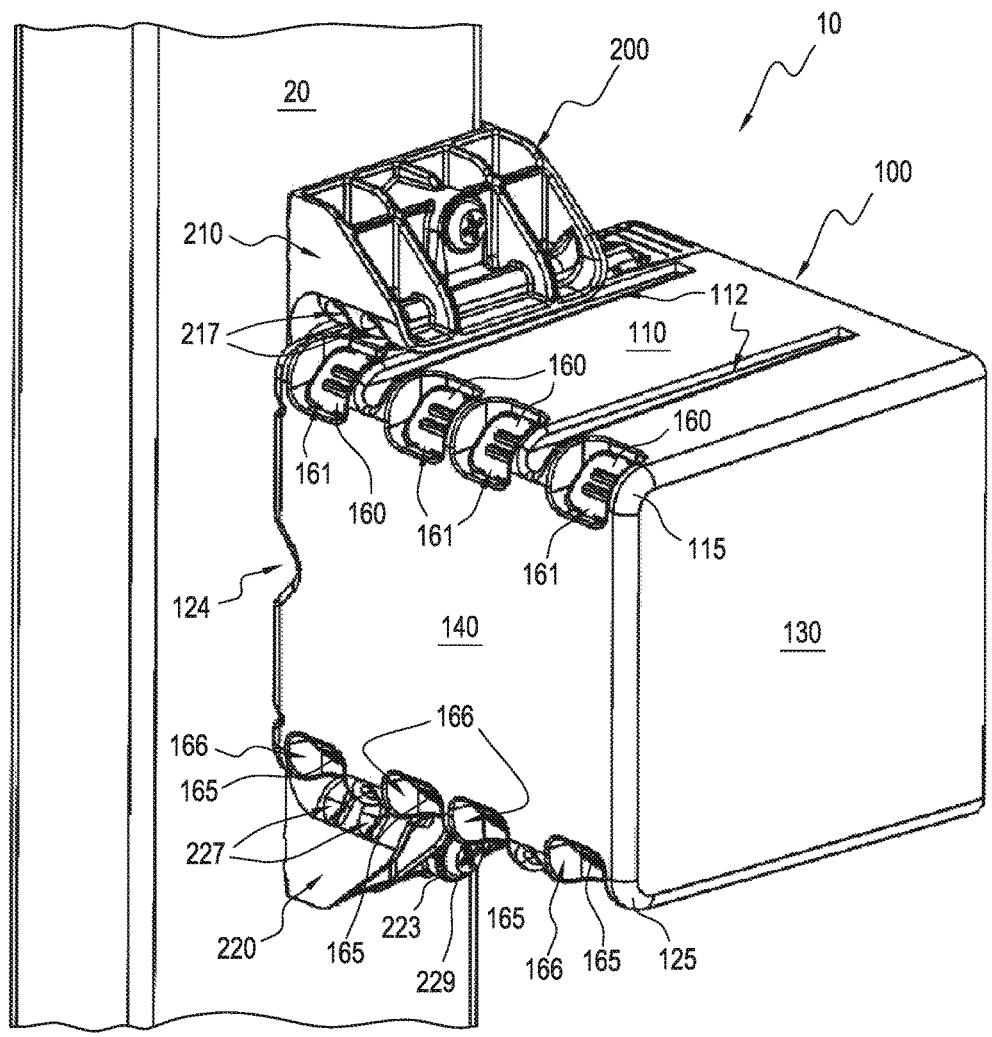
FIG. 4 is a top, left rear perspective view of the electrical box and bracket apparatus shown attached to a support member of FIG. 1, in accordance with an embodiment of the disclosed subject matter.

FIG. 4 is a top, left rear perspective view of the electrical box and bracket apparatus shown attached to a support member of FIG. 1, in accordance with an embodiment of the disclosed subject matter. In FIG. 4, the back side of the back wall 150 includes the open back end of central groove 124 formed in the corner between the back wall 140 and the first side wall 120. In addition, the back sided of the top knockout tabs 161 and the bottom knockout tabs 165 are shown formed in the rounded corner 115 between the top wall 110 and the back wall 140 and the rounded corner 125 between the back wall 140 and the bottom wall 150. A partial view of the bottom arm 220 of the bracket, including a bottom positioning portion 223, a second large flange head fastener 229, for example, but not limited to, a pan head screw, and the back side openings of the pair of grooves 227.

FIG. 5 is a top, rear left perspective view of the electrical box and bracket apparatus shown attached to a support member of FIG. 1, in accordance with an embodiment of the disclosed subject matter. In FIG. 5, the bottom knockout tabs 165 and the bottom knockout openings 166 are more clearly shown formed in the rounded corner 125 between the back wall 140 and the bottom wall 150. In addition, a clearer view of the back side openings of the pair of grooves 227 in the bottom arm 220 are shown.

Figure 6:
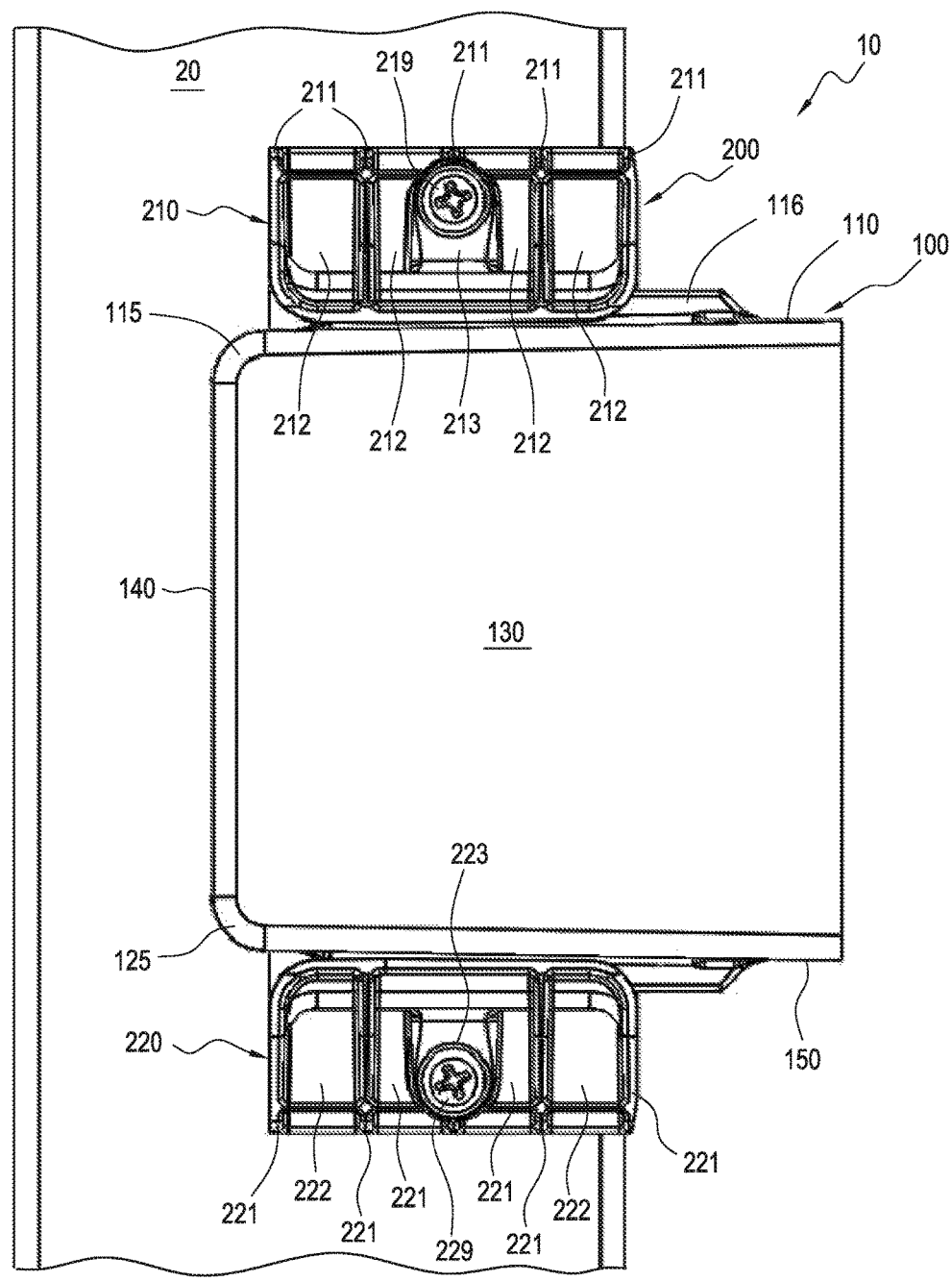
FIG. 6 is a left side view of the electrical box and bracket apparatus shown attached to a support member of FIG. 1, in accordance with an embodiment of the disclosed subject matter.

FIG. 6 is a left side view of the electrical box and bracket apparatus shown attached to a support member of FIG. 1, in accordance with an embodiment of the disclosed subject matter. In FIG. 6, front views of the top arm 210 and the bottom arm 220 of the bracket 200, which is fastened to the support member 20 by fasteners 219 and 229, are shown positioned above and below the electrical box 100. Both the top wall 110 and the bottom wall 150 can, but do not need to in all embodiments, extend from the back wall 140 at interior angles equal to or greater than 90 degrees. For example, in some embodiments, the top wall 110 can extend upwardly and away from the back wall 140 at an angle of up to about 2 to 3 degrees above 90 degrees and the bottom wall 150 can extend downwardly and away from the back wall 140 at an angle of up to about 2 to 3 degrees above 90 degrees. As a result, sidewalls 110, 130 can be larger at the flat front faces 111, 131 than at their respective back edges adjacent the back wall 140. In addition, due to the size of the positioning portion 213, the length of the cross gussets 212 between the two interior gussets 211 and the positioning portion 213 are shorter than the length of the cross gussets 212 between the two interior gussets 211 and the two outer gussets 211. The same is true for the bottom arm 220; due to the size of the positioning portion 223, the length of two cross gussets 222 between two interior gussets 221 and the positioning portion 223 are shorter than the length of two cross gussets 222 between the two interior gussets 221 and two outer gussets 221.

Alternatively, in other embodiments of the electric box 100 in FIG. 1, as well as the other embodiments of the electric box(es) shown and described herein, the top wall 110 can extend away from the back wall 140 at an angle of 90 degrees and the bottom wall 150 can extend away from the back wall 140 at an angle of 90 degrees. As a result, sidewalls 110, 130 are substantially the same size at the flat front faces 111, 131 as at their respective back edges adjacent the back wall 140. In addition, the length of the cross gussets 212 between the two interior gussets 211 and the positioning portion 213 are substantially equal to the length of the cross gussets 212 between the two interior gussets 211 and the two outer gussets 211. The same is true for the bottom arm 220; the length of two cross gussets 222 between two interior gussets 221 and the positioning portion 223 are substantially equal to the length of two cross gussets 222 between the two interior gussets 221 and two outer gussets 221.

Figure 7:
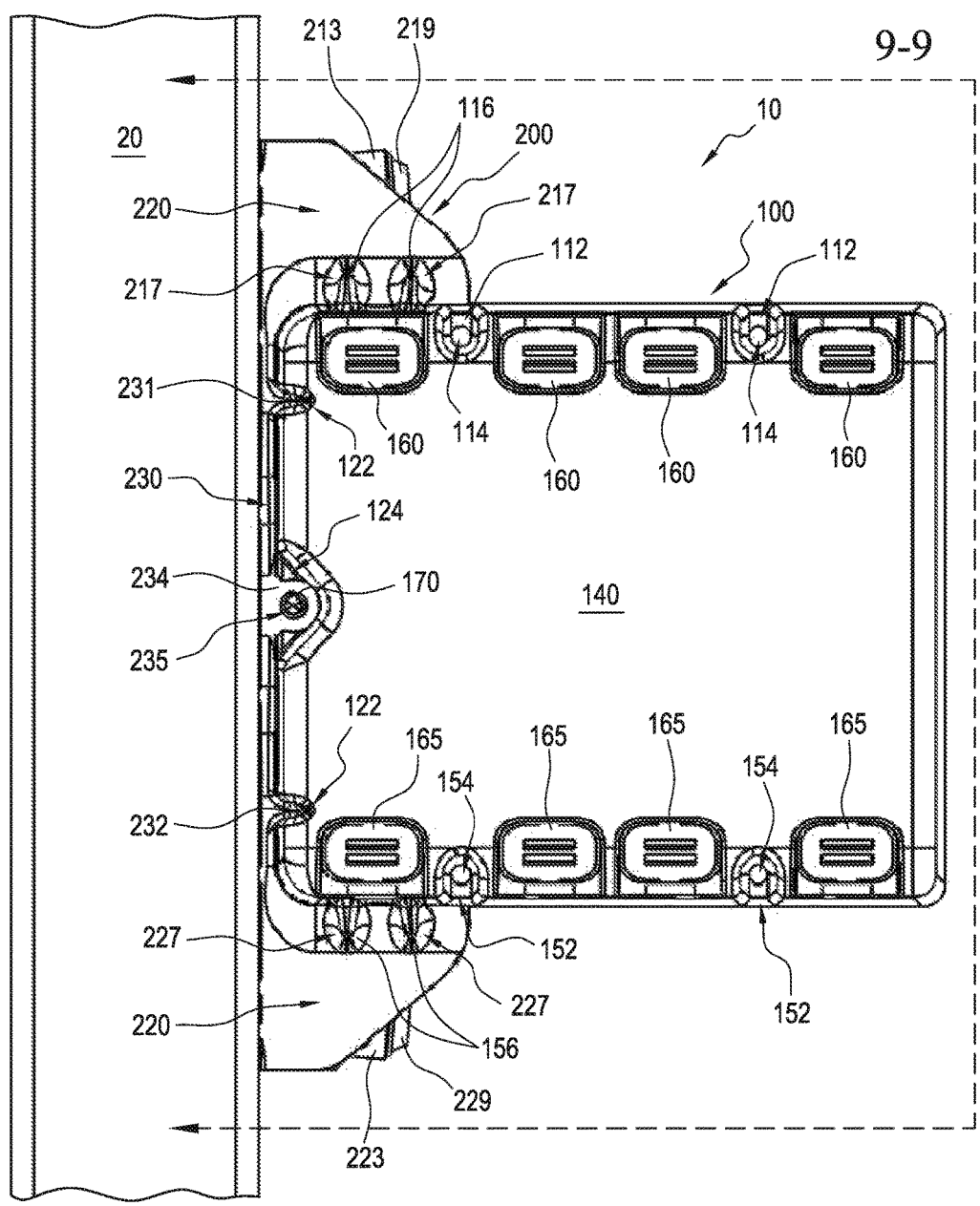
FIG. 7 is a rear view of the electrical box and bracket apparatus shown attached to a support member of FIG. 1, in accordance with an embodiment of the disclosed subject matter.

FIG. 7 is a rear view of the electrical box and bracket apparatus shown attached to a support member of FIG. 1, in accordance with an embodiment of the disclosed subject matter. In FIG. 7, the body 230 of the bracket 200 includes a top raised rail or rib 231 and a bottom raised rail or rib 232 that are positioned and configured to slidingly engage with the upper and lower first sidewall grooves 122, respectively. A raised cylindrical portion 234 extends out from about the middle of the inside wall of the body 230 of the bracket positioned and configured to slidingly engage with the central groove 124 in the first sidewall 110. A channel 235 is formed in and extending through the raised cylindrical portion 234 and the channel 235 is configured and adapted to adjustably receive the adjustment screw 170.

Figure 8:
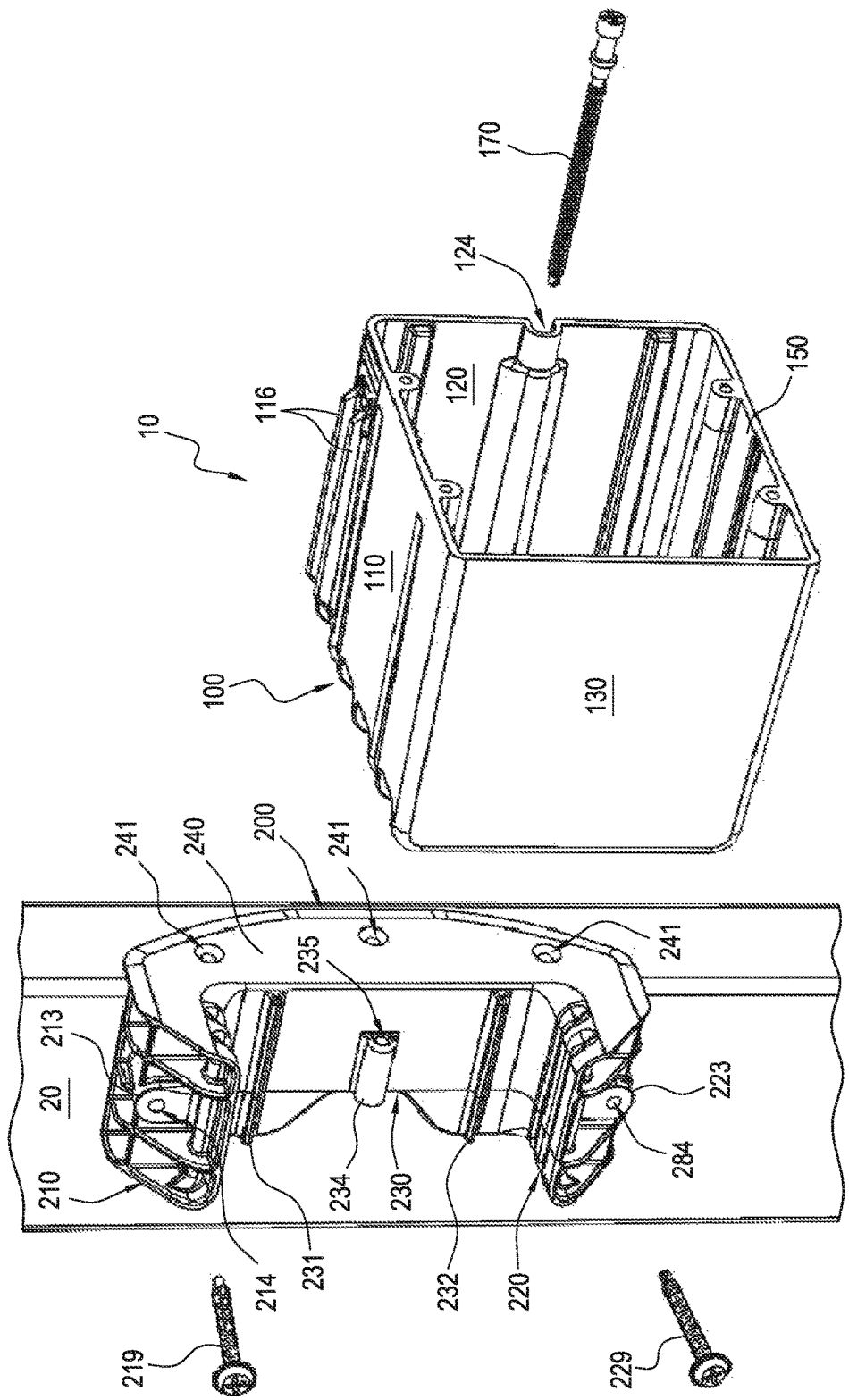
FIG. 8 is an exploded top, left perspective view of the electrical box and bracket apparatus shown adjacent to a support member of FIG. 1, in accordance with an embodiment of the disclosed subject matter.

FIG. 8 is an exploded top, left perspective view of the electrical box and bracket apparatus 10 shown adjacent to the support member 20 of FIG. 1, in accordance with an embodiment of the disclosed subject matter. In FIG. 8, the raised cylindrical portion 234 extends from a back edge of and across the inside surface of the body portion 230 to about a middle of the body portion 230. A top channel 214 is formed in and extends through top positioning portion 213 and a bottom channel 224 is formed in and extends through top positioning portion 223.

Figure 9:
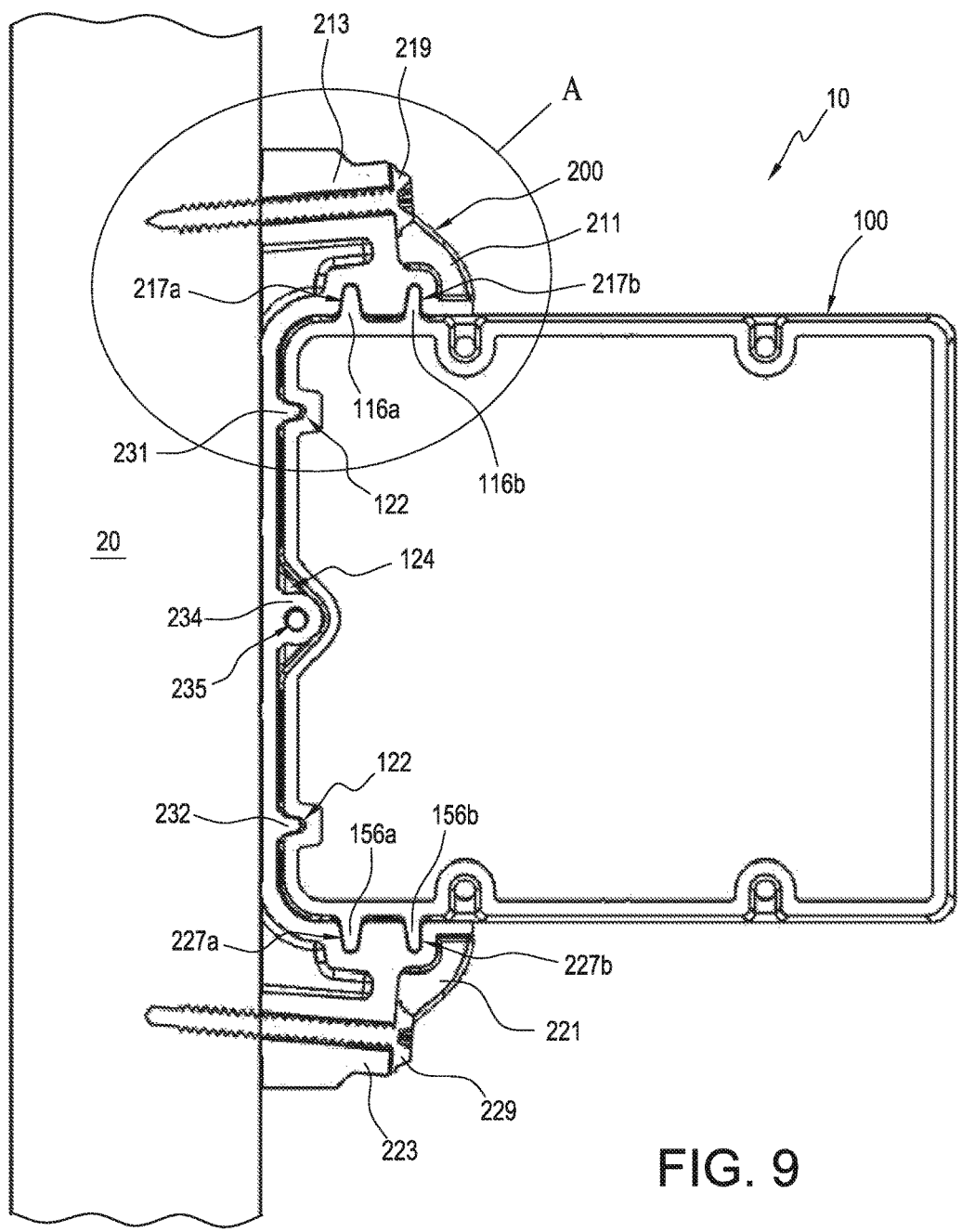
FIG. 9 is a cross-sectional back view along line 9-9 of electrical box and bracket apparatus shown attached to a support member of FIG. 7, in accordance with an embodiment of the disclosed subject matter.

FIG. 9 is a cross-sectional back view along line 9-9 of electrical box and bracket apparatus shown attached to a support member of FIG. 7, in accordance with an embodiment of the disclosed subject matter. In FIG. 9, the secure fit between the bracket 200 and the electrical box 100 is clearly seen. Outer top wall raised rib or rail 116a and outer bottom wall raised rib or rail 156a each extend substantially perpendicularly away from their respective top and bottom walls 110, 150 and have rounded top edges from which sidewalls depend downwardly and outwardly at angles of about 10 degrees greater than a normal toward and connects to the respective top and bottom walls 110, 150. Inner top wall raised rib or rail 116b and inner bottom wall raised rib or rail 156b each extend substantially perpendicularly away from their respective top and bottom walls 110, 150 and have rounded top edges from which sidewalls depend. An outer sidewall of each (i.e., the side adjacent the outer raised rib or rail) extends downwardly and outwardly at angles of about 10 degrees greater than a normal toward and connects to the respective top and bottom walls 110, 150. An inner sidewall of each (i.e., the side opposite the outer sidewall) depends downwardly and outwardly at about normal angles toward and connects to the respective top and bottom walls 110, 150. To ensure a secure fit and smooth movement of the electrical box 100, inner top arm groove 217a and inner bottom arm groove 227a are each reciprocally configured to slidingly cooperate with outer raised rib or rail 116a and inner raised rib or rail 156a; and outer top arm groove 217b and outer bottom arm groove 227b are each reciprocally configured to slidingly cooperate with outer raised rib or rail 116b and inner raised rib or rail 156b. Likewise, the top raised rail or rib 231 slidingly cooperates with the front sidewall top groove 122, the bottom raised rail or rib 232 slidingly cooperates with the front sidewall bottom groove 122, and the raised substantially cylindrical portion 234 slidingly cooperates with the front sidewall central groove 124. It is the combined, simultaneous cooperation of all of the above raised elements and grooves that provides the secure fit and movement of the electrical box 100. In addition, the design of and support provided by the bracket 200 and the design of the electrical box 100 enables the combined assembly 10 to pass the Underwriters Laboratory's 50 pound vertical load hung from the end of the non-bracket side of the electrical box 100.

Figure 10:
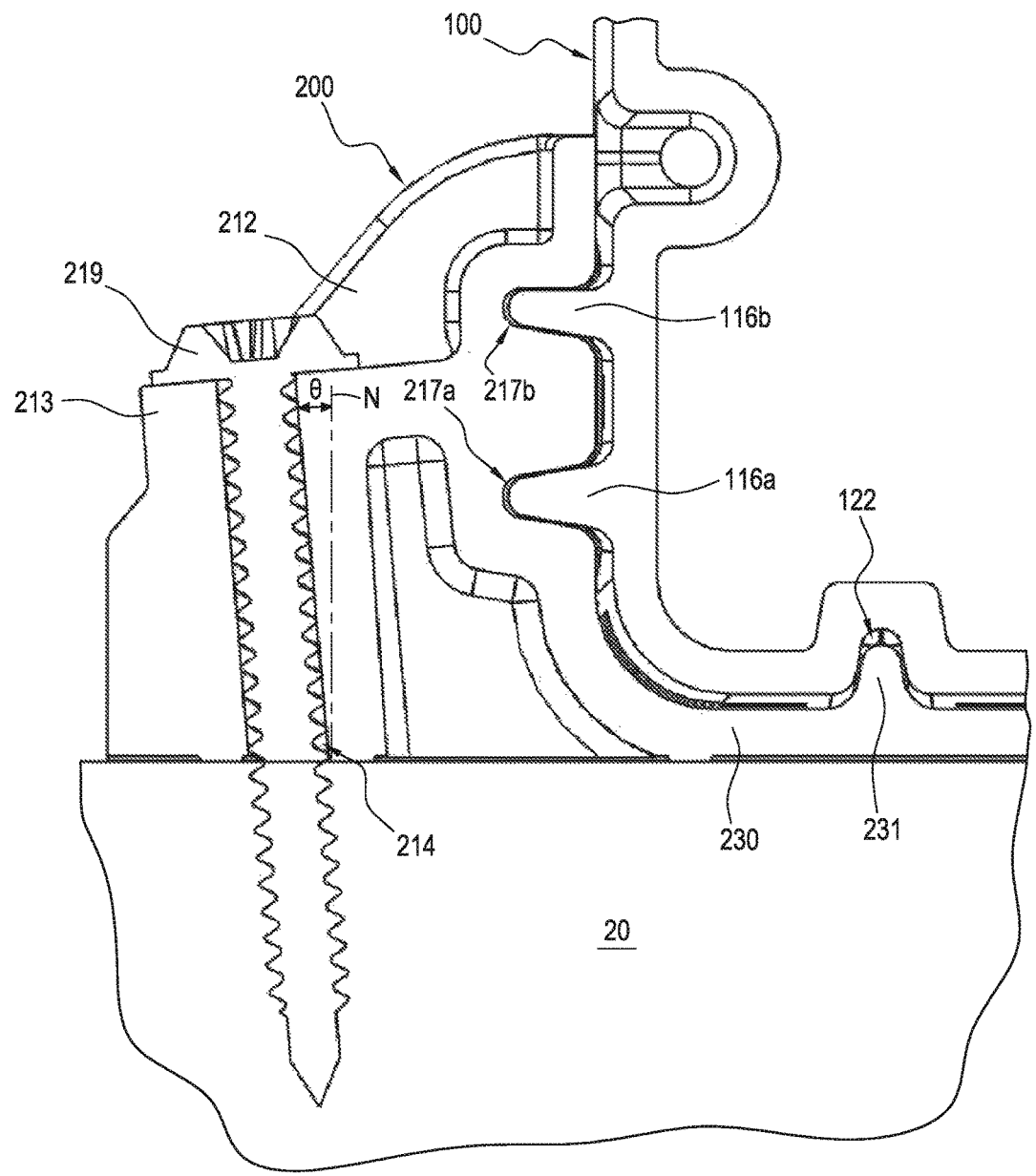
FIG. 10 is a close up cross sectional view of area A from the electrical box and bracket apparatus shown attached to a support member of FIG. 9, in accordance with an embodiment of the disclosed subject matter.

FIG. 10 is a close up cross sectional view of area A from the electrical box and bracket apparatus shown attached to a support member of FIG. 9, in accordance with an embodiment of the disclosed subject matter. In FIG. 10, channel 214 is positioned at an angle $\theta$ that is slightly above a normal N to the outside surface of the body 230. In one embodiment, the angle $\theta$ can be, for example, but not limited to, from about 1 to less than about 10 degrees. In another embodiment, the angle $\theta$ can be, for example, but not limited to, from about 3 to about 7 degrees. In yet another embodiment, the angle $\theta$ can be, for example, but not limited to, about 5 degrees. Having the channel 214 positioned at such an angle provides clearance for a drill chuck not to contact the top wall 110 and the bottom wall 150 when installing the fasteners 219, 229. In addition, by keeping the angle $\theta$ to less than about 10 degrees minimizes the fasteners 219, 229 from wandering on the surface of the support member 20, especially when the support member 20 is made of metal.

Figure 11:
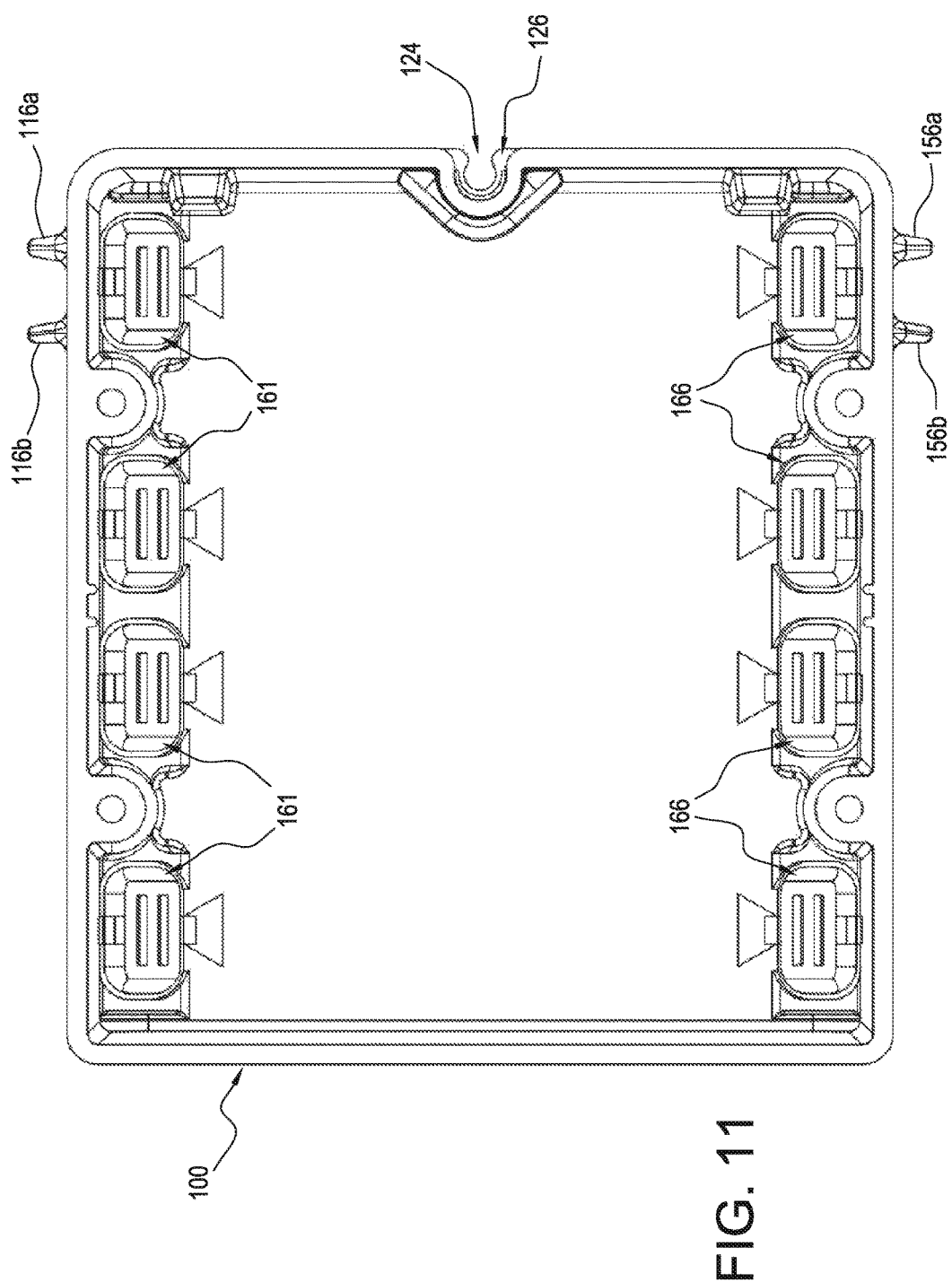
FIG. 11 is a front view of the electrical box of FIG. 1, in accordance with an embodiment of the disclosed subject matter.

FIG. 11 is a front view of the electrical box of FIGS. 1 and 8, in accordance with an embodiment of the disclosed subject matter. In FIG. 11, the relative angles of the walls of the raised rails or ribs 116a, 116, 156a, 156b are clearly shown as are the rounded corners of the top and bottom knockout openings 161, 166. The first sidewall 110 central groove 124 includes a positioning section 126 that is configure and adapted to cooperate with and permit the turning of the top of adjustment screw 170 without the adjustment screw 170 moving toward the back of the central groove 124.

Figure 12:
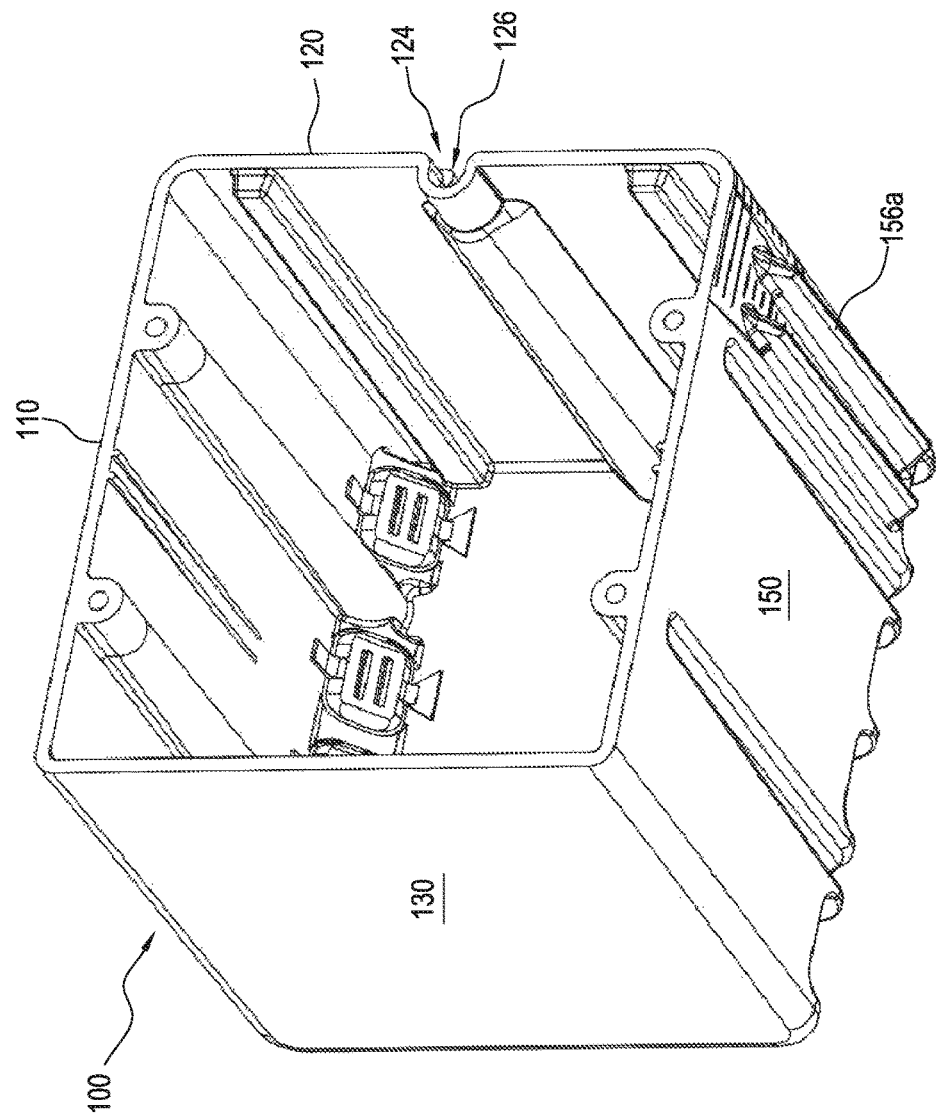
FIG. 12 is a bottom left, front perspective view of the electrical box of FIG. 1, in accordance with an embodiment of the disclosed subject matter.

FIG. 12 is a bottom left, front perspective view of the electrical box of FIGS. 1 and 8, in accordance with an embodiment of the disclosed subject matter. In FIG. 12, the bottom wall raised ribs or rails 156a, 156b are taller at their back ends than at their front ends to compensate for the downward slope of the bottom wall 150. Although not shown in FIG. 12, the top wall raised ribs or rails 116a, 116b are taller at their back ends than at their front ends to compensate for the upward slope of the top wall 110 This difference in height from the front to the back of the raised ribs or rails 116a, 116b, 156a, 156b ensures that the distance from the tops of one pair to the tops of the other pair remains constant along the lengths of the rails. This permits the smooth and even movement of the electrical box 100 through the bracket 200 when the adjustment screw 170 is turned.

Figure 13:
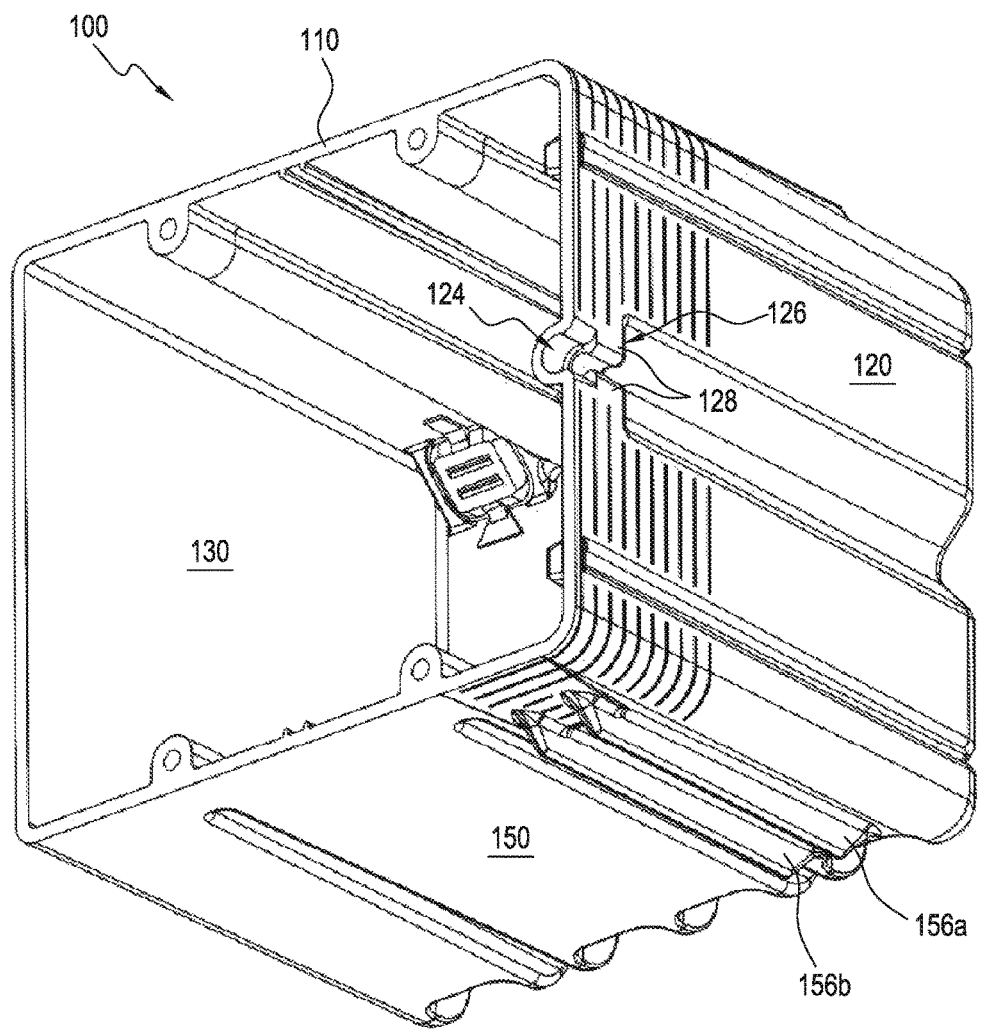
FIG. 13 is a bottom right, front perspective view of the electrical box of FIG. 1, in accordance with an embodiment of the disclosed subject matter.

FIG. 13 is a bottom right, front perspective view of the electrical box 100 of FIGS. 1 and 8, in accordance with an embodiment of the disclosed subject matter. In FIG. 13, the configuration of the positioning section 126 of the central groove 124 includes a collar 128 to rotably engage and hold a top portion of the adjustment screw 170.

Figure 14:
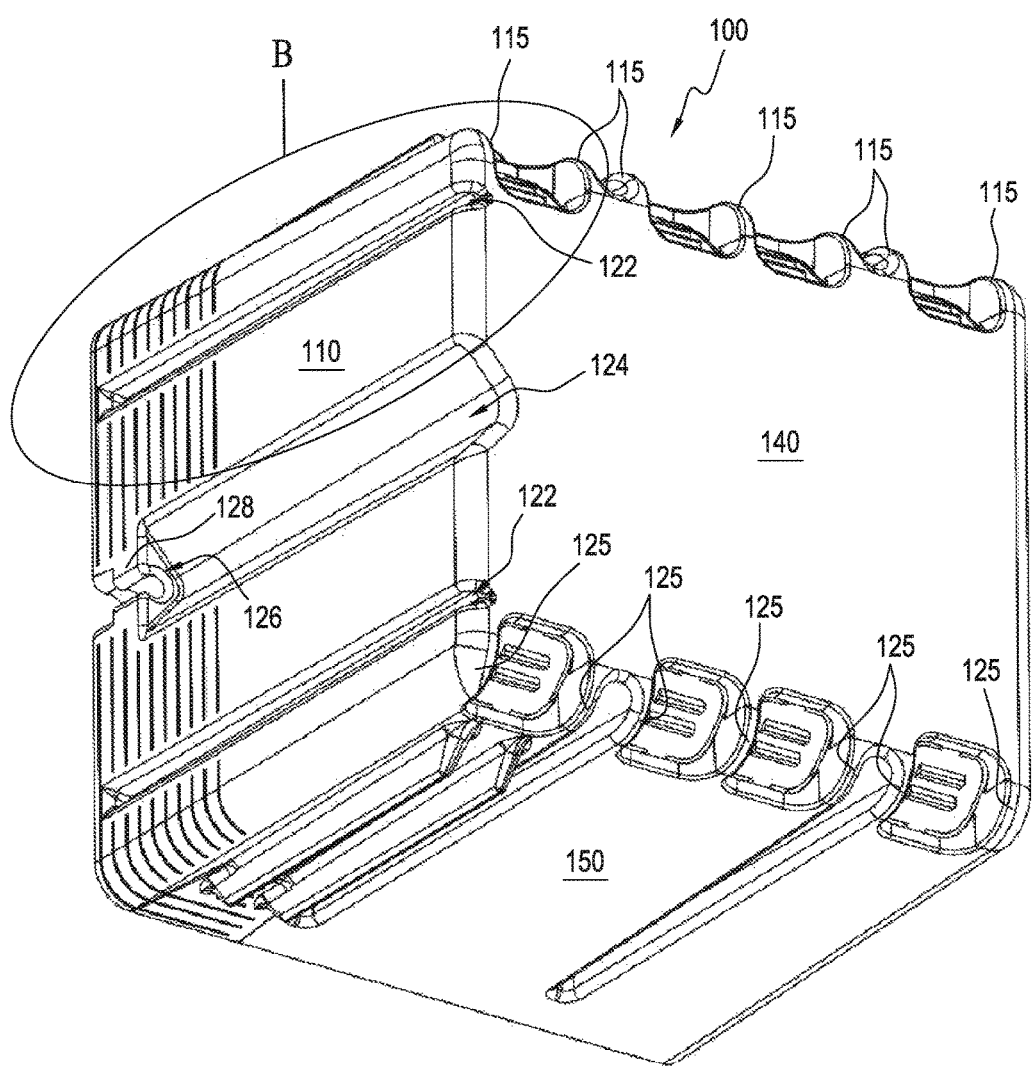
FIG. 14 is a bottom left, rear perspective view of the electrical box of FIG. 1, in accordance with an embodiment of the disclosed subject matter.

FIG. 14 is a bottom left, rear perspective view showing further details of the electrical box of FIGS. 1 and 8, in accordance with an embodiment of the disclosed subject matter.

Figure 15:
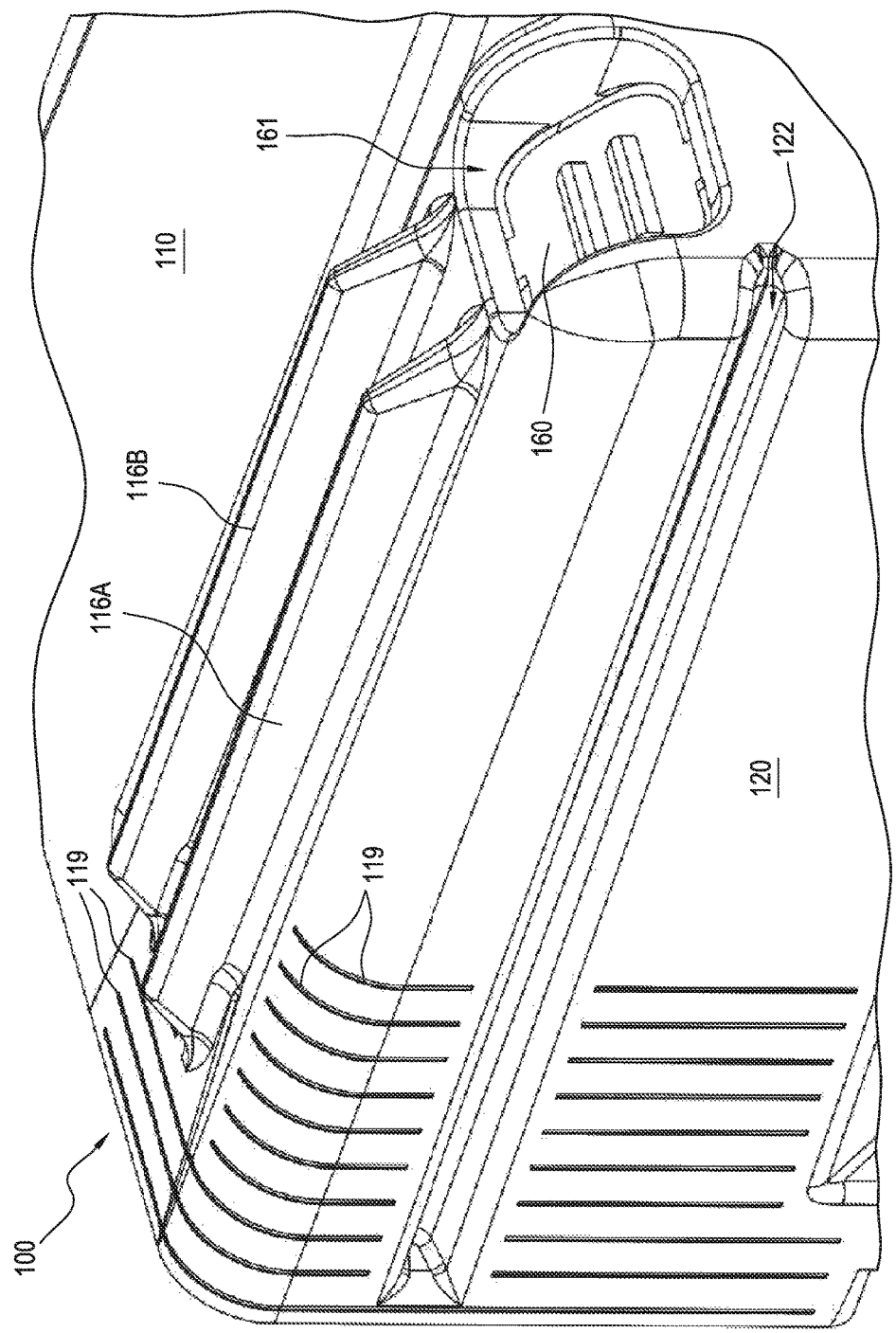
FIG. 15 is a top left, rear close up perspective view of area B from the electrical box of FIG. 14, in accordance with an embodiment of the disclosed subject matter.

FIG. 15 is a top left, rear close up perspective view of and shown details of area B from the electrical box 100 of FIG. 14, in accordance with an embodiment of the disclosed subject matter.

Figure 16:
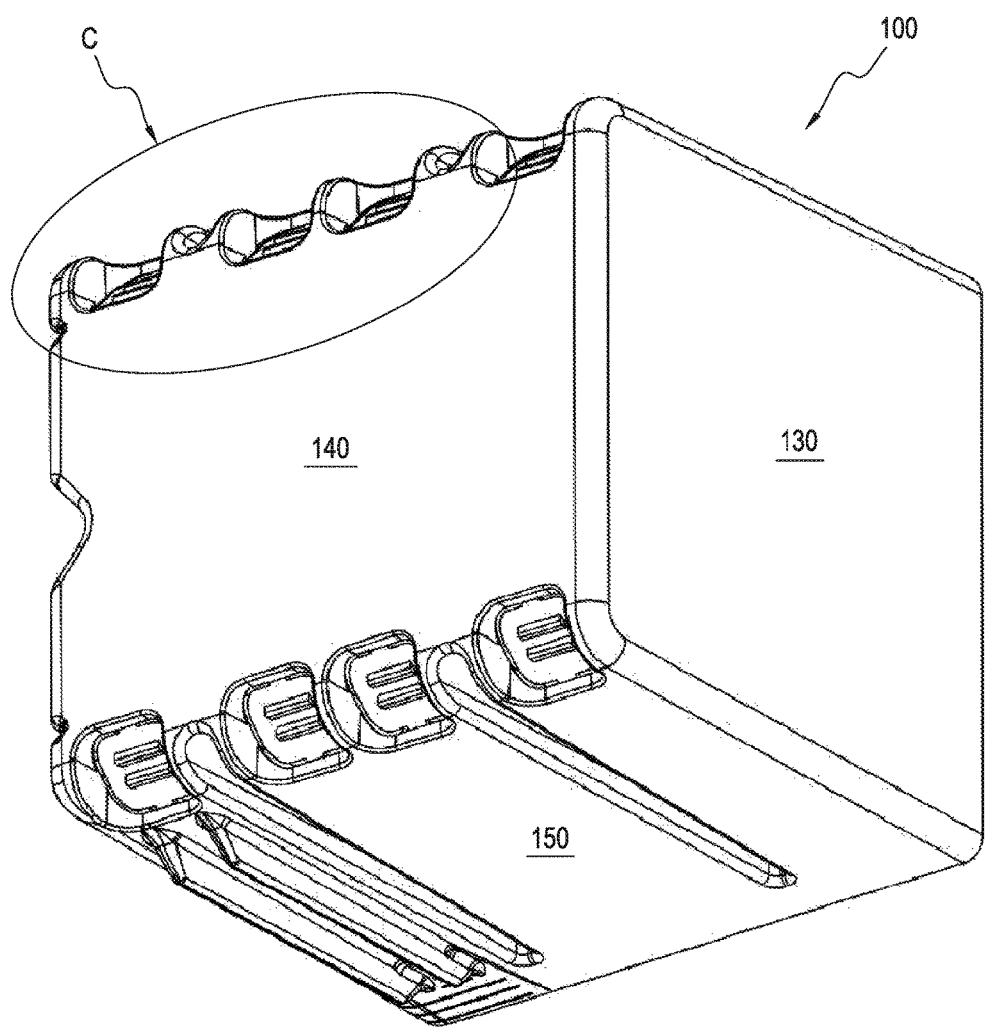
FIG. 16 is a bottom right, rear perspective view of the electrical box of FIG. 1, in accordance with an embodiment of the disclosed subject matter.

FIG. 16 is a bottom right, rear perspective view of the electrical box 100 of FIGS. 1 and 8, in accordance with an embodiment of the disclosed subject matter.

Figure 17:
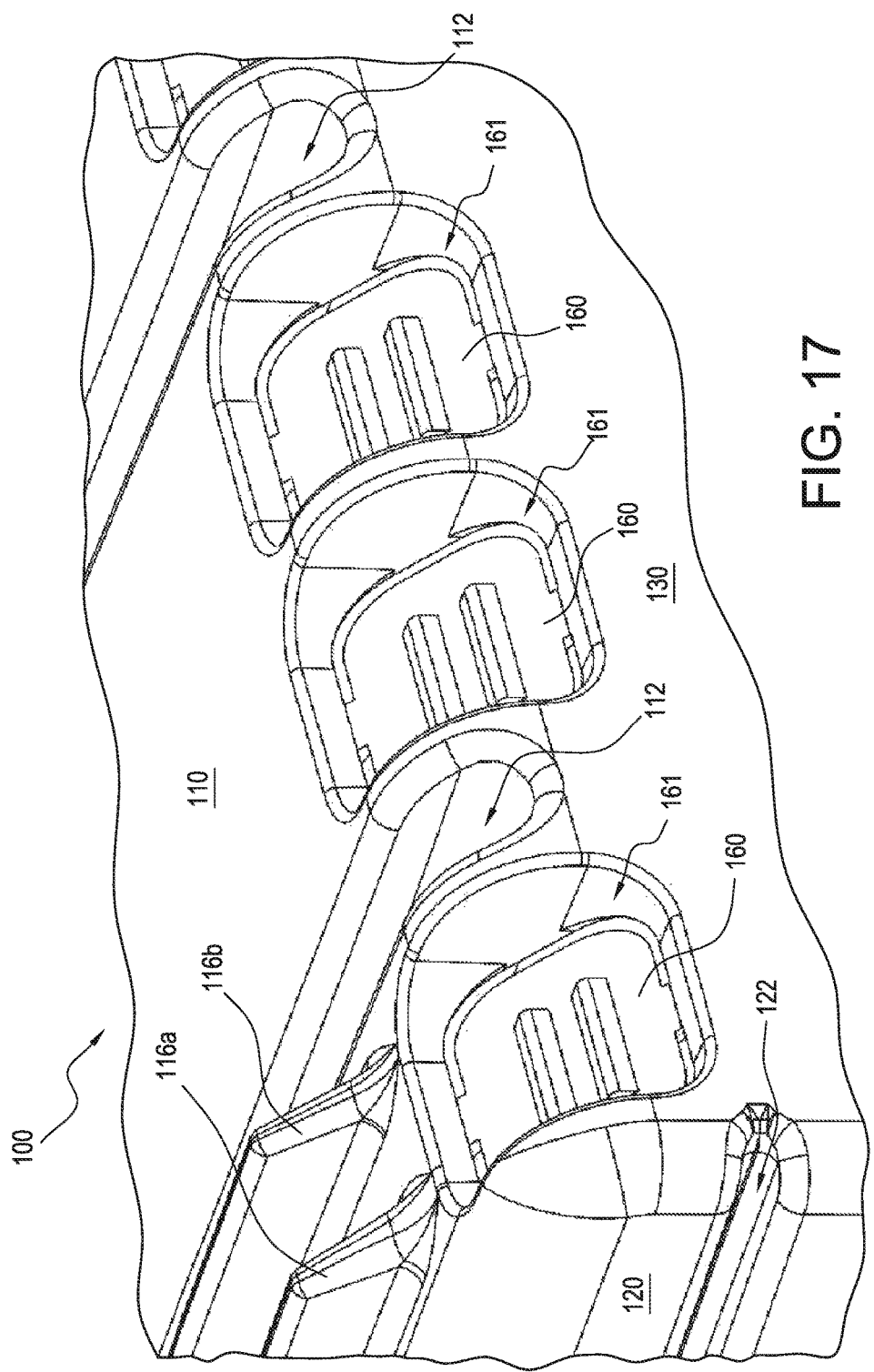
FIG. 17 is a close up view of area C from the top left of the electrical box of FIG. 16, in accordance with an embodiment of the disclosed subject matter.

FIG. 17 is a close up view of area C from the top left showing details of the electrical box of FIG. 16, in accordance with an embodiment of the disclosed subject matter.

Figure 18:
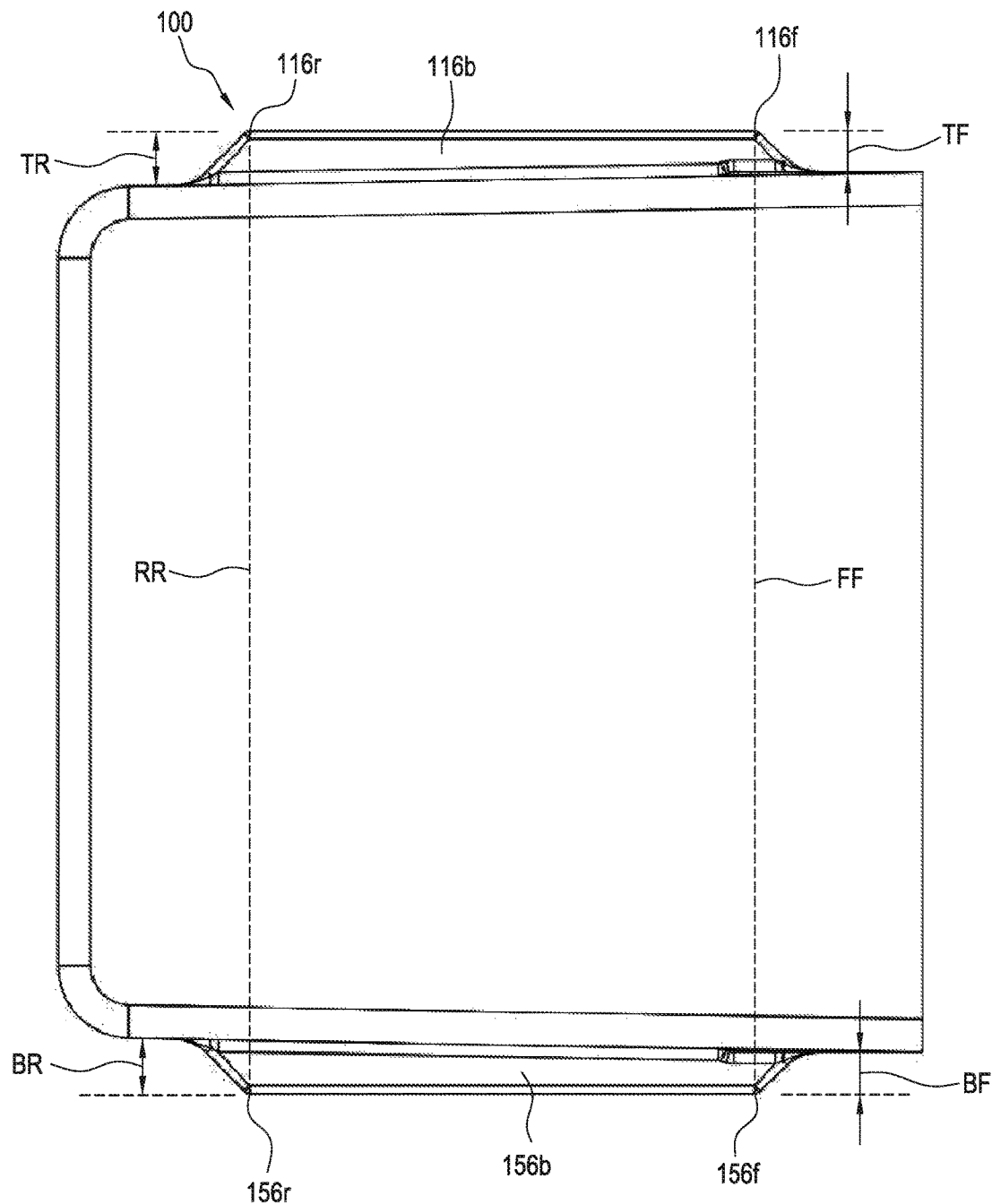
FIG. 18 is a left side view of the electrical box of FIG. 1, in accordance with an embodiment of the disclosed subject matter.

FIG. 18 is a left side view of the electrical box of FIGS. 1 and 8, in accordance with an embodiment of the disclosed subject matter. In FIG. 18, the height TF of a top front end 116*f* of the inside raised rib 116*b* is less than the height TR of a top rear end 116*r* of the inside raised rib 116*b* and the height BF of a bottom front end 156*f* of the bottom inner raised rib 156*b* is less than the height BR of a bottom rear end 156*r* of the bottom inside raised rib 156*b*. These differences in height relative to the box allow the tips of 116 and 156 to be substantially horizontal in those embodiments in which the top wall 110 and the bottom wall 150 extend away from the back wall 140 at angles greater than 90 degrees. In addition, a distance FF between the top front end 116*f* and the bottom front end 156*f* and a distance RR between the top rear end 116*r* and the bottom rear end 156*r* are substantially equal. However, in other embodiments where the top wall 110 and the bottom wall 150 extend away from the back wall 140 at angles of 90 degrees, the height TF is equal to the height TR.

Figure 19:
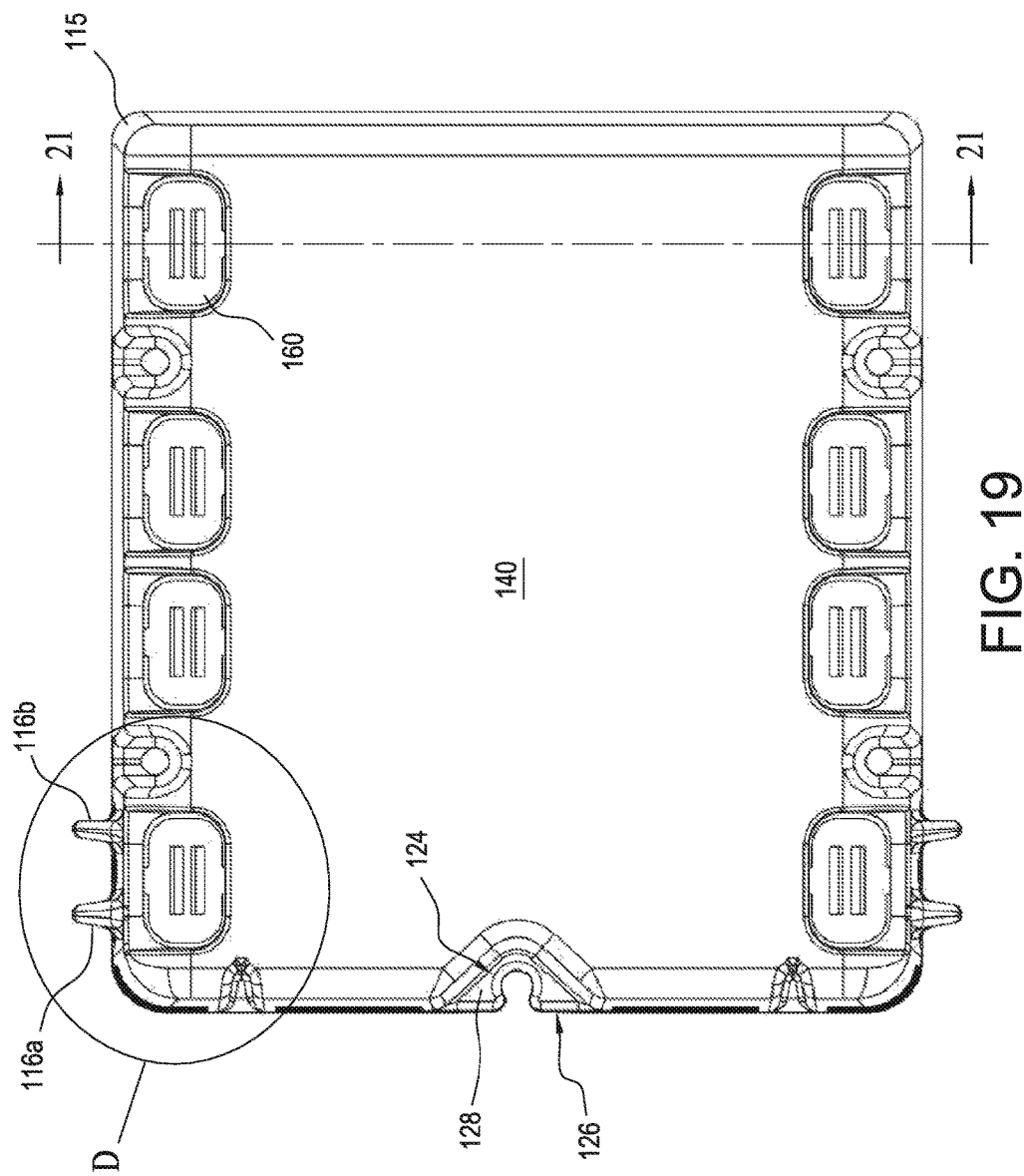
FIG. 19 is a back view of the electrical box of FIG. 1, in accordance with an embodiment of the disclosed subject matter.

FIG. 19 is a back view showing details of the electrical box 100 of FIGS. 1 and 8, in accordance with an embodiment of the disclosed subject matter.

Figure 20:
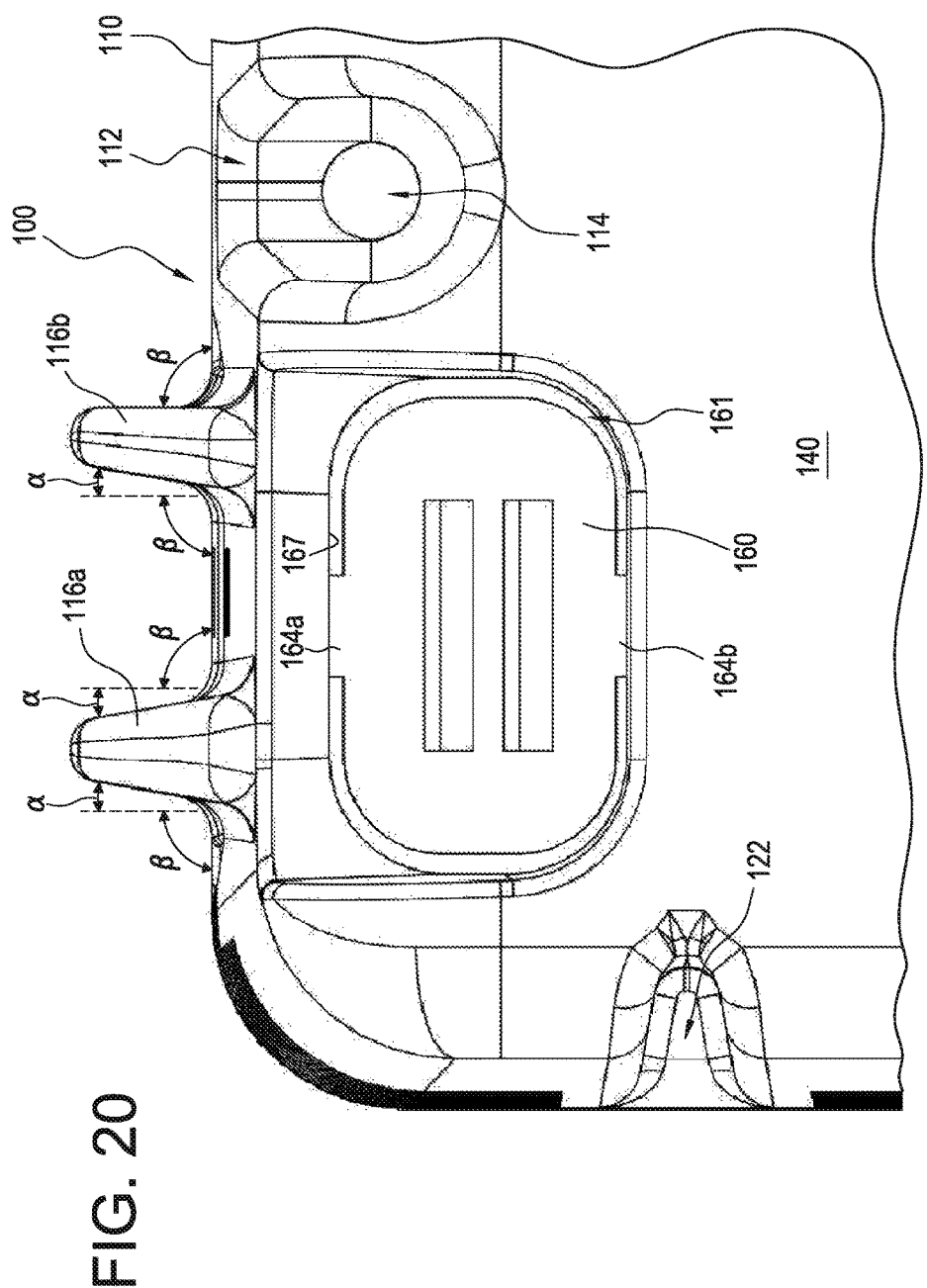
FIG. 20 is a close up view of area D from the electrical box of FIG. 19, in accordance with an embodiment of the disclosed subject matter.

FIG. 20 is a close up view of area D from the electrical box 100 of FIG. 19, in accordance with an embodiment of the disclosed subject matter. In FIG. 20, angles β are normal or right angles to the top wall 110 of the electrical box 100. Angles α indicate an additional angle amount above the right angle β at which the outer and inner walls of the outer raised rib 116*a* and the outer wall of the inner raised rib 116*b* depend toward and connect with the top wall 110. Angle α can be, for example, but not limited to, about 10 degrees, so the previously discussed three raised rib walls can depend at an angle of about 100 degrees toward and connect with the top wall 110. This angle allows an easier fit with the bracket 200. In other embodiments, angle α can range from, for example, but not limited to, 91 to 120 degrees. Unlike the other rib walls, the inner wall of the inner raised rib 116*b* depends at a substantially right angle toward and connects with the top wall 110. Knockout tab 160 includes a short, top tab section 164*a* that connects with a middle portion of a top side of an edge 167 of the knockout opening 161 and a short, bottom tab section 164*b* that connects with a middle portion of a bottom side of the edge 167 of the knockout opening 161. In other embodiments, angle α can range from between 1 and 30 degrees.

Figure 21:
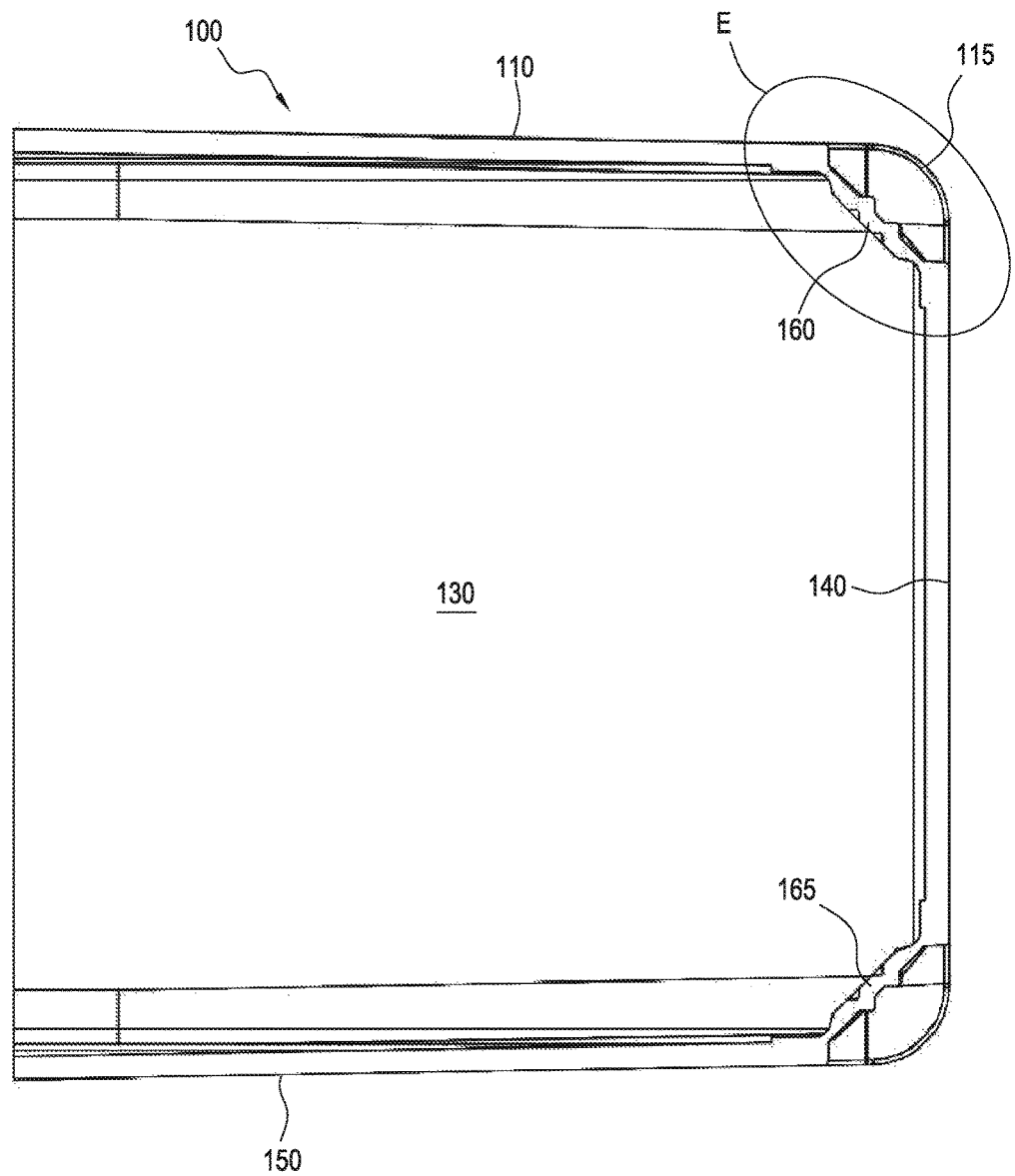
FIG. 21 is a cross sectional view along line 21-21 of the electrical box of FIG. 19, in accordance with an embodiment of the disclosed subject matter.
Figure 22:
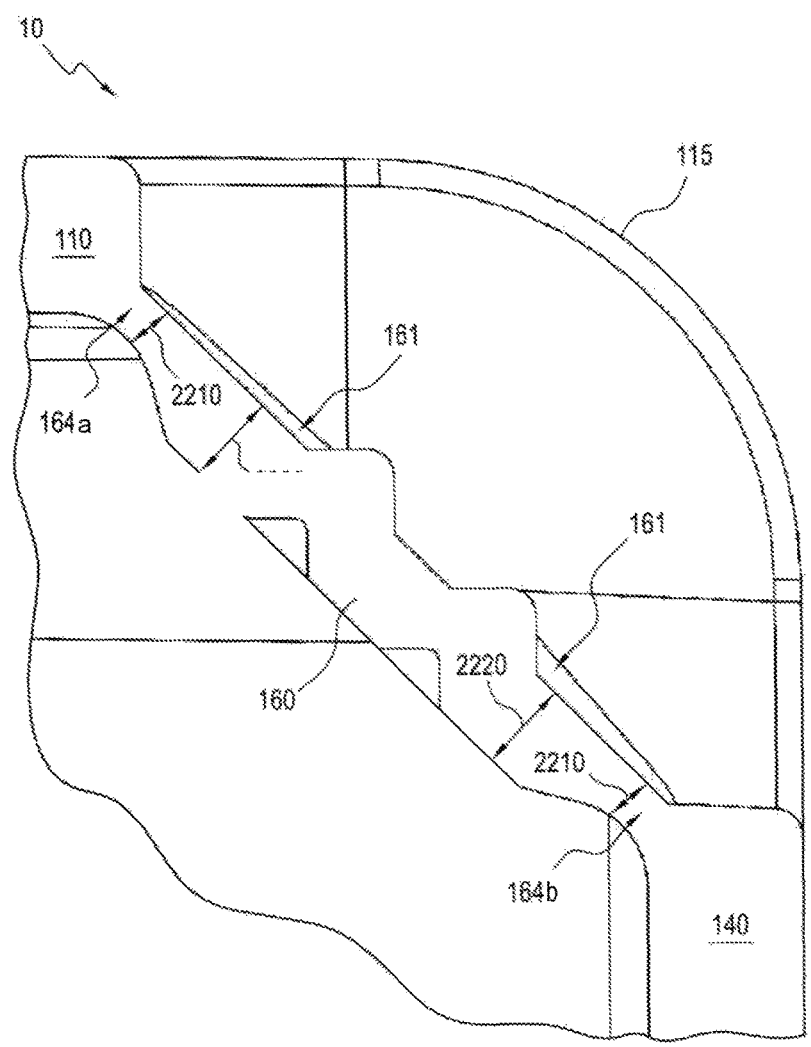
FIG. 22 is close up view of area E from the electrical box of FIG. 21, in accordance with an embodiment of the disclosed subject matter.

FIG. 21 is a cross sectional view along line 21-21 of the electrical box 100 of FIG. 19 through the top knockout tab 160 and the bottom knockout tab 165, in accordance with an embodiment of the disclosed subject matter. In FIG. 22, the top tab portion 164*a* extends across a portion of the middle of the top side of the outer edge 167 of the knock out opening 161 and a short, bottom tab portion 164 extends across a portion of the middle of the top side of the outer edge 167 of the knock out opening 161 to hold the knockout tab 160 in place. Tabs 164*a*, 164*b* also permit the relatively easy removal of the knockout tab 160 by breaking or twisting tab portions 164*a*, 164*b* away from the edge 167.

FIG. 22 is close up view of area E from the electrical box 100 of FIG. 21, in accordance with an embodiment of the disclosed subject matter. In FIG. 22, the top tab 164*a* and the bottom tab 164*b* have a thinner thickness 2210 than the thickness 2220 of the knockout tab 160 in order to define where the knockout tab 160 is designed to break off when pressure is applied against the knockout tab 160. In addition, outer edges of the top tab 164*a* and the bottom tab 164*b* connect to corners of the much thicker top wall 110 and the much thicker back wall 140, respectively.

Figure 23:
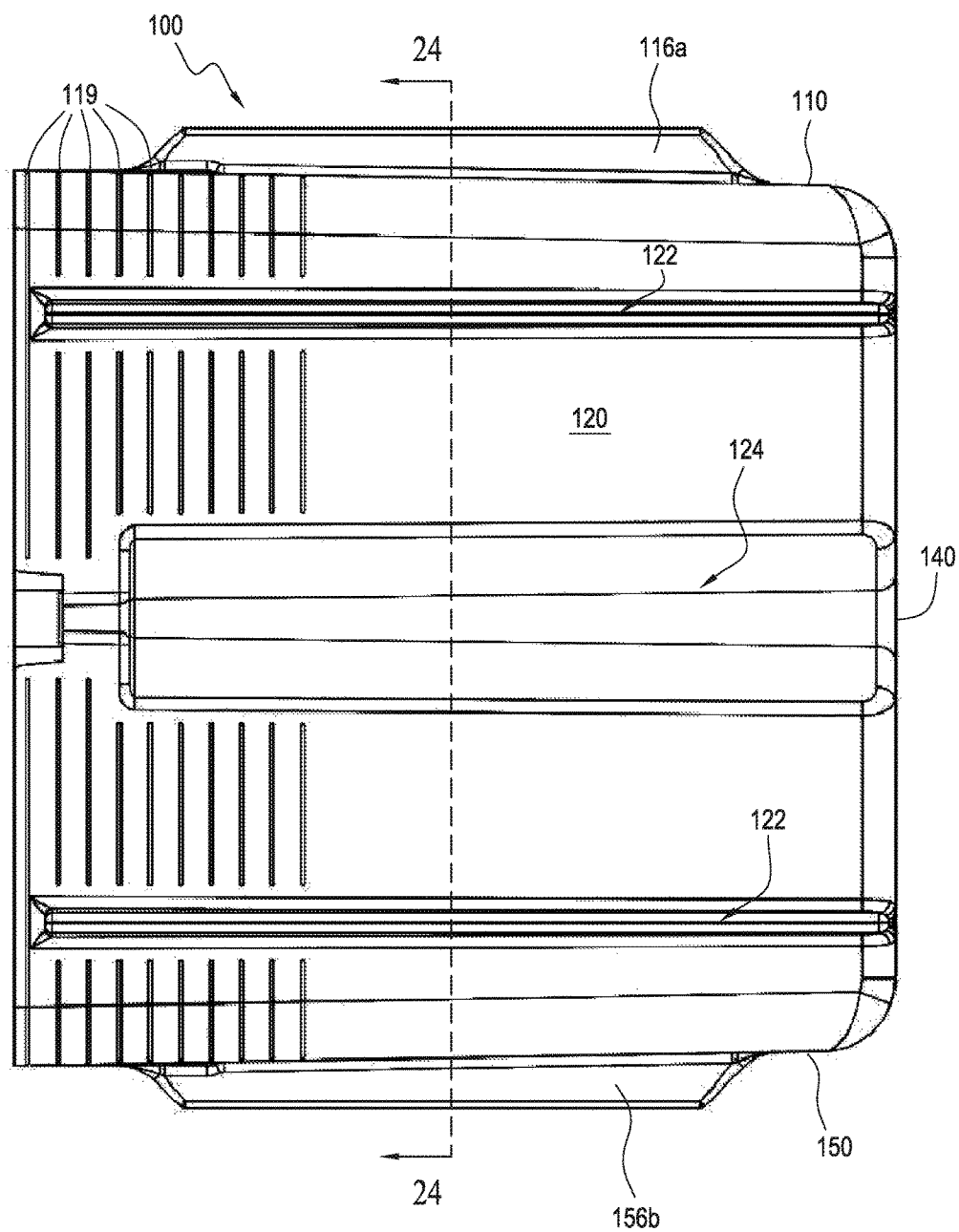
FIG. 23 is a right side view of the electrical box of FIG. 1, in accordance with an embodiment of the disclosed subject matter.

FIG. 23 is a right side view of the first sidewall 120 of electrical box 100 of FIGS. 1 and 8, in accordance with an embodiment of the disclosed subject matter.

Figure 24:
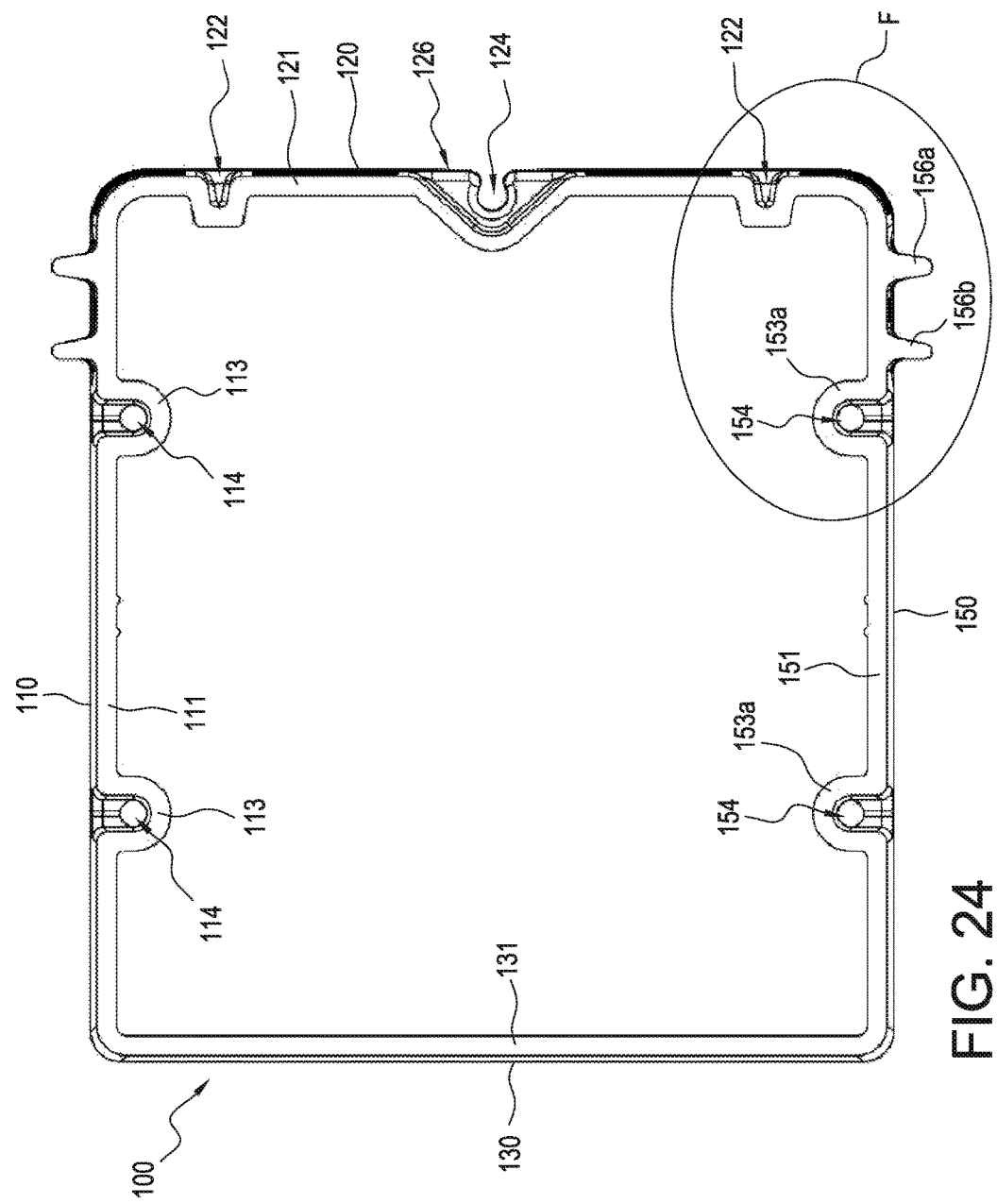
FIG. 24 is a cross sectional view along line 24-24 of the electrical box of FIG. 23, in accordance with an embodiment of the disclosed subject matter.

FIG. 24 is a cross sectional view along line 24-24 of the electrical box 100 of FIG. 23, in accordance with an embodiment of the disclosed subject matter.

Figure 25:
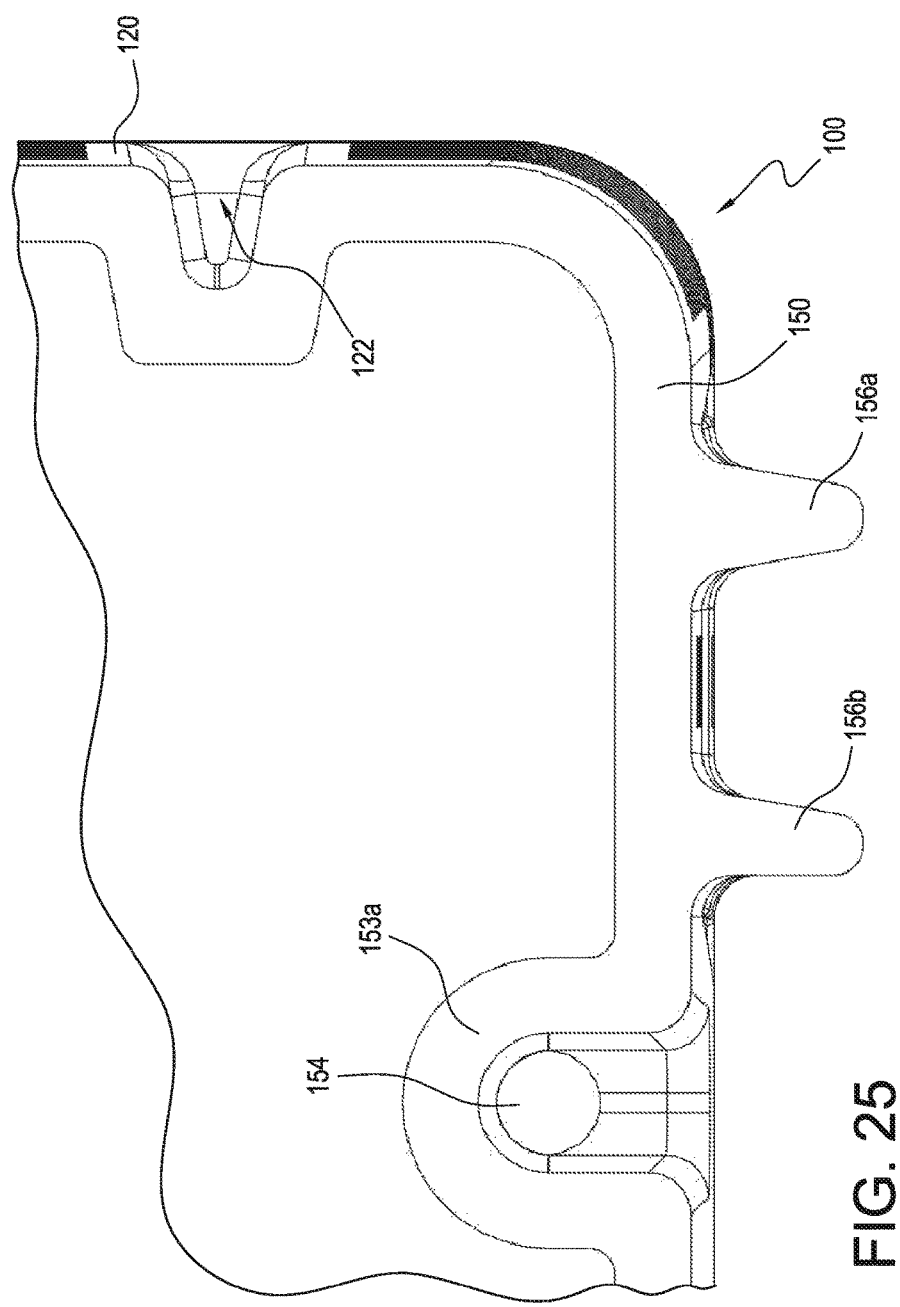
FIG. 25 is a close up view of area F from the electrical box of FIG. 24, in accordance with an embodiment of the disclosed subject matter.

FIG. 25 is a close up view of area F showing details of the electrical box of FIG. 24, in accordance with an embodiment of the disclosed subject matter.

Figure 26:
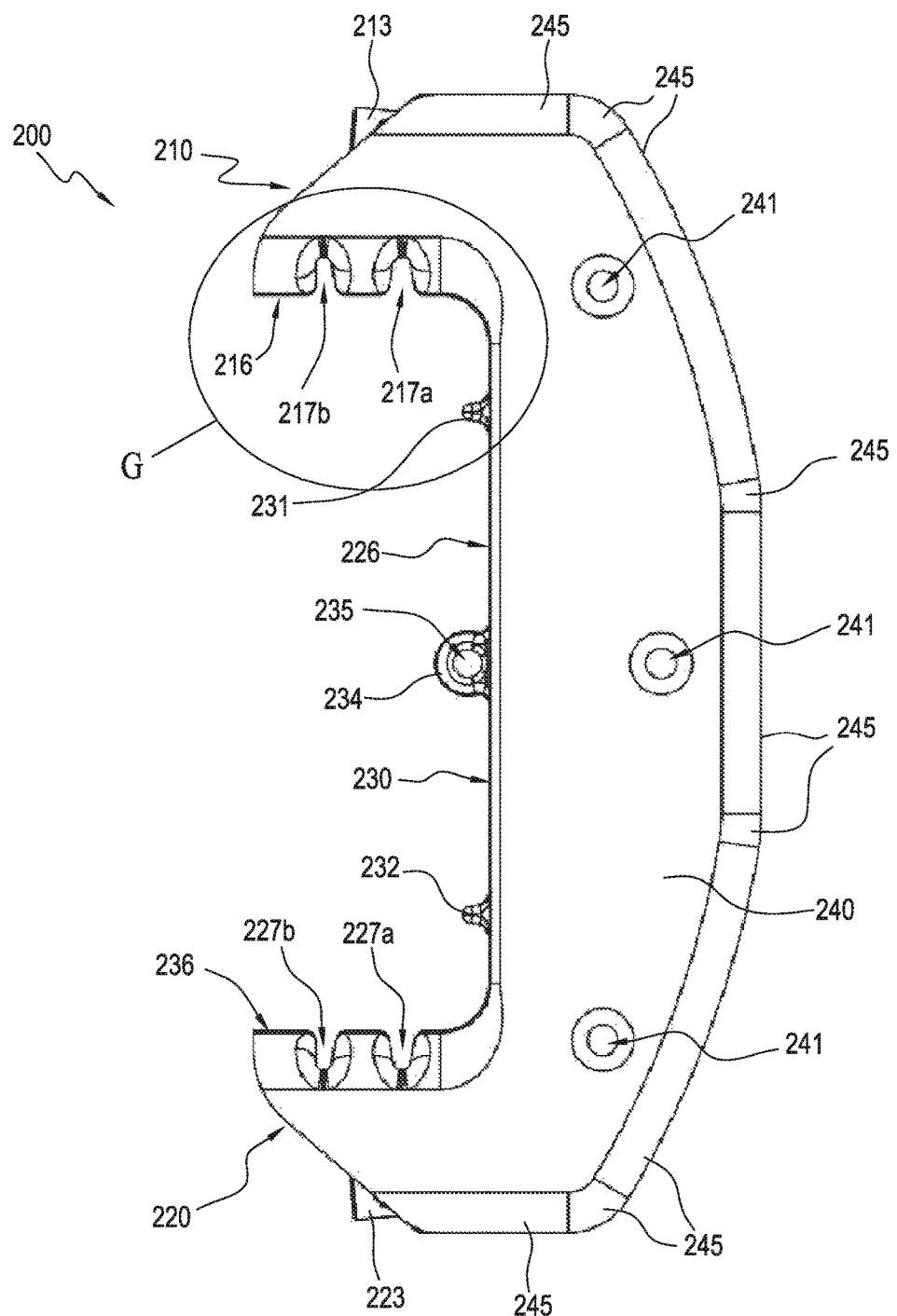
FIG. 26 is a right or flange side view of the bracket of FIG. 1, in accordance with an embodiment of the disclosed subject matter.

FIG. 26 is a right or flange side view of the bracket of FIGS. 1 and 8, in accordance with an embodiment of the disclosed subject matter. In FIG. 26, the substantially "U"-shape is defined by an inner surface 216 of the top arm 210, which is connected to and contiguous with an inner surface 226 of the body 220 and which in turn is connected to and contiguous with an inner surface 236 of the bottom arm 230. The inner surface 216 of the top arm 210 is substantially perpendicular to the inner surface 226 of the body 220 and the inner surface 226 of the bottom arm 220 is substantially perpendicular to the inner surface 226 of the body 220. As seen in FIG. 26, the top and bottom outer channels 217*b*, 227*b* have and outer wall surface that extends away from the surfaces 216, 226 of the respective arms at a substantially perpendicular angle, which helps hold the inner raised ribs or rails 217*b*, 227*b* in their respective channels. As a result, the connection between the bracket 200 and the electrical box 100 is tight and secure.

Figure 27:
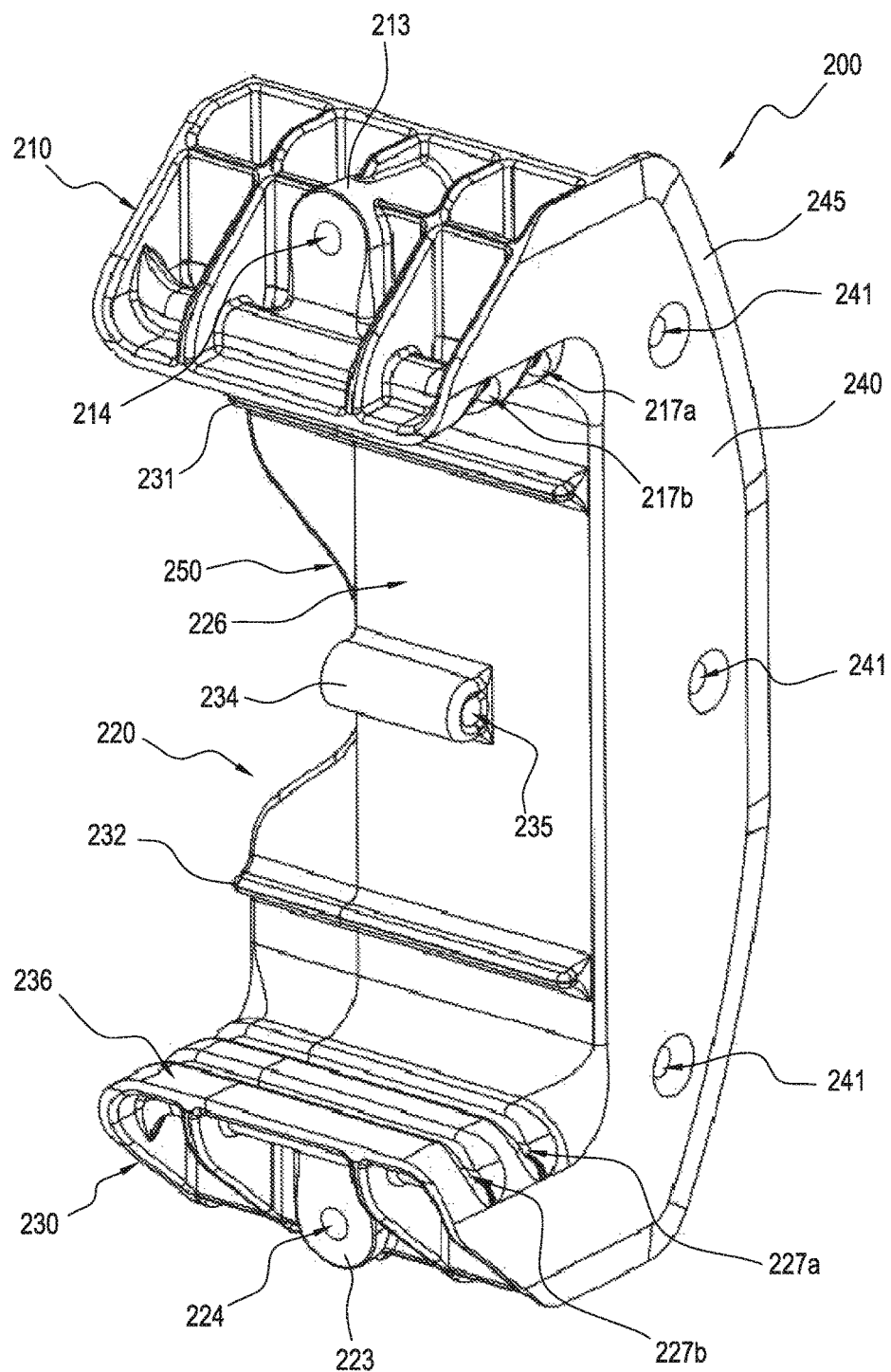
FIG. 27 is a top right, front perspective view of the bracket of FIG. 1, in accordance with an embodiment of the disclosed subject matter.

FIG. 27 is a top right, front perspective view of the bracket of FIGS. 1 and 8, in accordance with an embodiment of the disclosed subject matter. In FIG. 27, a portion of the backside edge 250 of the body 230 has a downwardly and inwardly curved top half starting from just below the top raised rail or rib 231 and curving downwardly and inwardly toward and even with a backside face of the raised cylindrical portion 234. Likewise, the portion of the backside edge 250 of the body 230 has an upwardly and inwardly curved bottom half starting from just above the bottom raised rail or rib 232 and curving upwardly and inwardly toward and even with a backside face of the raised cylindrical portion 234.

Figure 28:
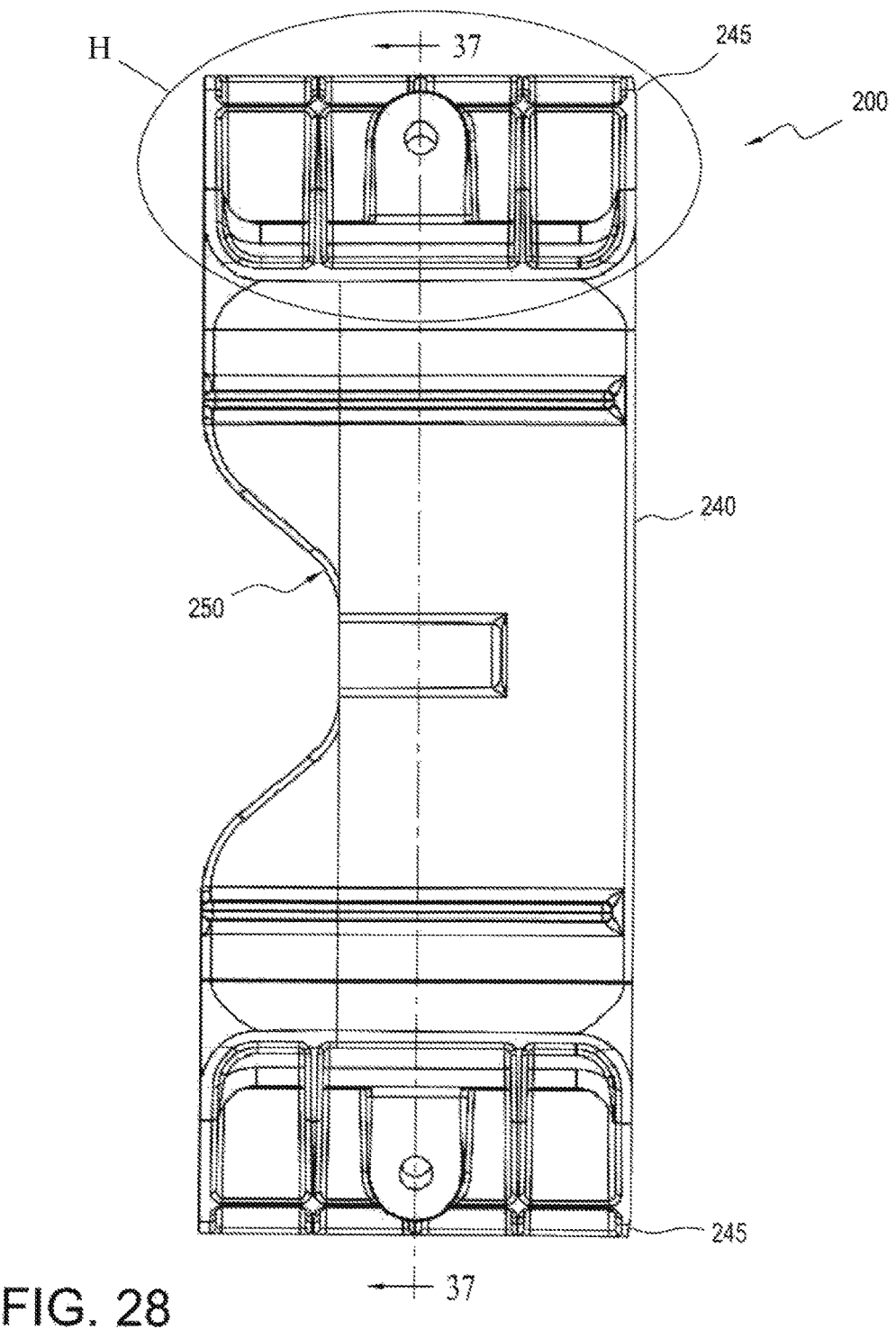
FIG. 28 is a front view of the bracket of FIG. 1, in accordance with an embodiment of the disclosed subject matter.

FIG. 28 is a front view of the bracket of FIGS. 1 and 8, in accordance with an embodiment of the disclosed subject matter. In FIG. 28, the complete curvature of the portion of the backside edge 250 of the body 230 is more clearly shown. In addition, the slight outside taper 245 of the top and bottom of the flange 240 is shown.

Figure 29:
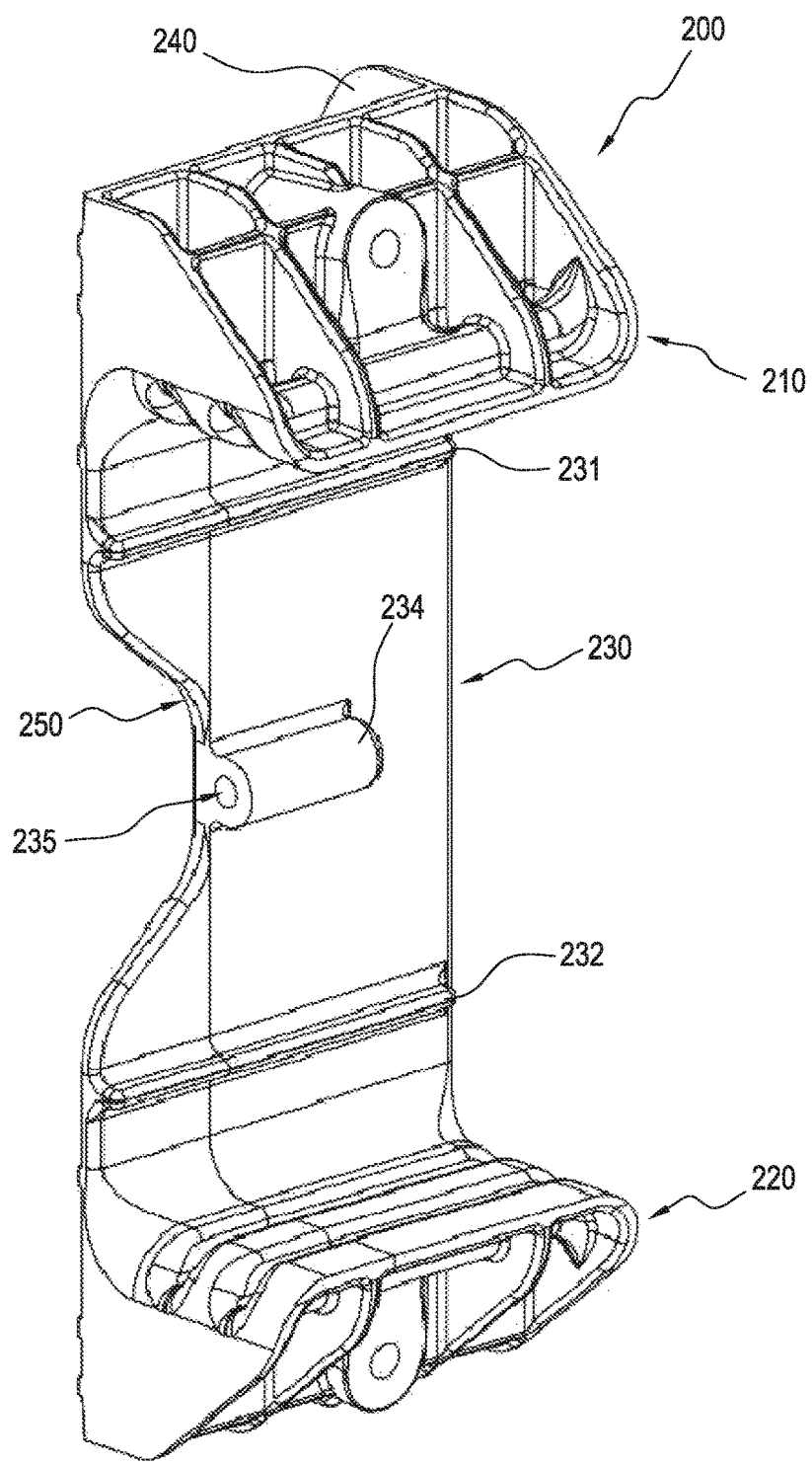
FIG. 29 is a top left, front perspective view of the bracket of FIG. 1, in accordance with an embodiment of the disclosed subject matter.

FIG. 29 is a top left, front perspective view of the bracket 200 of FIGS. 1 and 8, in accordance with an embodiment of the disclosed subject matter. In FIG. 29, the positioning and thickness of the backside edge 250 of the body 230 is more clearly shown.

Figure 30:
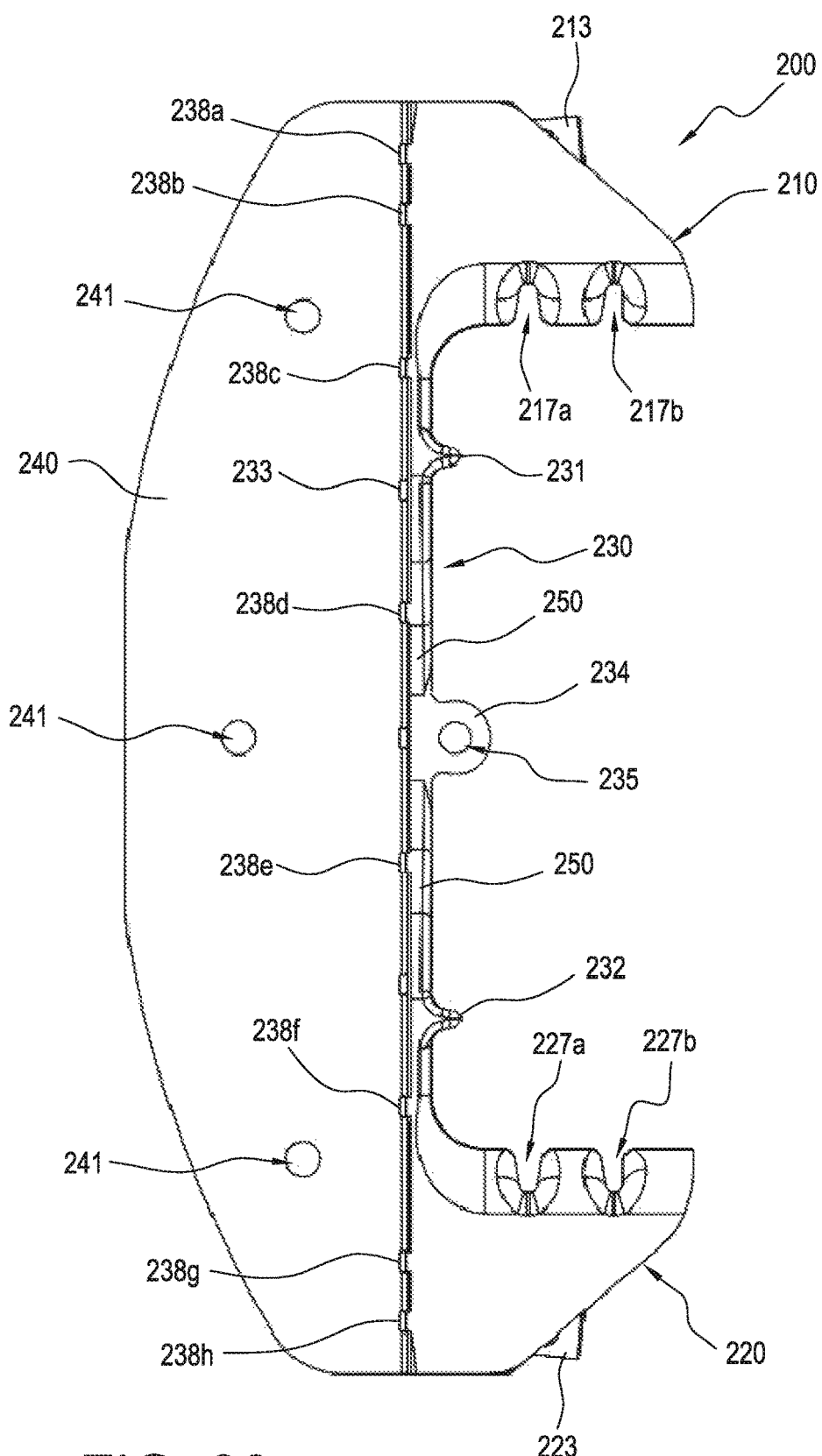
FIG. 30 is a left or non-flange side view of the bracket of FIG. 1, in accordance with an embodiment of the disclosed subject matter.

FIG. 30 is a left or non-flange side view of the bracket 200 of FIGS. 1 and 8, in accordance with an embodiment of the disclosed subject matter. In FIG. 30, the backside of the fastener openings 241 are shown in the flange 240 and outside ends of multiple cross rib portions 238a-238h are shown on and space across the outside surface 233 of the body 230.

Figure 31:
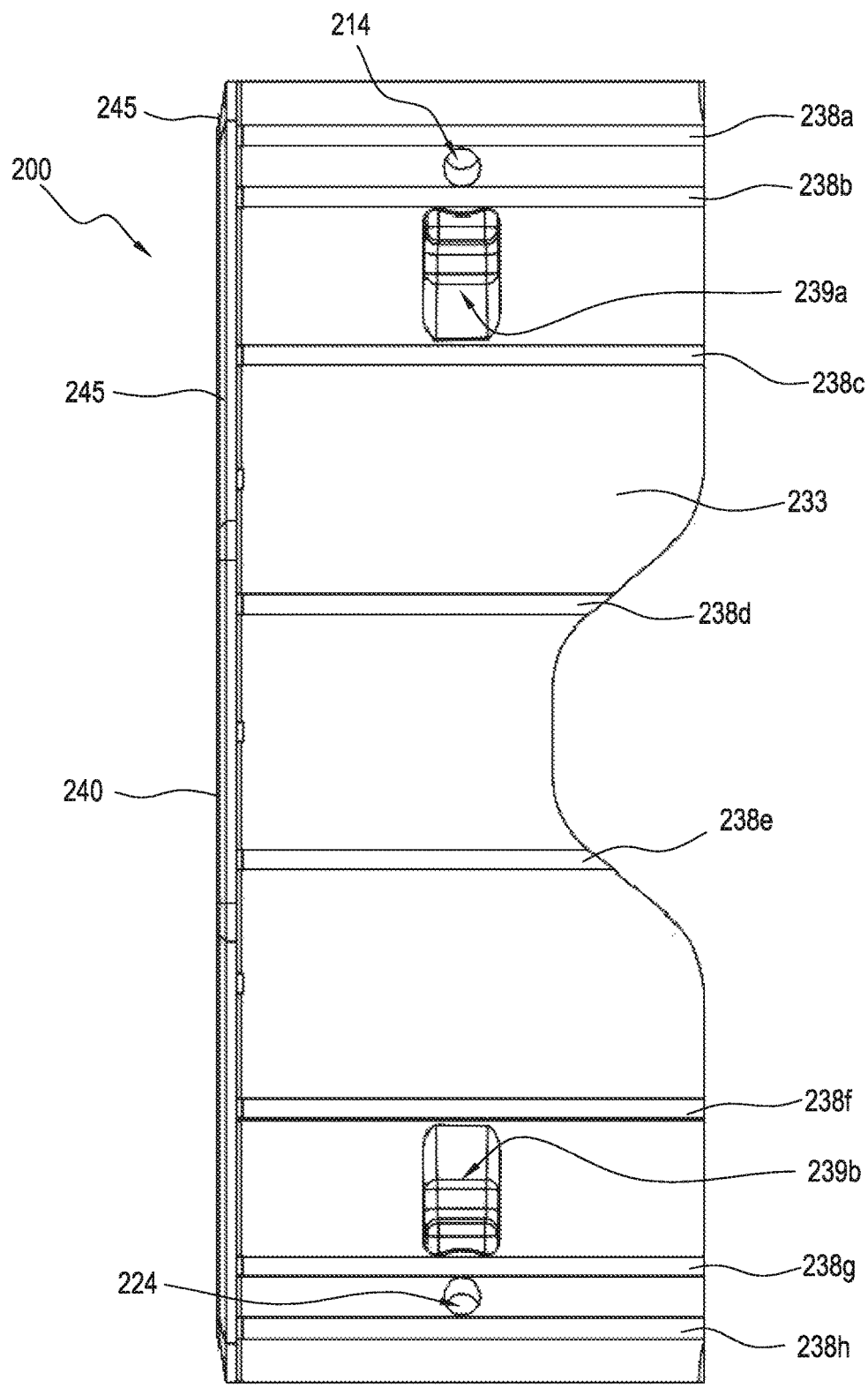
FIG. 31 is a back view of the bracket of FIG. 1, in accordance with an embodiment of the disclosed subject matter.

FIG. 31 is a back view of the bracket of FIGS. 1 and 8, in accordance with an embodiment of the disclosed subject matter. The body 230 includes the multiple cross rib portions 238a-238h that are formed on and extend across the back surface 233, extend out from and are spaced along the length or height of a backside surface 233 of the body 230 and provide additional strength and stability to the body 230 and the bracket 200. At the outside edge of the body surface, each cross rib has a substantially rectangular cross section and a substantially flat top. In addition, a top enclosed opening 239a under the top positioning portion 213 is formed in the back surface 233 and extends into and below the top positioning portion 213. The top enclosed opening 239a is positioned between cross rib portions 238b and 238c. Similarly, a bottom enclosed opening 239b above the bottom positioning portion 223 is formed in the back surface 233 and extends into and above the bottom positioning portion 223. The bottom enclosed opening 239b is positioned between cross rib portions 238f and 238g. By including openings 239a, 239b, unnecessary material is not used and a more consistent wall thickness results, which is beneficial for injection molding. A backside of the opening of the top channel 214 is formed in the back surface 233 and is positioned between cross rib portions 238a and 238b, and a backside of the opening of the bottom channel 224 is formed in the back surface 233 and is positioned between cross rib portions 238g and 238h.

Figure 32:
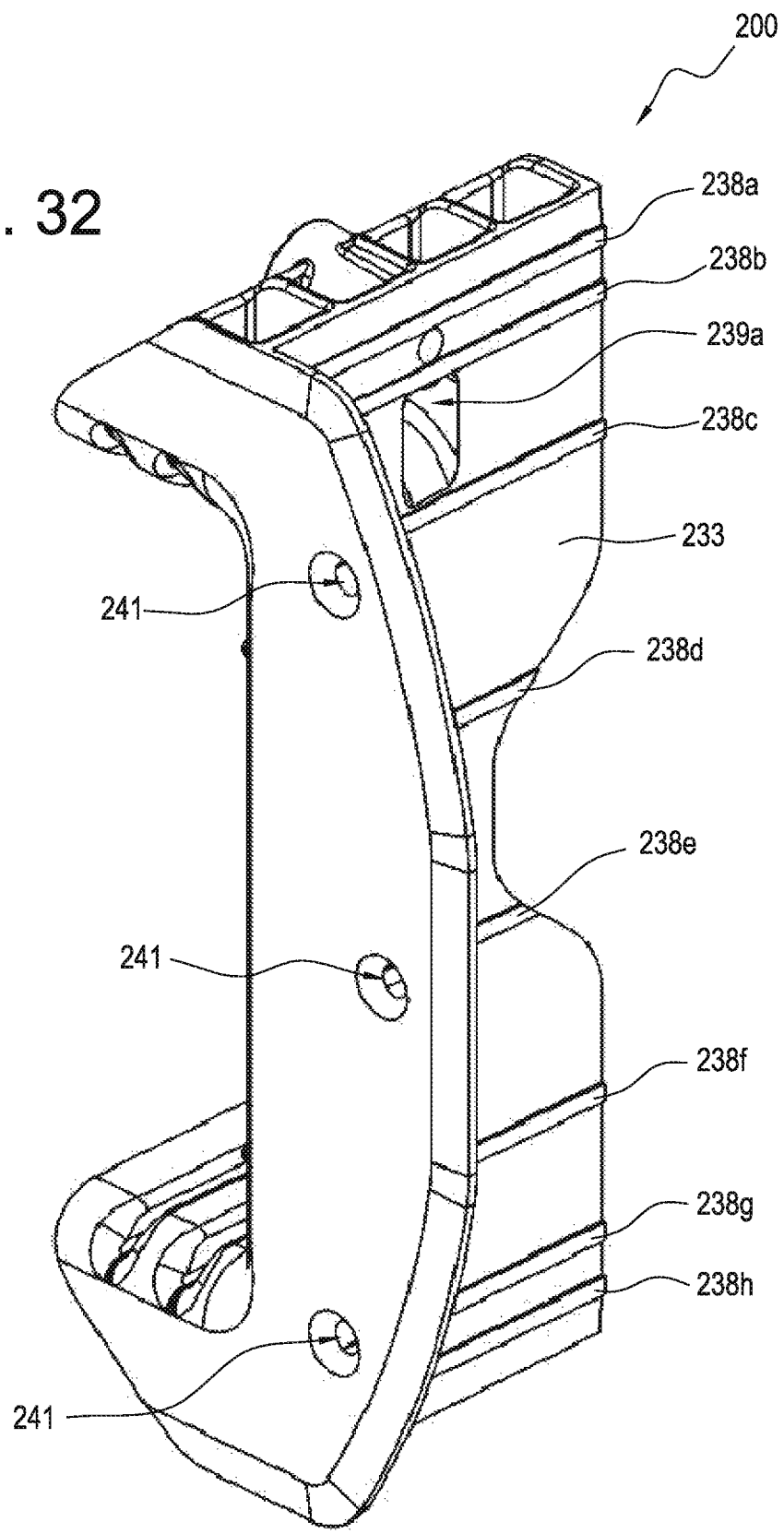
FIG. 32 is a top right, rear perspective view of the bracket of FIG. 1, in accordance with an embodiment of the disclosed subject matter.

FIG. 32 is a top right, rear perspective view of the bracket of FIGS. 1 and 8, in accordance with an embodiment of the disclosed subject matter. In FIG. 32, an inside surface of the top enclosed opening 239a is seen sloping and curving upwardly toward the front of the top arm 210.

Figure 33:
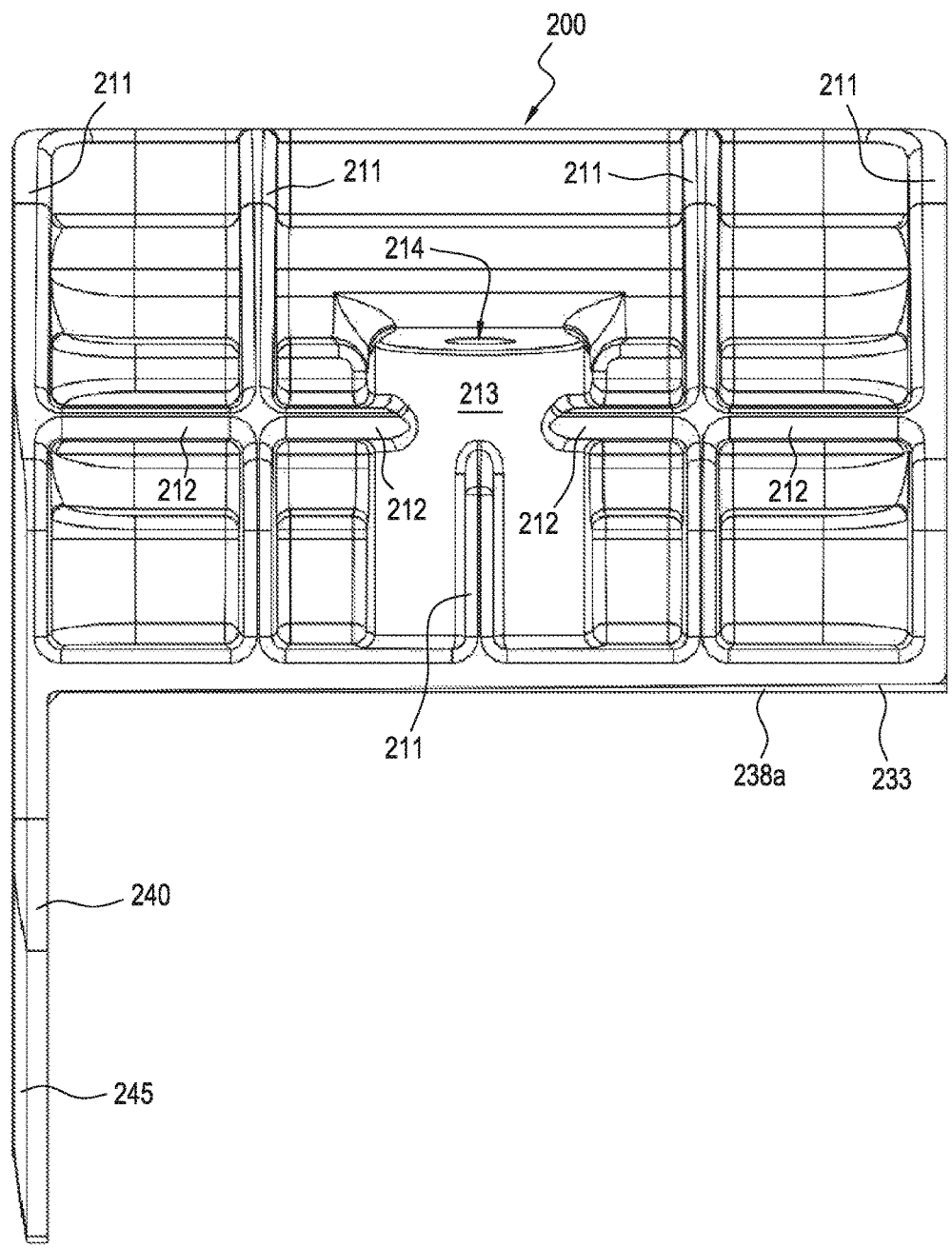
FIG. 33 is a top view of the bracket of FIG. 1, in accordance with an embodiment of the disclosed subject matter.

FIG. 33 is a top view of the bracket of FIGS. 1 and 8, in accordance with an embodiment of the disclosed subject matter. In FIG. 33, the cross rib portion 238a is shown extending and tapering down from a raised outer end toward the inside of the flange 240 to where the cross rib portion 238a becomes flush with the inside surface 233 of the body 230. As seen in FIG. 33, the entire top of each of the cross rib portions 238a-238h is at a substantially perpendicular angle to the inside surface of the flange 240 while the inside surface 233 of the body 230 adjacent to the inside surface of the flange 240 is substantially perpendicular to the inside surface of the flange 240, the inside surface 233 of the body 230 slopes away from the inside surface of the flange 240 at a slightly greater than perpendicular angle to the inside surface of the flange 240. For example, the inside surface 233 of the body 230 can be at about 1 degree greater than the perpendicular to the inside surface of the flange 240.

Figure 34:
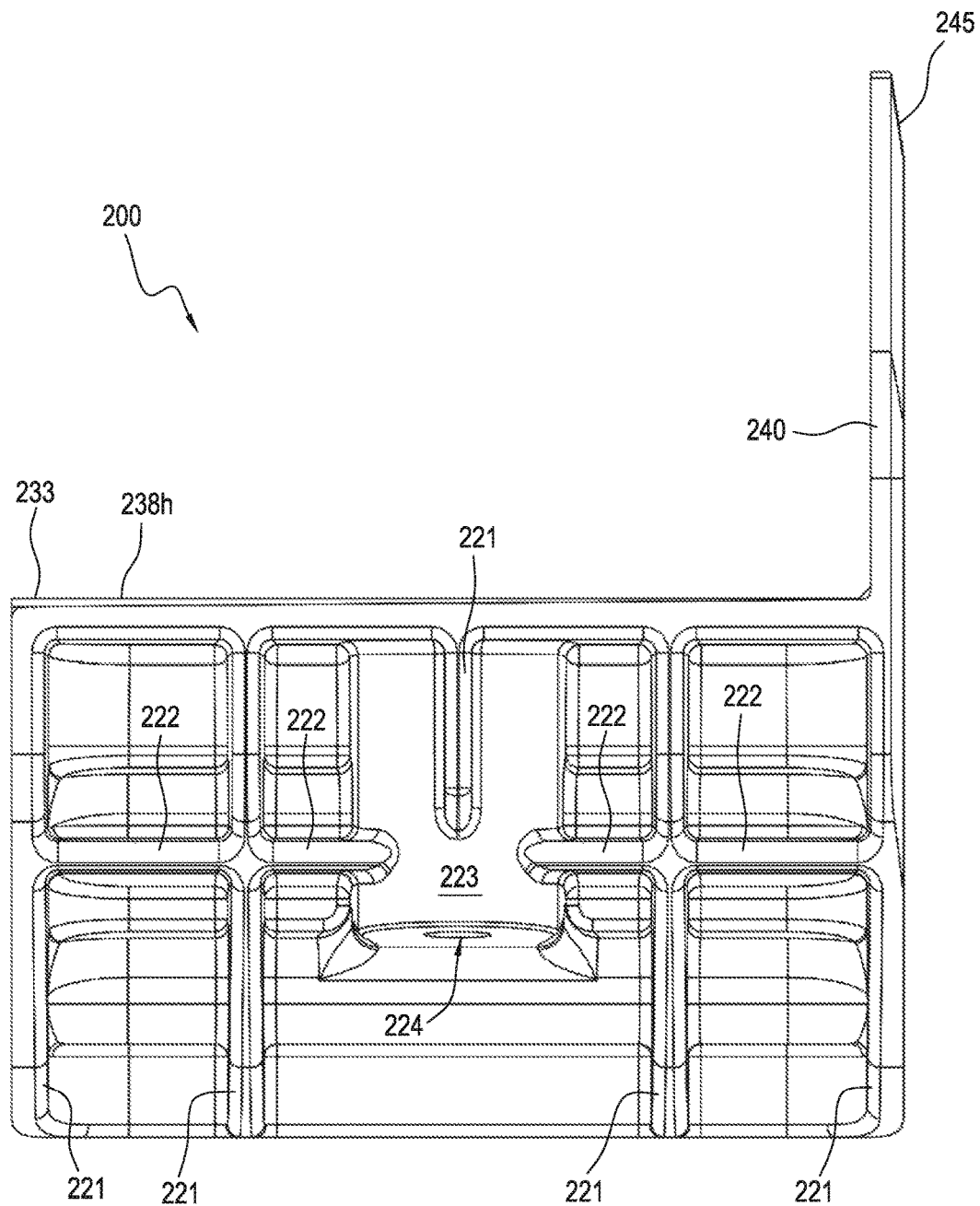
FIG. 34 is a bottom view of the bracket of FIG. 1, in accordance with an embodiment of the disclosed subject matter.

FIG. 34 is a bottom view of the bracket of FIGS. 1 and 8, in accordance with an embodiment of the disclosed subject matter. In FIG. 34, the cross rib portion 238h is shown extending and tapering down from a raised outer end toward the inside of the flange 240 to where the cross rib portion 238h becomes flush with the inside surface 233 of the body 230. As seen in FIG. 34, the entire top of each of the cross rib portions 238a-238h is at a substantially perpendicular angle to the inside surface of the flange 240 while the inside surface 233 of the body 230 adjacent to the inside surface of the flange 240 is substantially perpendicular to the inside surface of the flange 240, the inside surface 233 of the body 230 slopes away from the inside surface of the flange 240 at a slightly greater than perpendicular angle to the inside surface of the flange 240. For example, the inside surface 233 of the body 230 can be at about 1 degree greater than the perpendicular to the inside surface of the flange 240.

Figure 35:
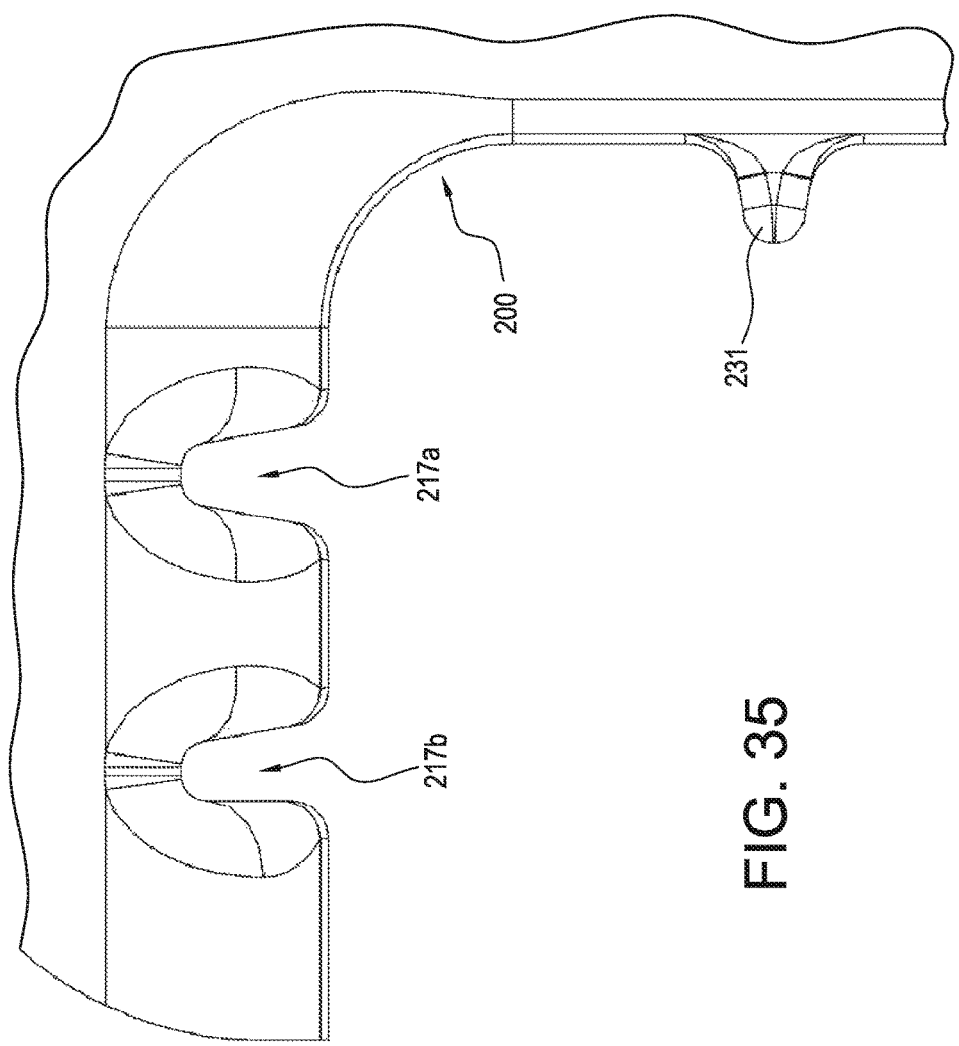
FIG. 35 is a close up view of area G from the bracket of FIG. 26, in accordance with an embodiment of the disclosed subject matter.

FIG. 35 is a close up view of area G from the bracket 200 of FIG. 26 showing the slightly different configurations of outer channel 217b and inner channel 217a, in accordance with an embodiment of the disclosed subject matter.

Figure 36:
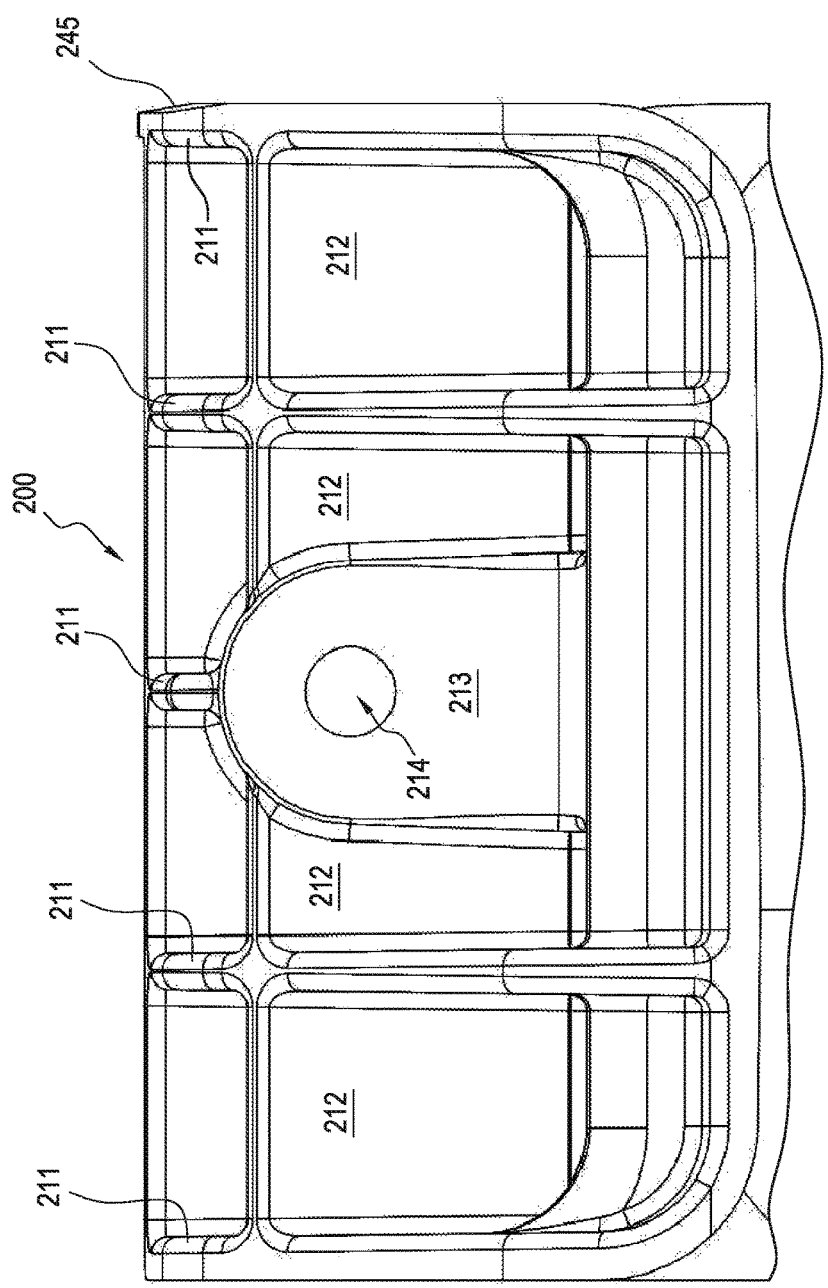
FIG. 36 is a close up view of area H from the bracket of FIG. 28, in accordance with an embodiment of the disclosed subject matter.

FIG. 36 is a close up view of area H from the bracket 200 of FIG. 28 showing details of the front of top arm 210, in accordance with an embodiment of the disclosed subject matter.

Figure 37:
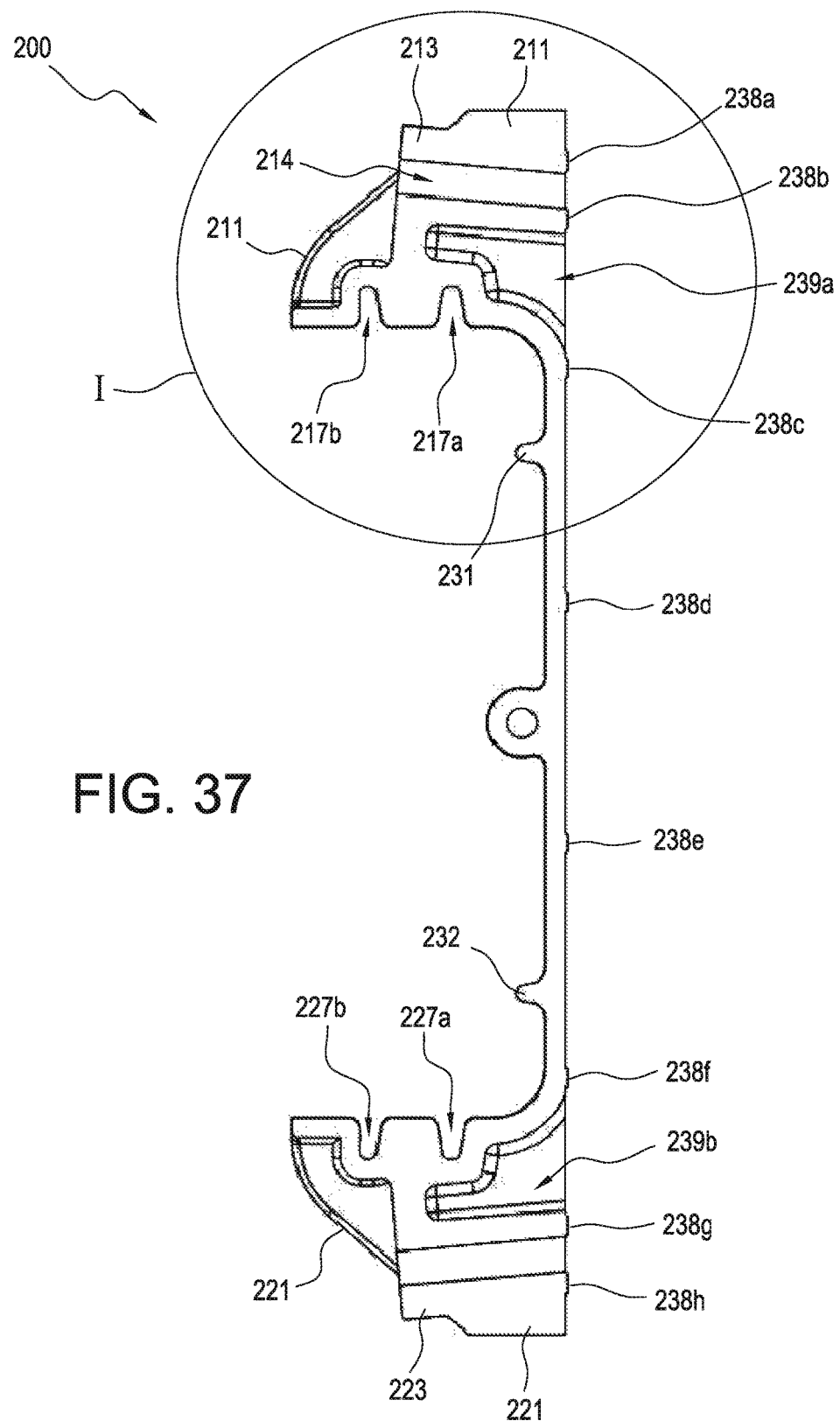
FIG. 37 is a cross sectional view along line 37-37 of the bracket of FIG. 28, in accordance with an embodiment of the disclosed subject matter.

FIG. 37 is a cross sectional view along line 37-37 of the bracket 200 of FIG. 28, in accordance with an embodiment of the disclosed subject matter. In FIG. 37, cross sections of the top enclosed opening 239a and the bottom enclosed opening 239b are shown.

Figure 38:
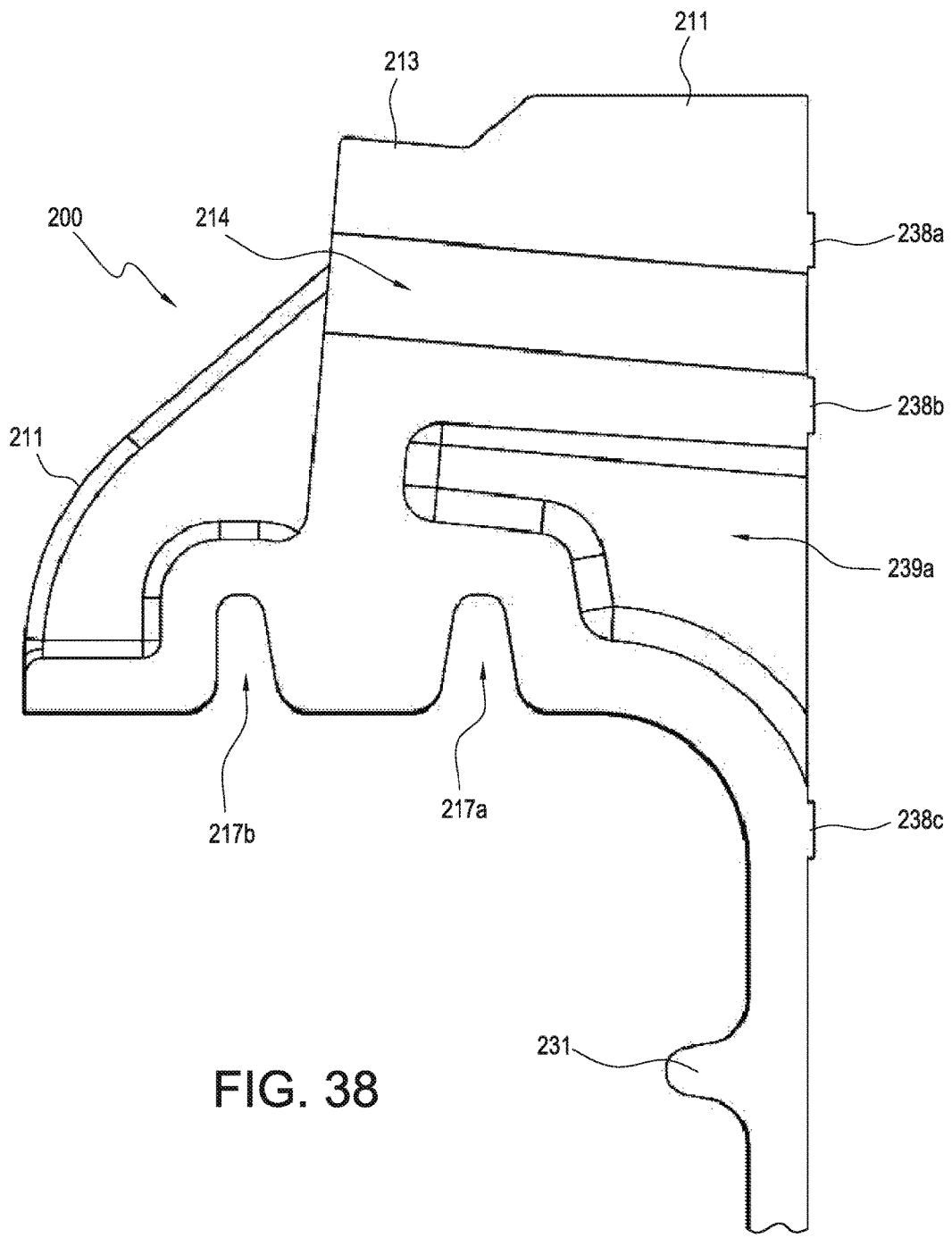
FIG. 38 is a close up view of area I from the bracket of FIG. 37, in accordance with an embodiment of the disclosed subject matter.

FIG. 38 is a close up view of area I from the bracket 200 of FIG. 37, in accordance with an embodiment of the disclosed subject matter.

Figure 39:
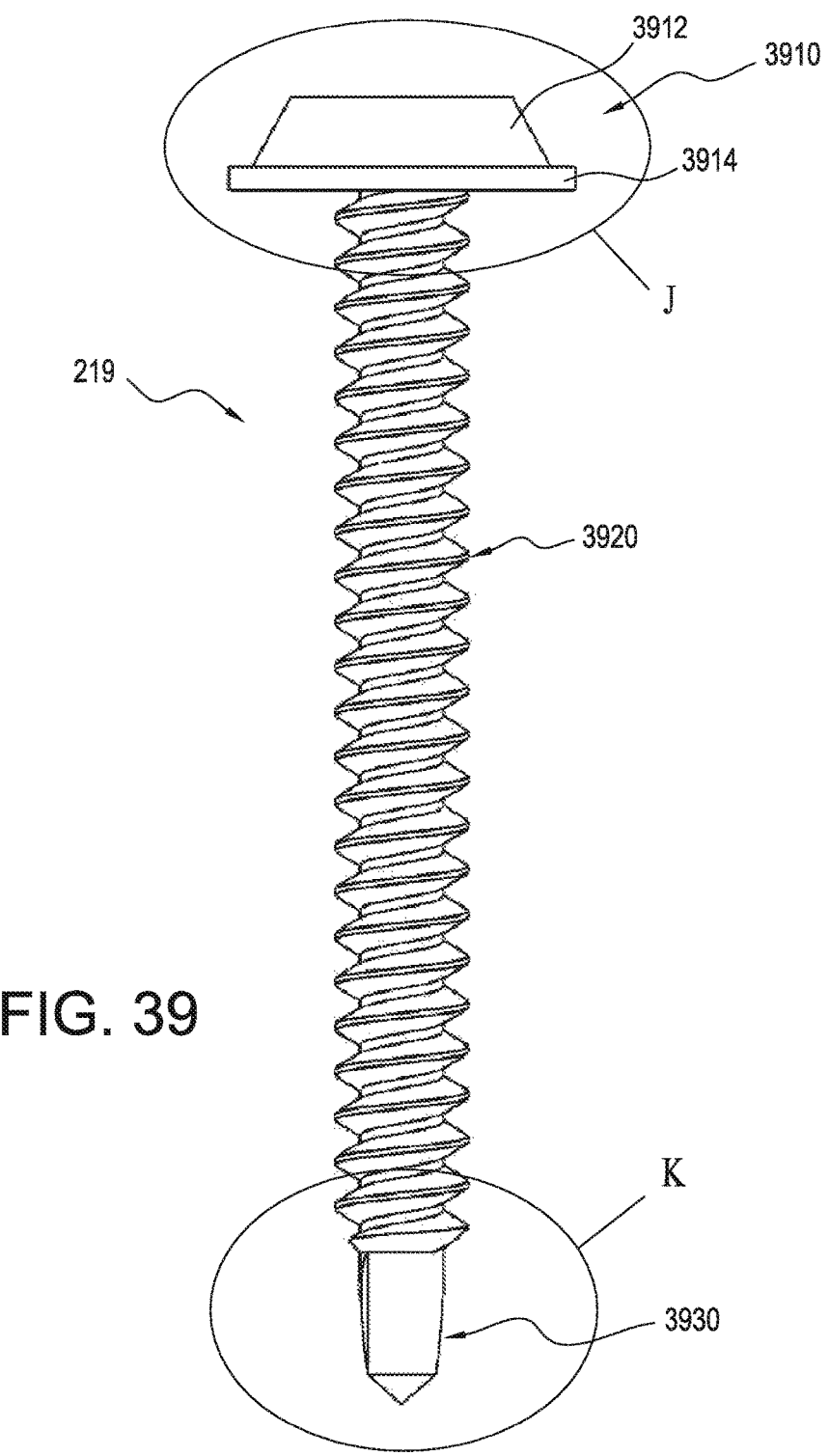
FIG. 39 is a longitudinal side view of a fastening screw of FIG. 1, in accordance with an embodiment of the disclosed subject matter.

FIG. 39 is a longitudinal side view of the fastening screws 219, 229 of FIGS. 1 and 8, in accordance with an embodiment of the disclosed subject matter. In FIG. 39, the fastening screw 219, which is identical to the fastening screw 229 includes a pan head 3910 which is connected on a bottom side to a top end of a threaded body portion 3920 and a bottom end of the threaded body portion 3920 is connected to a top end of a drill tip 3930.

Figure 40:
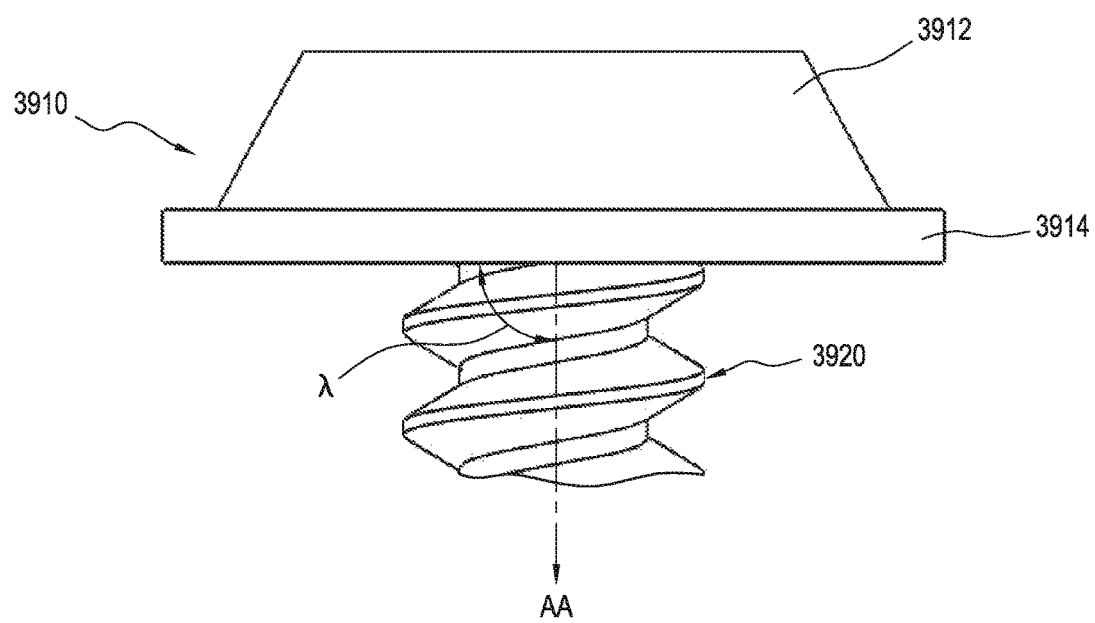
FIG. 40 is a close up view of area J from the fastening screw of FIG. 39, in accordance with an embodiment of the disclosed subject matter.

FIG. 40 is a close up view of area J from the fastening screw 219 of FIG. 39, in accordance with an embodiment of the disclosed subject matter. In FIG. 40, the pan head 3910 includes a top cap portion 3912 that has an enlarged bottom flange portion 3914 extending outwardly from a bottom end of the top cap portion 3912 and at a substantially perpendicular angle $\lambda$ to an axis AA of the threaded body portion 3920. The large bottom surface of the enlarged bottom flange portion 3914 helps to reduce stress on the plastic in the bracket 200.

Figure 41:
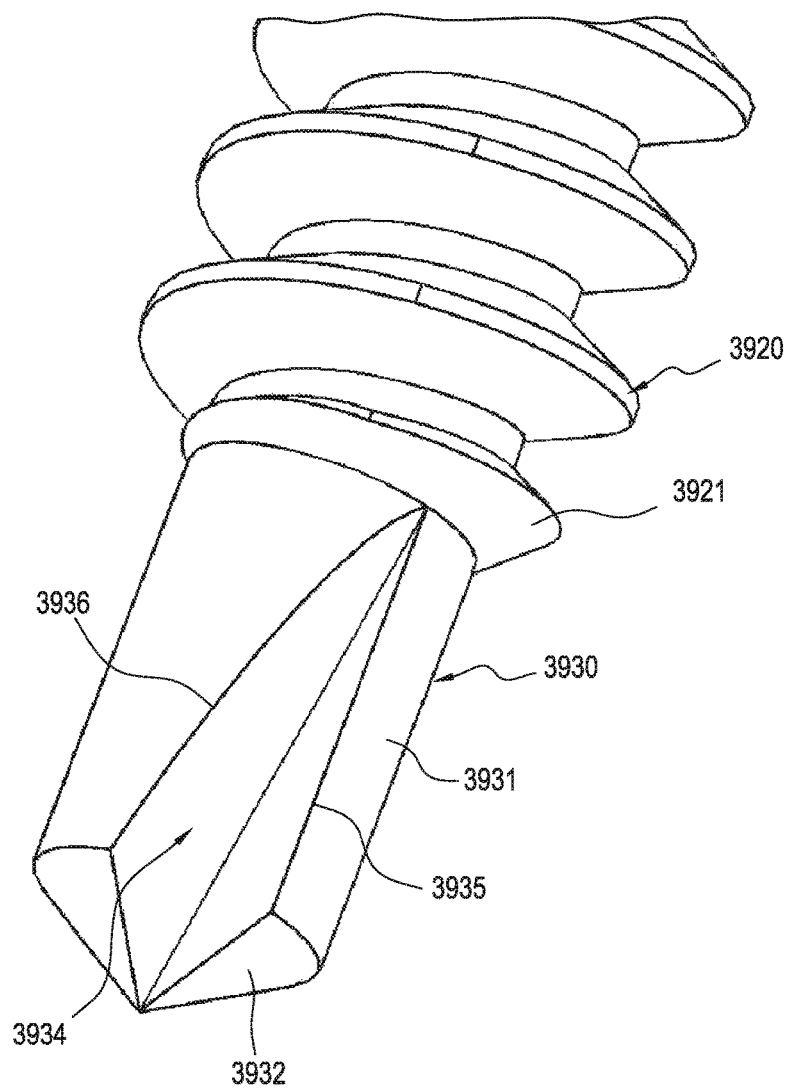
FIG. 41 is a close up view of area K from the fastening screw of FIG. 39, in accordance with an embodiment of the disclosed subject matter.

FIG. 41 is a close up view of area K from the fastening screw 219 of FIG. 39, in accordance with an embodiment of the disclosed subject matter. In FIG. 41, the drill tip 3930 includes a body portion 3931, a pointed domed end portion 3932 and a drill groove 3934 that begins at a top point of the pointed domed end portion 3932 extends down to bottom edges of the pointed domed end portion 3932 to form an opening with an arc of about between 85 to 95 degrees. A first edge 3935 of the drill groove extends in a substantially straight line from the bottom edge of the pointed domed end portion 3932 and up the body of the drill tip 3930 toward and ends at a point against a bottom thread 3921 of the threaded body portion 3920. A second edge 3936 of the drill groove extends in an arc from the bottom edge of the pointed domed end portion 3932 and up the body of the drill tip 3930 toward and meets the end of the first straight line 3935 and ends at the point at the bottom thread 3921 of the threaded body portion 3920.

Figure 42:
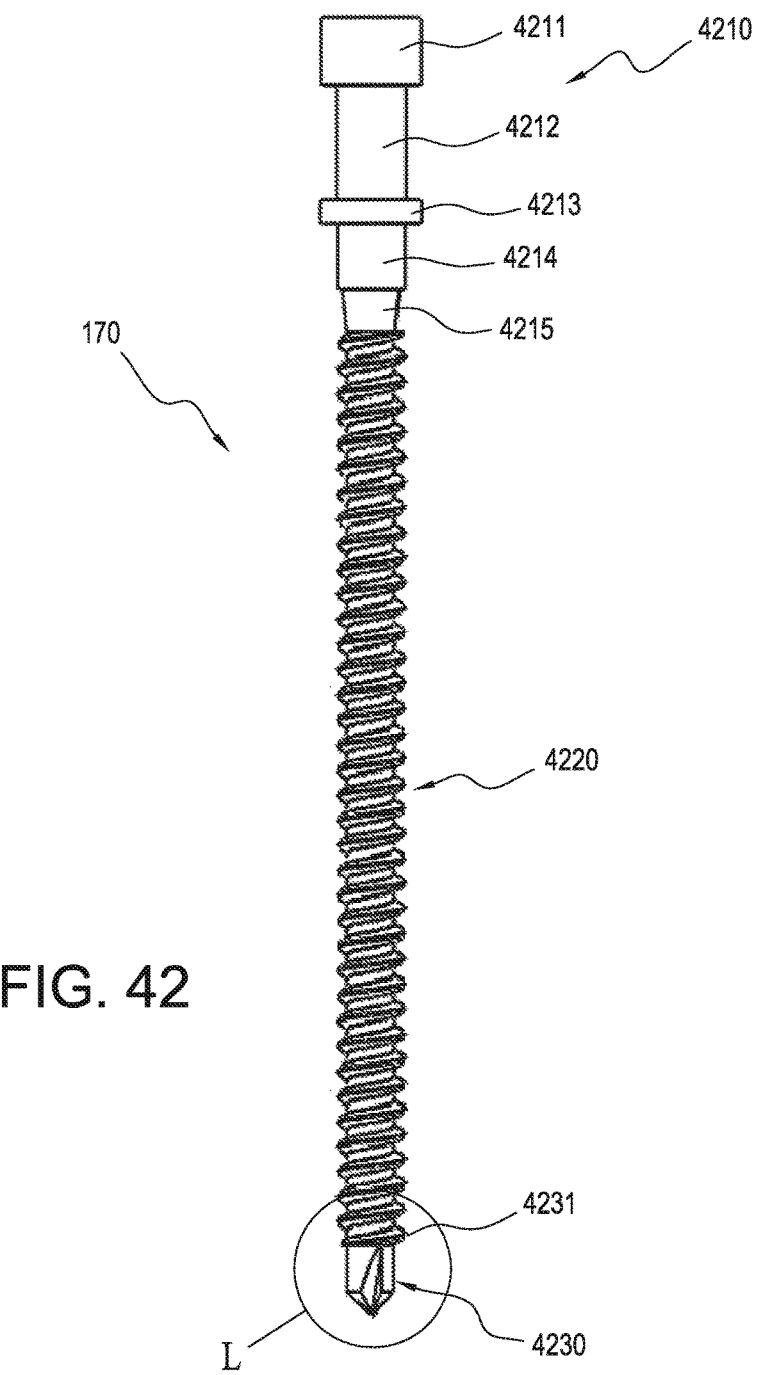
FIG. 42 is a longitudinal side view of an adjusting screw of FIG. 1, in accordance with an embodiment of the disclosed subject matter.

FIG. 42 is a longitudinal side view of the adjusting screw 170 of FIGS. 1 and 8, in accordance with an embodiment of the disclosed subject matter. In FIG. 42, the adjusting screw 170 includes a head portion 4210, a threaded body portion 4220 and a drill tip 4230. The head portion 4210 includes a top portion 4211 connected to an upper body portion 4212, which is connected to a flange 4213, which is connected to a lower body portion 4214, which is connected to a tapered bottom portion 4215. Although not shown here, the upper body portion 4212 is adapted and configured to rotably connect with the collar 128 of the positioning section 126 of the central groove 124 in the first sidewall 120 of the electrical box 100 as best seen in FIG. 13. The head portion 4210 is positioned in a front end portion of the central groove 124 in and against a front end of the collar 128 and the flange 4213 is positioned on and against a back end of the collar 128, both of which permit the adjusting screw 170 to rotate within the collar and the central channel 124 and prevent the entire adjusting screw 170 from moving forward or backward in the central groove 124. Returning to FIG. 42, a bottom end of the tapered bottom portion 4215 connects with a top end of the threaded body portion 4220 and a bottom end of the threaded body portion 4220 connects to a top end of the drill tip 4230. When the threaded body 4220 is engaged with the channel 235 of the raised cylindrical body 234 on the inside surface 236 of the bracket body 230, the narrower bottom end of the tapered bottom portion 4215 can enter the channel 235 up to the top of the channel 235 where the front end of the raised cylindrical body 234 will contact the back end of the bottom body portion 4214 and not permit the adjustable screw 170 to proceed any further into the channel 235.

Figure 43:
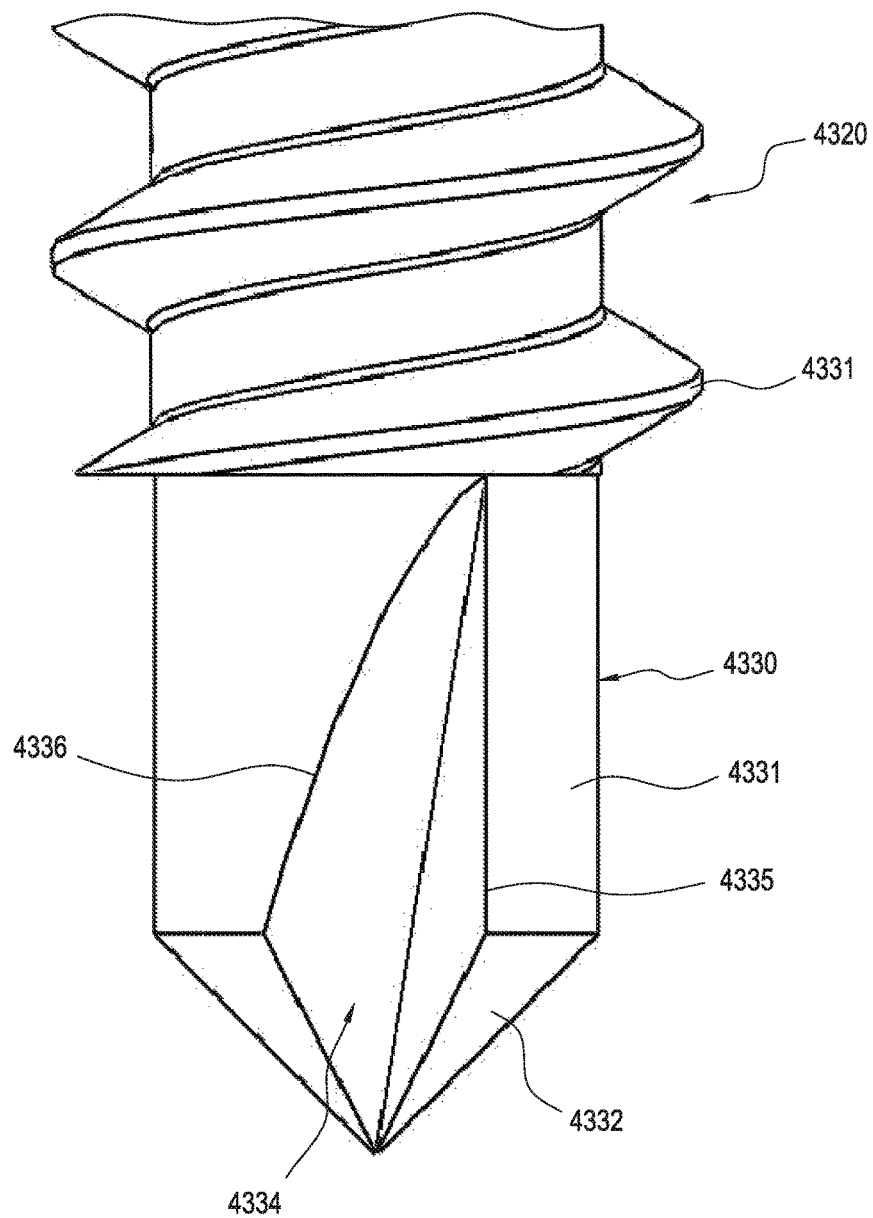
FIG. 43 is a close up view of area L from the adjusting screw of FIG. 42, in accordance with an embodiment of the disclosed subject matter.

FIG. 43 is a close up view of area L from the adjusting screw 170 of FIG. 42, in accordance with an embodiment of the disclosed subject matter. In FIG. 43, the drill tip 4330 includes a body portion 4331, a pointed domed end portion 4332 and a drill groove 4334 that begins at a top point of the pointed domed end portion 4332 extends down to bottom edges of the pointed domed end portion 4332 to form an opening with an arc of about between 85 to 95 degrees. A first edge 4335 of the drill groove extends in a substantially straight line from the bottom edge of the pointed domed end portion 4332 and up the body of the drill tip 4330 toward and ends at a point against a bottom thread 4321 of the threaded body portion 4320. A second edge 4336 of the drill groove extends in an arc from the bottom edge of the pointed domed end portion 4332 and up the body of the drill tip 4330 toward and meets the end of the first straight line 4335 and ends at the point at the bottom thread 4321 of the threaded body portion 4320.

Figure 44:
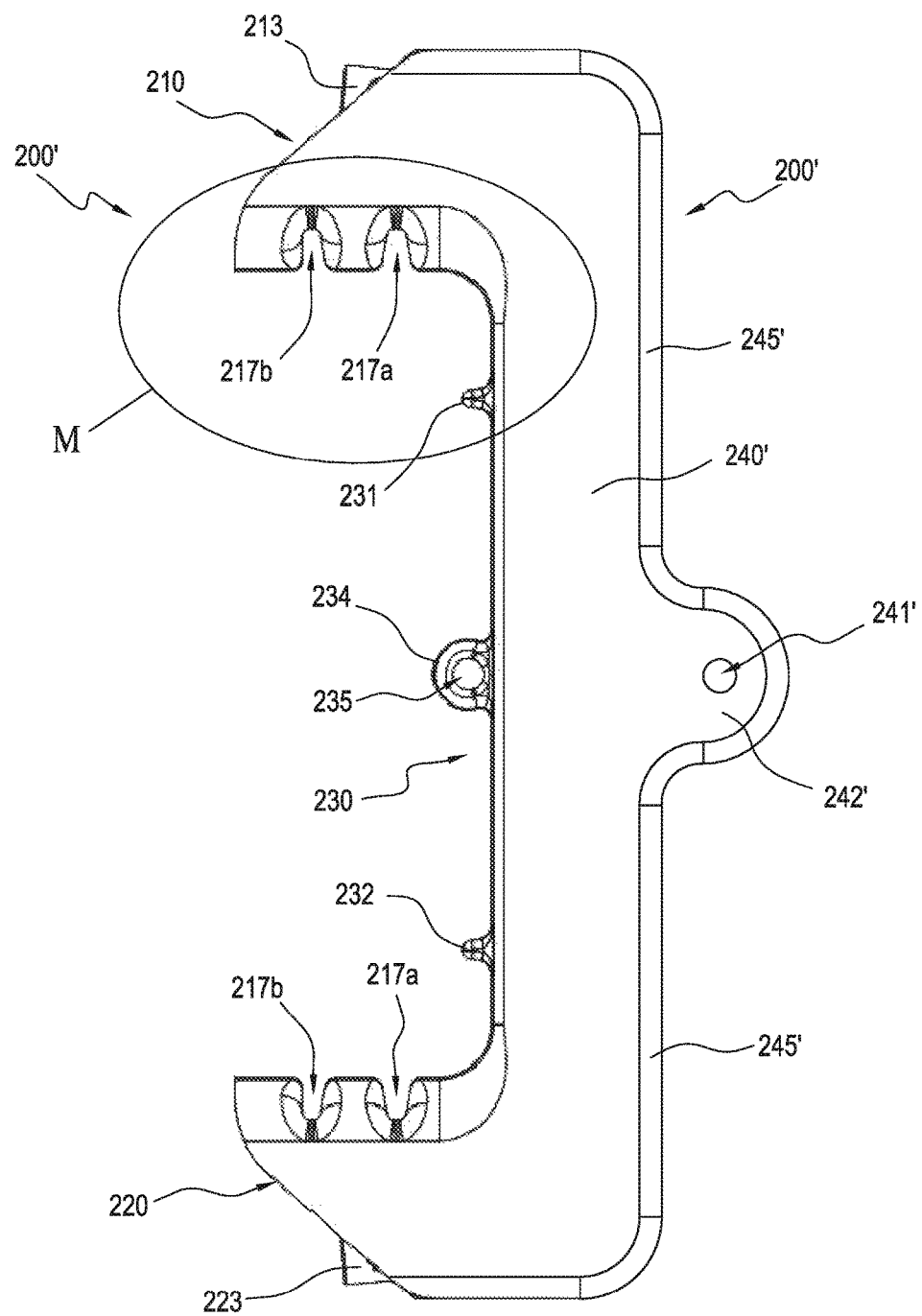
FIG. 44 is a right or flange side view of a bracket, in accordance with another embodiment of the disclosed subject matter.

FIG. 44 is a right or flange side view of a bracket, in accordance with another embodiment of the disclosed subject matter. In FIG. 44, a bracket 200', which is substantially identical to the bracket 200, except for the configuration of a flange 240', a tapered flange edge 245', and a central hole 241'. All other elements of the bracket 200' are the same as the bracket 200 from FIG. 1, so the same reference numbers will be used in FIGS. 44 to 58. The bracket 240' includes a short, substantially rectangular body with a tapered flange edge 245' and a substantially semi-circular extension 242' in about the middle of the flange 240' and the central hole 241' is formed in and through the semi-circular extension 242'. The central hole 241' is used as an alignment indicator and a nail location to temporarily hold the bracket 200' and/or the entire bracket and electrical box assembly 10.

Figure 45:
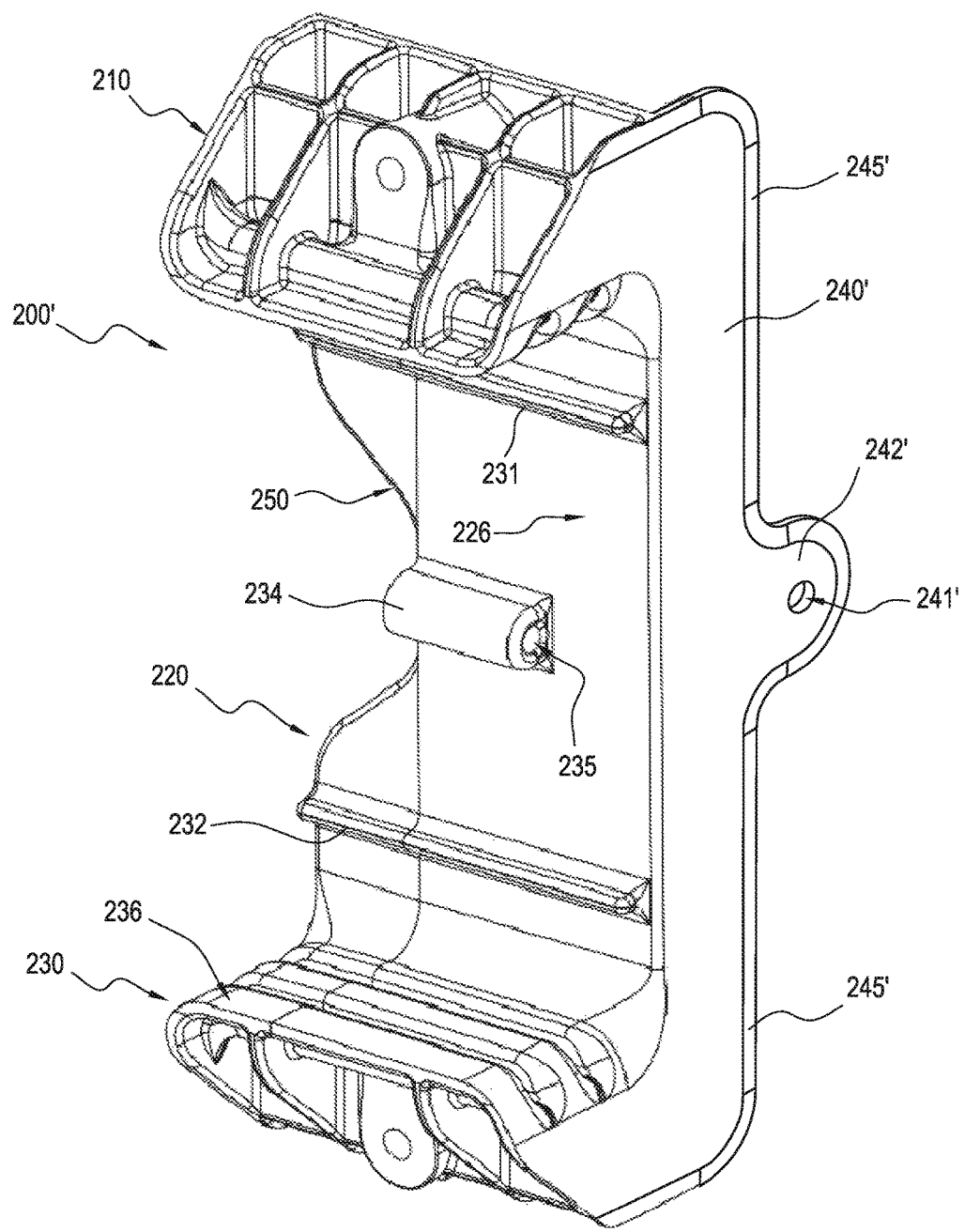
FIG. 45 is a top right, front perspective view of the bracket of FIG. 44, in accordance with another embodiment of the disclosed subject matter.

FIG. 45 is a top right, front perspective view of the bracket 200' of FIG. 44, in accordance with another embodiment of the disclosed subject matter. In FIG. 45, a portion of the backside edge 250 of the body 230 has a downwardly and inwardly curved top half starting from just below the top raised rail or rib 231 and curving downwardly and inwardly toward and even with a backside face of the raised cylindrical portion 234. Likewise, the portion of the backside edge 250 of the body 230 has an upwardly and inwardly curved bottom half starting from just above the bottom raised rail or rib 232 and curving upwardly and inwardly toward and even with a backside face of the raised cylindrical portion 234.

Figure 46:
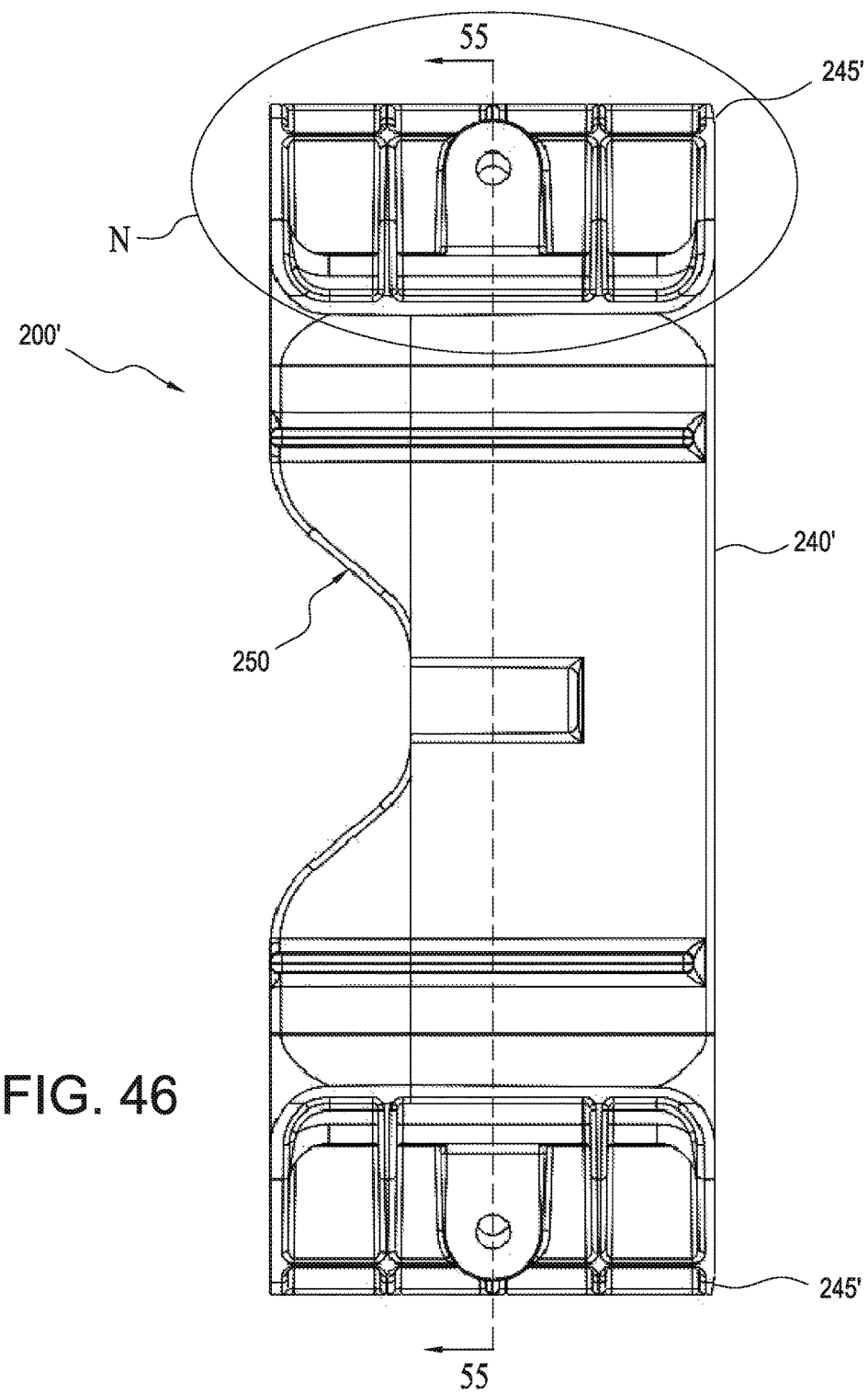
FIG. 46 is a front view of the bracket of FIG. 44, in accordance with another embodiment of the disclosed subject matter.

FIG. 46 is a front view of the bracket 200' of FIG. 44, in accordance with another embodiment of the disclosed subject matter. In FIG. 46, the complete curvature of the portion of the backside edge 250 of the body 230 is more clearly shown. In addition, the slight outside taper 245 of the top and bottom of the flange 240 is shown.

Figure 47:
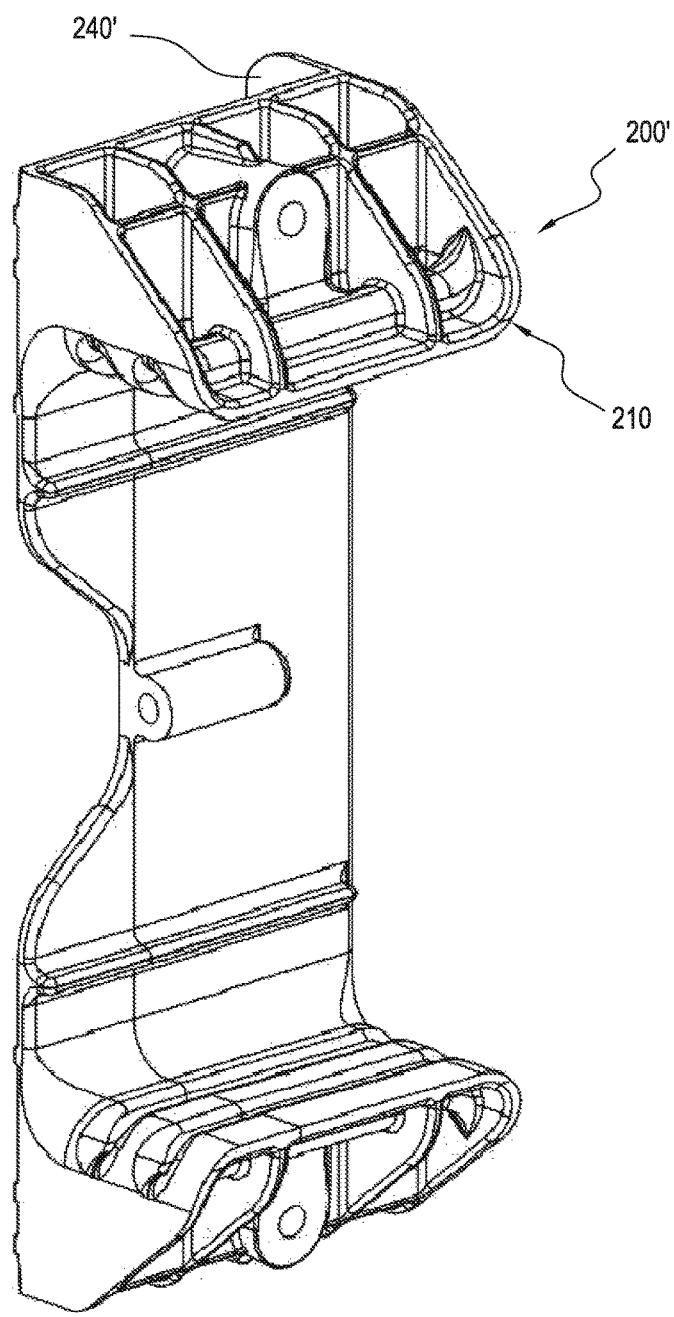
FIG. 47 is a top left, front perspective view of the bracket of FIG. 44, in accordance with another embodiment of the disclosed subject matter.

FIG. 47 is a top left, front perspective view of the bracket 200' of FIG. 44, in accordance with another embodiment of the disclosed subject matter. In FIG. 47, the positioning and thickness of the backside edge 250 of the body 230 is more clearly shown.

Figure 48:
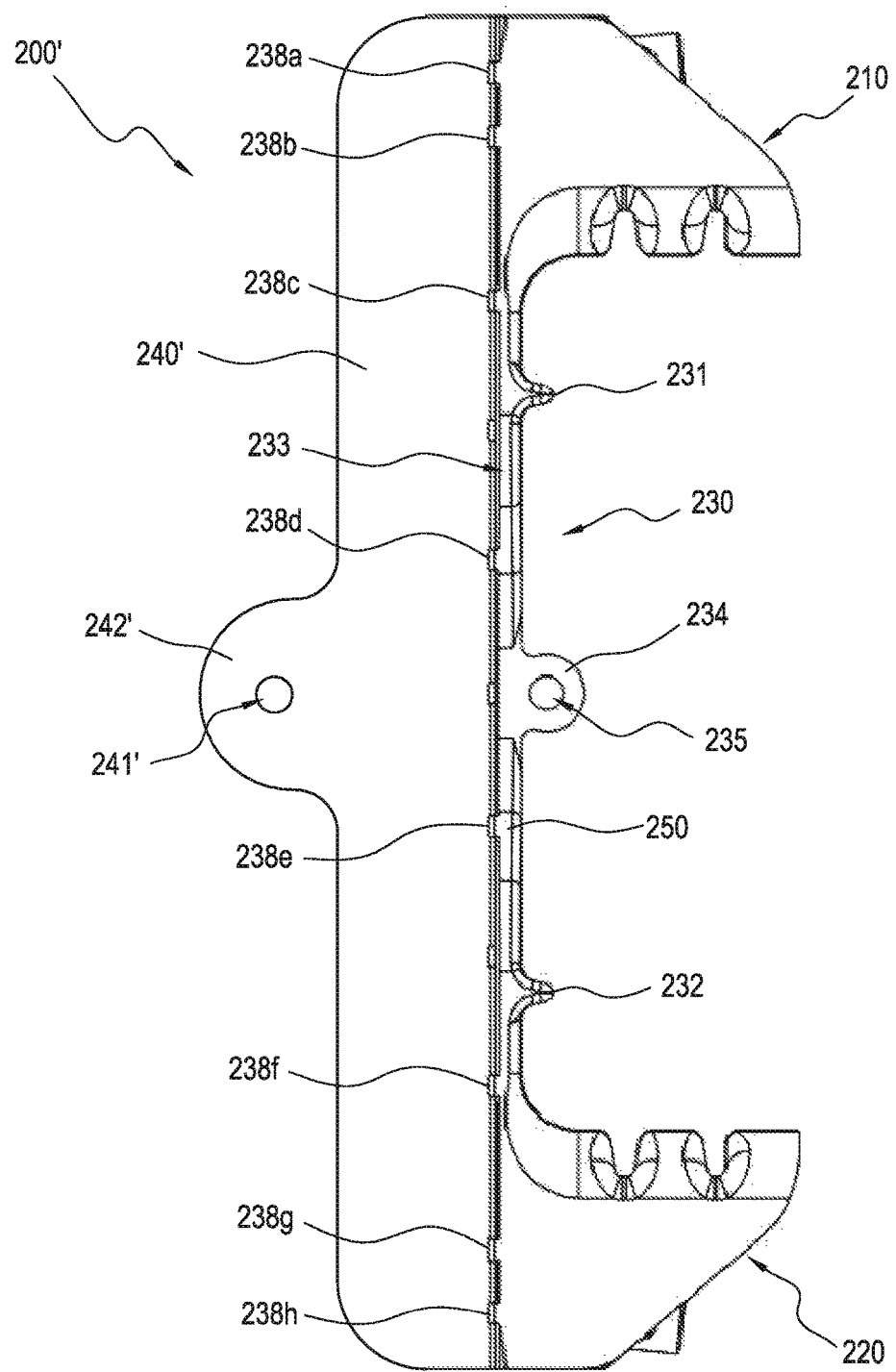
FIG. 48 is a left or non-flange side view of the bracket of FIG. 44, in accordance with another embodiment of the disclosed subject matter.

FIG. 48 is a left or non-flange side view of the bracket 200' of FIG. 44, in accordance with another embodiment of the disclosed subject matter. In FIG. 48, the backside of the fastener opening 241' are shown in the flange 240' and the outside ends of multiple cross rib portions 238a-238h are shown on and space across the outside surface 233 of the body 230.

Figure 49:
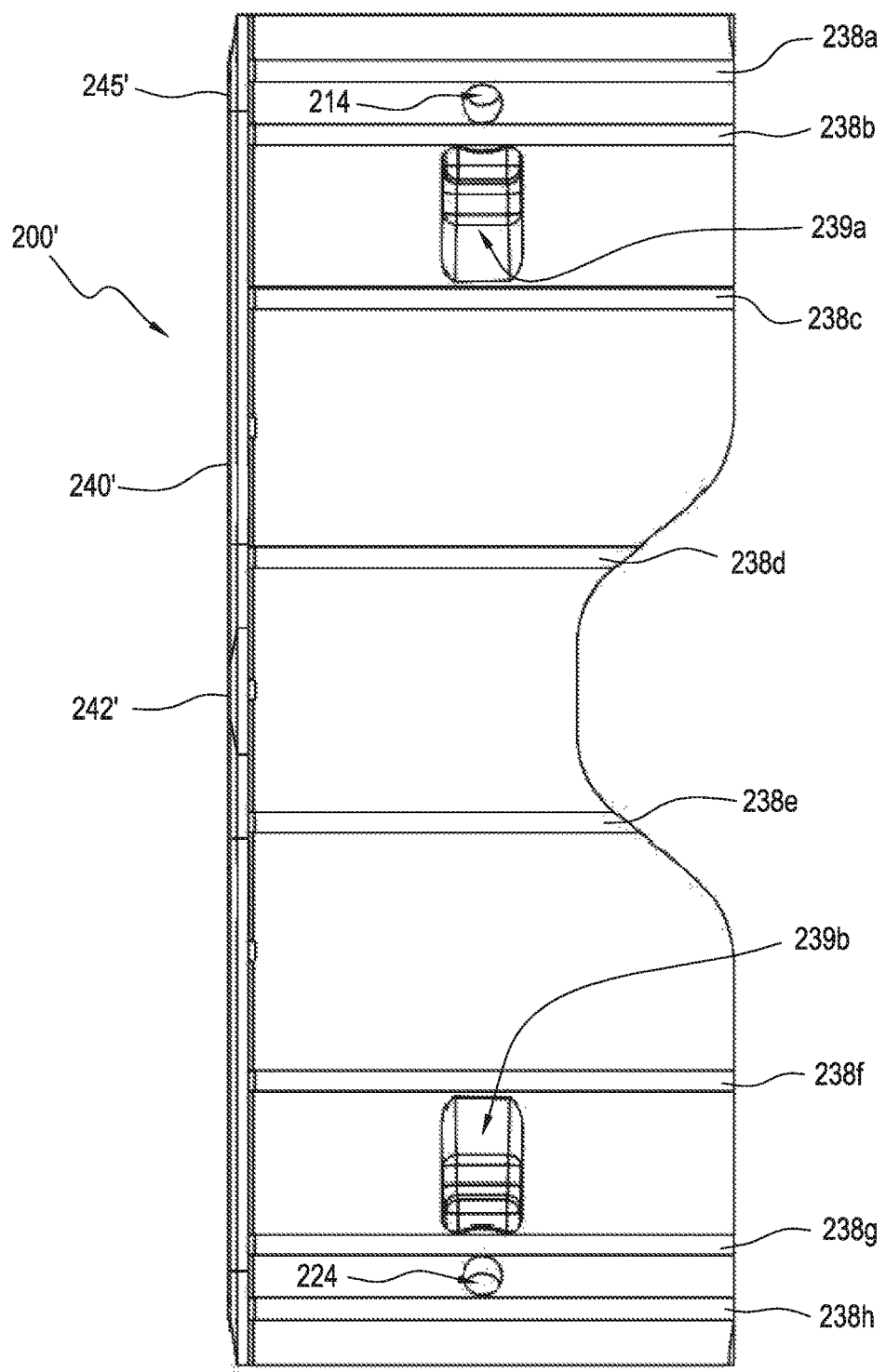
FIG. 49 is a front view of the bracket of FIG. 44, in accordance with another embodiment of the disclosed subject matter.

FIG. 49 is a front view of the bracket of FIG. 44, in accordance with another embodiment of the disclosed subject matter. In FIG. 44, the body 230 includes the multiple cross rib portions 238a-238h that are formed on and extend across the back surface 233, extend out from and are spaced along the length or height of the backside surface 233 of the body 230 and provide additional strength and stability to the body 230 and the bracket 200. At the outside edge of the body surface, each cross rib has a substantially rectangular cross section and a substantially flat top. In addition, the top enclosed opening 239a under the top positioning portion 213 is formed in the back surface 233 and extends into and below the top positioning portion 213. The top enclosed opening 239a is positioned between cross rib portions 238b and 238c. Similarly, the bottom enclosed opening 239b above the bottom positioning portion 223 is formed in the back surface 233 and extends into and above the bottom positioning portion 223. The bottom enclosed opening 239b is positioned between cross rib portions 238f and 238g. The backside of the opening of the top channel 214 is formed in the back surface 233 and is positioned between cross rib portions 238a and 238b, and the backside of the opening of the bottom channel 224 is formed in the back surface 233 and is positioned between cross rib portions 238g and 238h.

Figure 50:
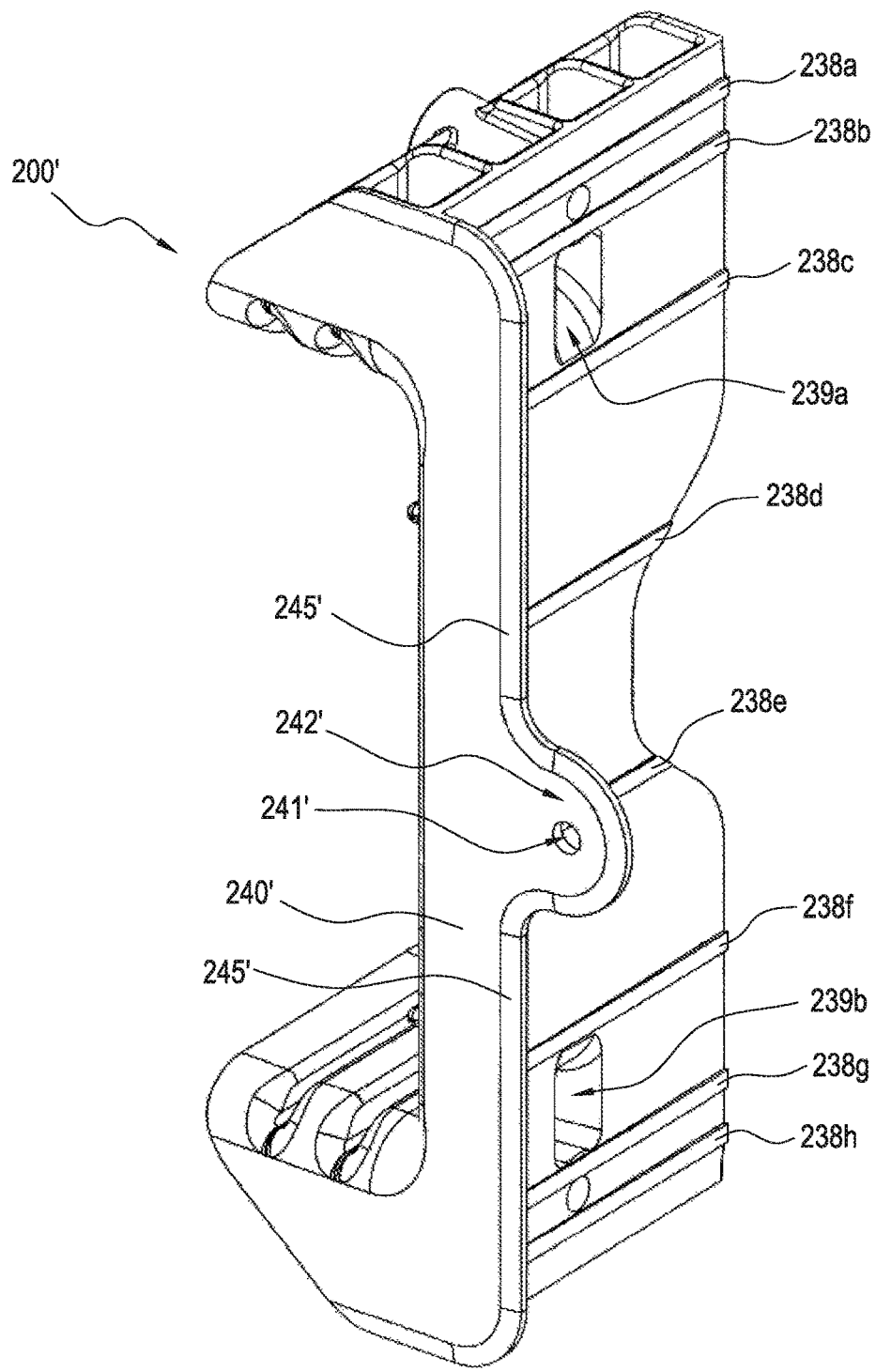
FIG. 50 is a top right, rear perspective view of the bracket of FIG. 44, in accordance with another embodiment of the disclosed subject matter.
Figure 52:
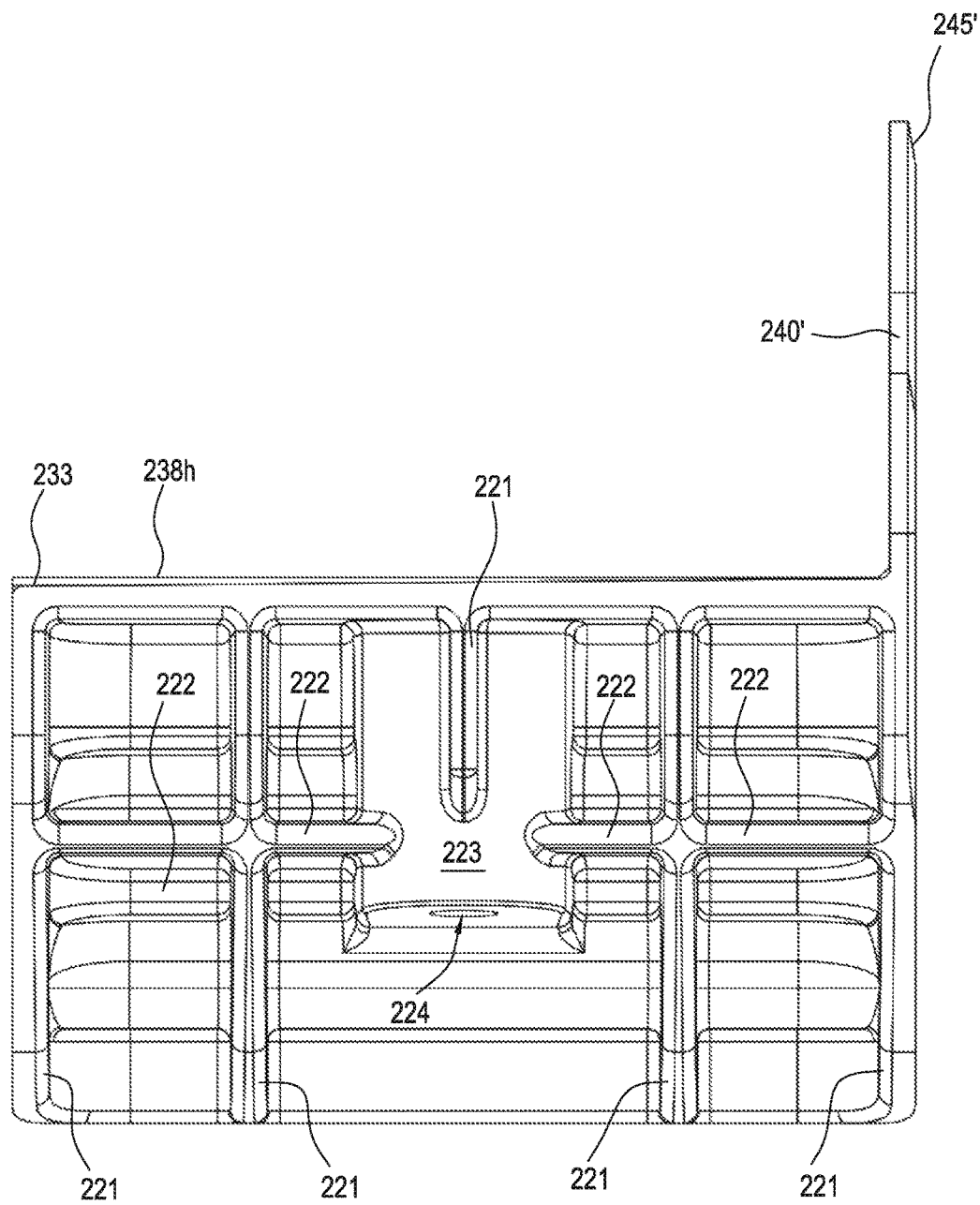
FIG. 52 is a bottom view of the bracket of FIG. 44, in accordance with another embodiment of the disclosed subject matter.

FIG. 50 is a top right, rear perspective view of the bracket 200' of FIG. 44, in accordance with another embodiment of the disclosed subject matter. In FIG. 52, the inside surface of the top enclosed opening 239a is seen sloping and curving upwardly toward the front of the top arm 210.

Figure 51:
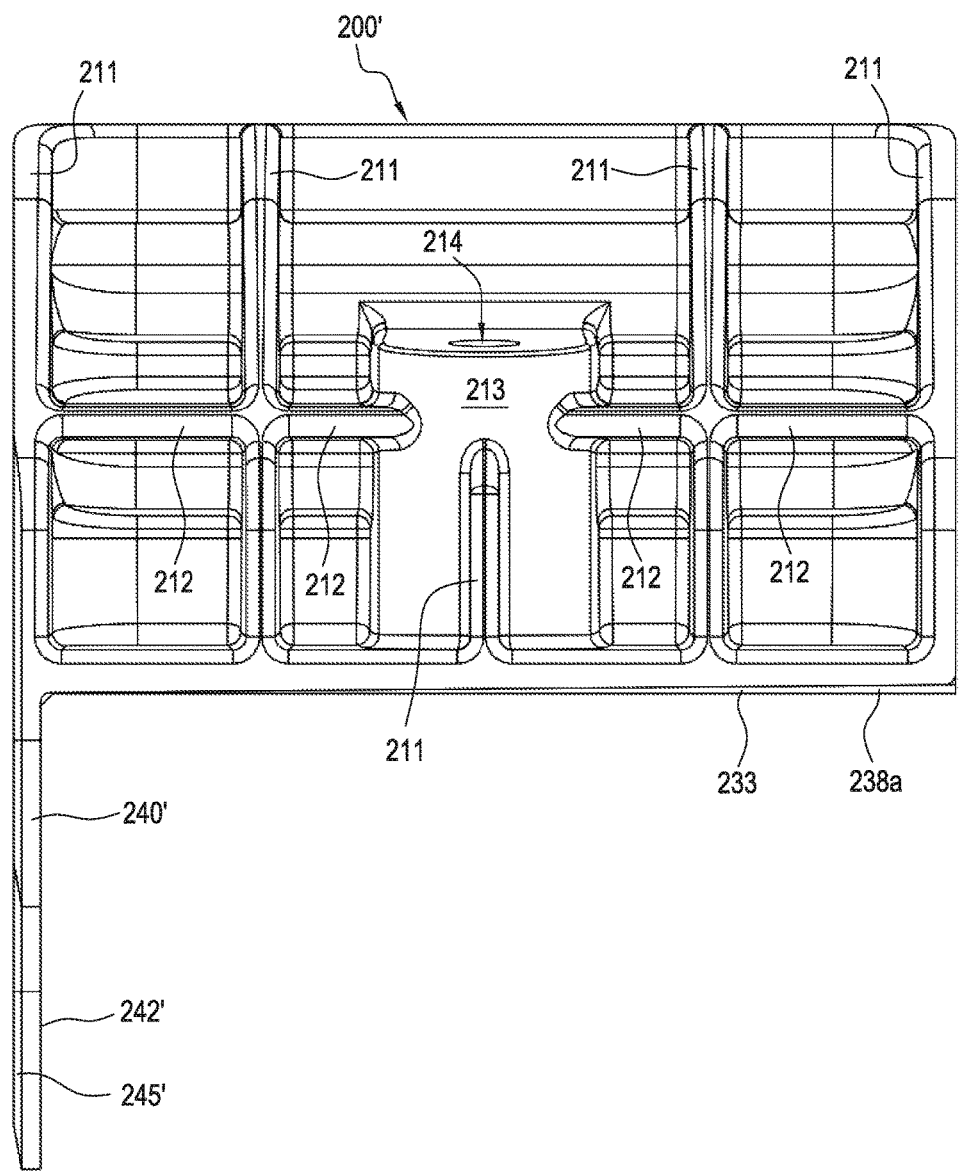
FIG. 51 is a top view of the bracket of FIG. 44, in accordance with another embodiment of the disclosed subject matter.

FIG. 51 is a top view of the bracket of FIG. 44, in accordance with another embodiment of the disclosed subject matter. In FIG. 51, the cross rib portion 238a is shown extending and tapering down from a raised outer end toward the inside of the flange 240' to where the cross rib portion 238a becomes flush with the inside surface 233 of the body 230. As seen in FIG. 51, the entire top of each of the cross rib portions 238a-238h is at a substantially perpendicular angle to the inside surface of the flange 240' while the inside surface 233 of the body 230 adjacent to the inside surface of the flange 240' is substantially perpendicular to the inside surface of the flange 240', the inside surface 233 of the body 230 slopes away from the inside surface of the flange 240' at a slightly greater than perpendicular angle to the inside surface of the flange 240'. For example, the inside surface 233 of the body 230 can be at about 1 degree greater than the perpendicular to the inside surface of the flange 240'.

FIG. 52 is a bottom view of the bracket of FIG. 44, in accordance with another embodiment of the disclosed subject matter. In FIG. 52, the cross rib portion 238h is shown extending and tapering down from a raised outer end toward the inside of the flange 240' to where the cross rib portion 238h becomes flush with the inside surface 233 of the body 230. As seen in FIG. 52, the entire top of each of the cross rib portions 238a-238h is at a substantially perpendicular angle to the inside surface of the flange 240' while the inside surface 233 of the body 230 adjacent to the inside surface of the flange 240' is substantially perpendicular to the inside surface of the flange 240', the inside surface 233 of the body 230 slopes away from the inside surface of the flange 240' at a slightly greater than perpendicular angle to the inside surface of the flange 240'. For example, the inside surface 233 of the body 230 can be at about 1 degree greater than the perpendicular to the inside surface of the flange 240'.

Figure 53:
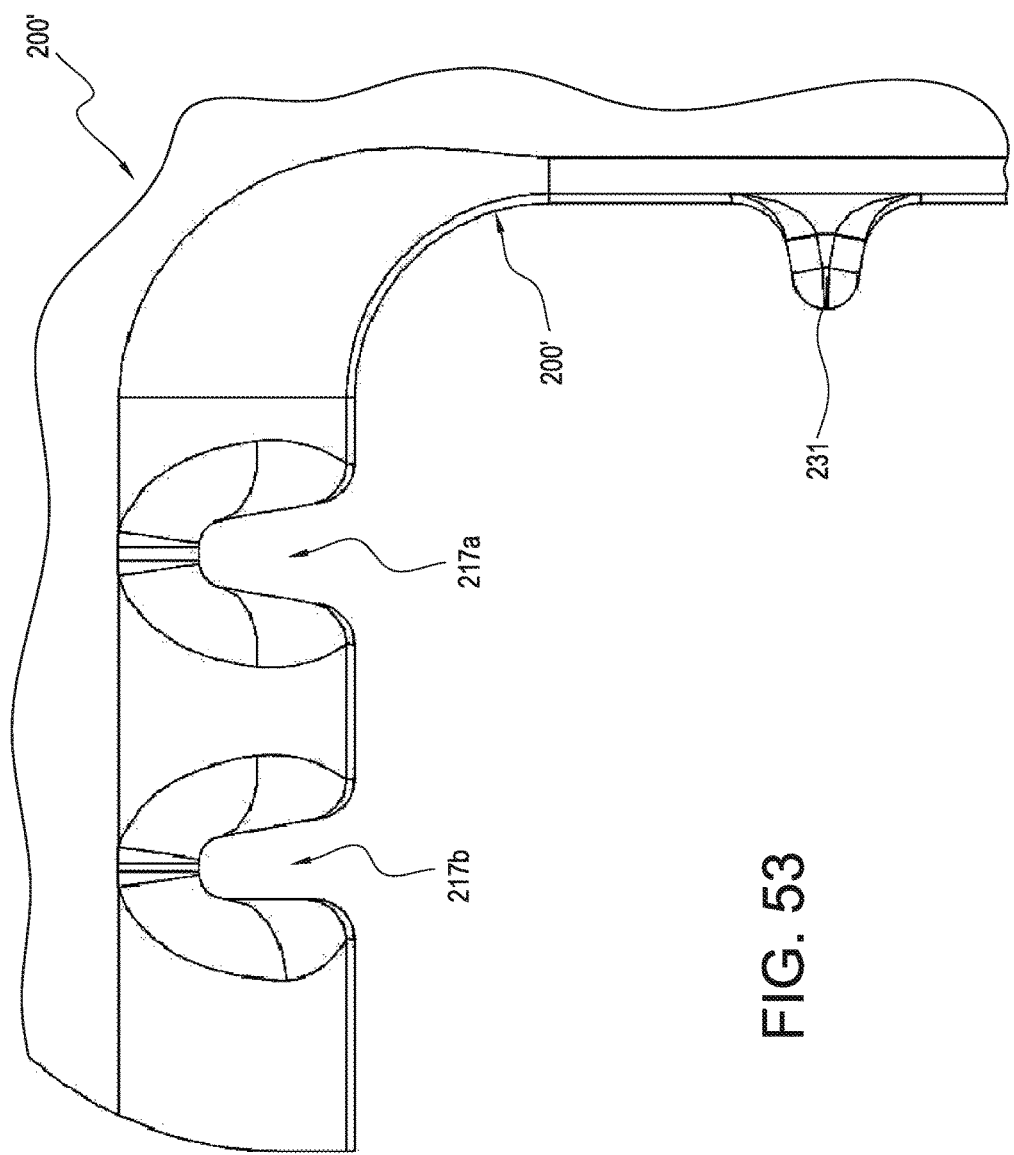
FIG. 53 is a close up view of area M from the bracket of FIG. 26, in accordance with another embodiment of the disclosed subject matter.

FIG. 53 is a close up view of area M from the bracket 200' of FIG. 44 showing the slightly different configurations of outer channel 217b and inner channel 217a, in accordance with another embodiment of the disclosed subject matter.

Figure 54:
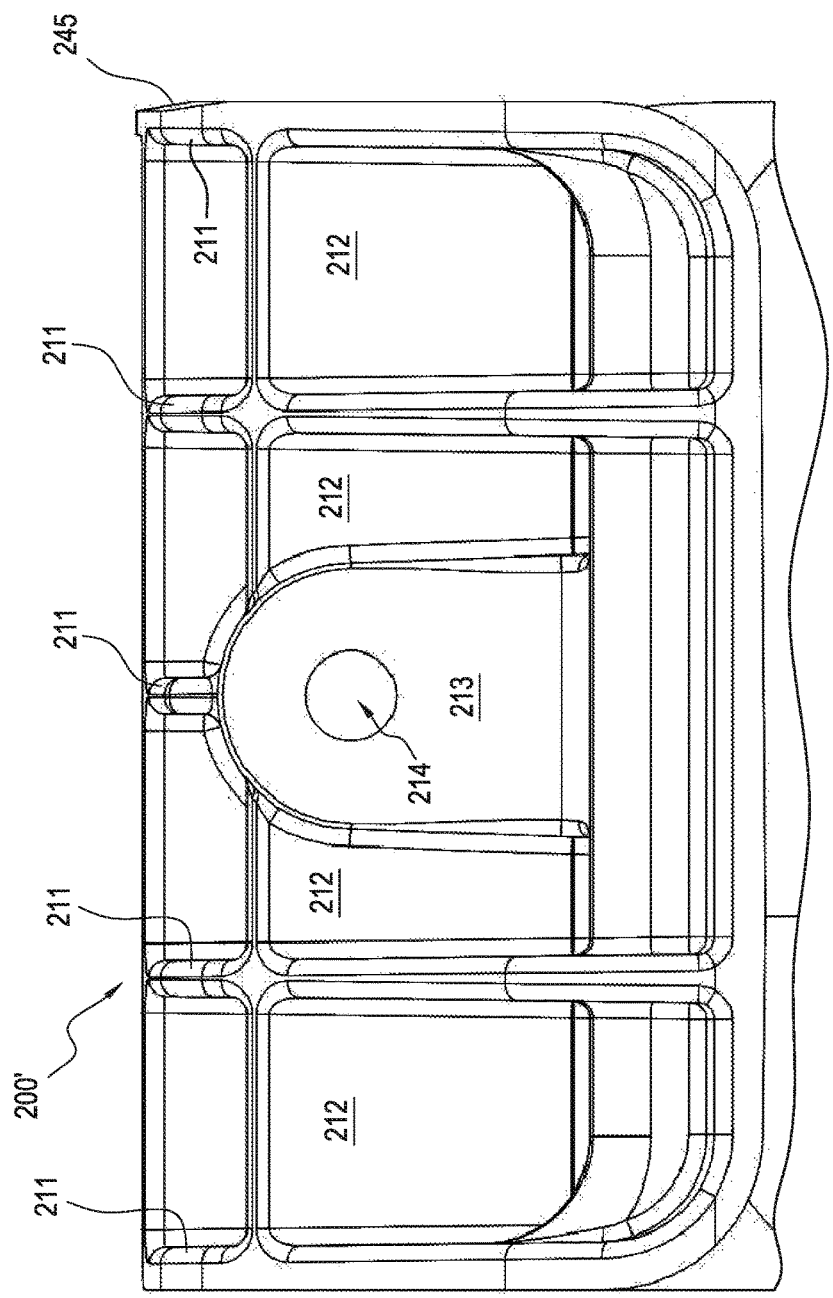
FIG. 54 is a close up view of area N from the bracket of FIG. 46, in accordance with another embodiment of the disclosed subject matter.

FIG. 54 is a close up view of area N from the bracket 200' of FIG. 46 showing details of the front of top arm 210, in accordance with another embodiment of the disclosed subject matter.

Figure 55:
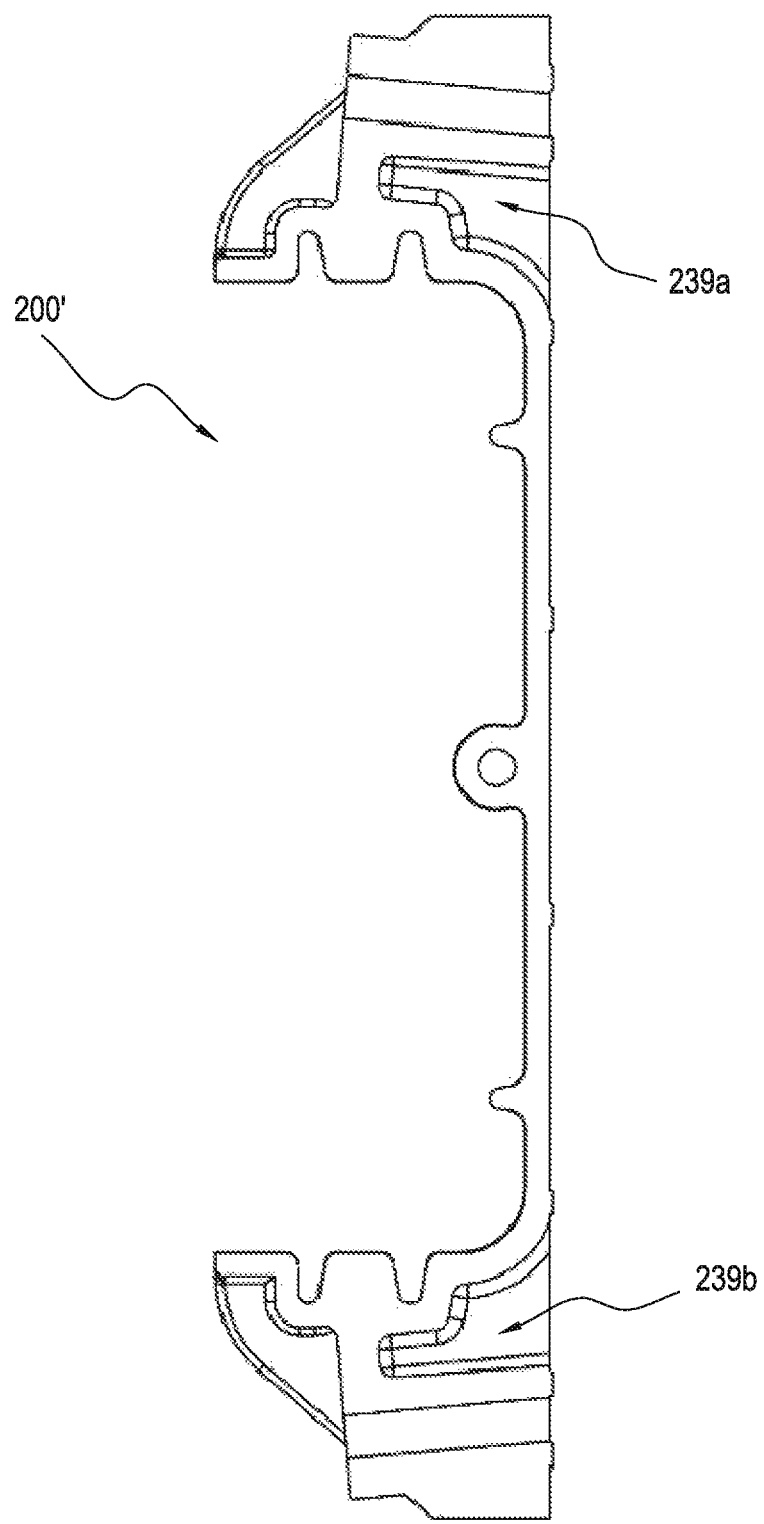
FIG. 55 is a cross sectional view along line 55-55 of the electrical box of FIG. 46, in accordance with another embodiment of the disclosed subject matter.

FIG. 55 is a cross sectional view along line 55-55 of the electrical box 100 of FIG. 46, in accordance with another embodiment of the disclosed subject matter. In FIG. 55, cross sections of the top enclosed opening 239a and the bottom enclosed opening 239b are shown.

Figure 56:
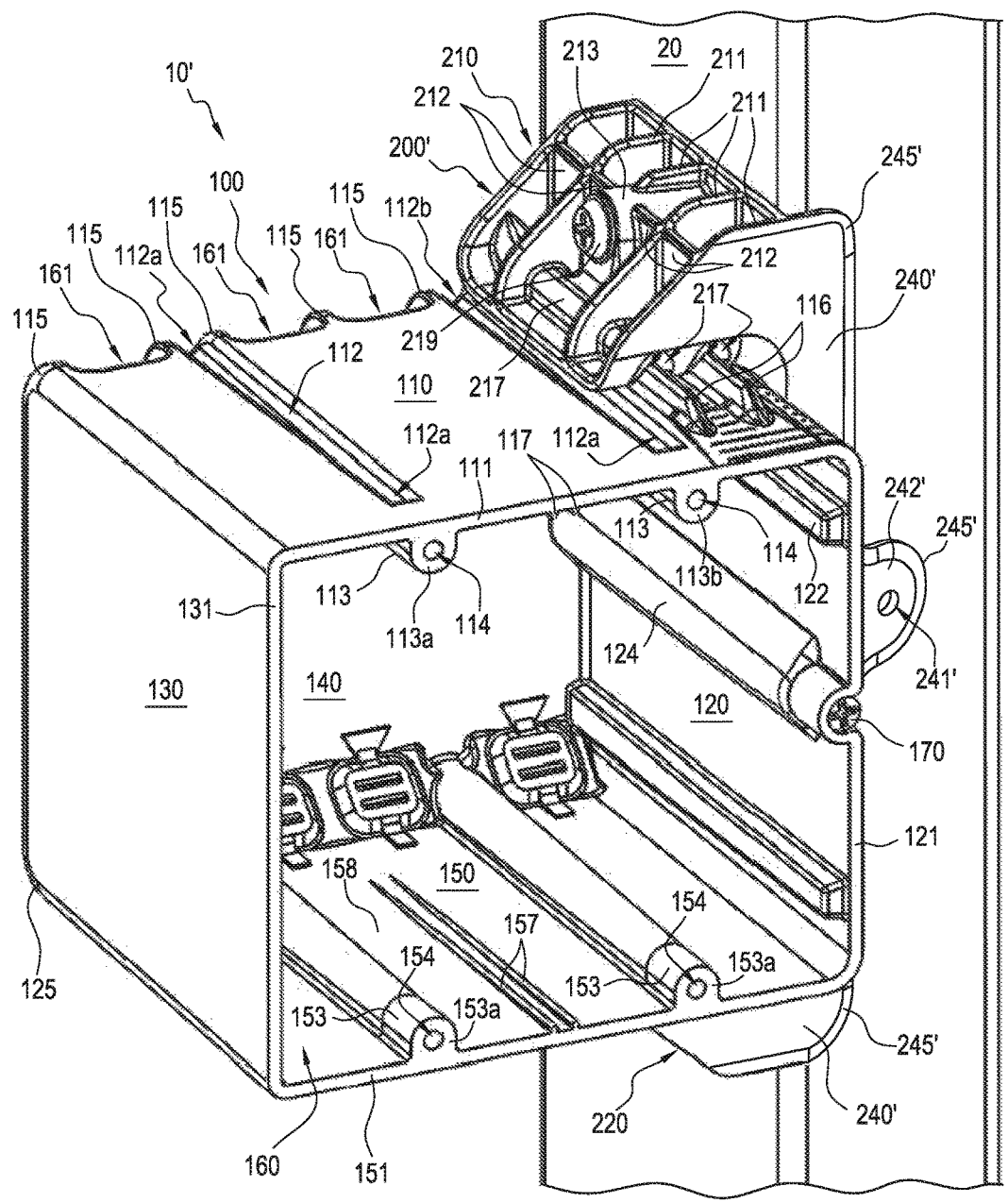
FIG. 56 is a top, front left perspective view of an electrical box and bracket apparatus shown attached to a support member, in accordance with another embodiment of the disclosed subject matter.

FIG. 56 is a top, front left perspective view of an electrical box and bracket apparatus shown attached to a support member, in accordance with another embodiment of the disclosed subject matter. In FIG. 56, the electrical box and bracket apparatus 10 includes the electrical box 100 connected to a substantially "U"-shaped bracket 200' that is shown fastened to the left side of the support member 20, for example, a wood or metal wall stud 20. To attach the assembly 10 to the right side of the support member 20, the entire assembly is simply flipped over so the top wall becomes the bottom wall and the bottom wall becomes the top wall and the flange remains on the wall board side of the support member 20. The electrical box 100 includes the top wall 110 connected along a first edge to the top edge of the first sidewall 120 and along a second edge to a top edge of a second sidewall 130. The top wall 110 connects along a back edge via the rounded top corner 115 to a top edge of the back wall 140 and the flat front edge 111 of the top wall 110 defines the first side of an opening 160 into the electrical box 100. The first sidewall 120 is further connected along a back edge to a first side edge of the back wall 140 and along a bottom edge to the first side edge of the bottom wall 150 and the flat front edge 121 of the first sidewall 120 defines a second side of the opening 160 into the electrical box 100. The bottom wall 150 connects along a second side edge to a bottom edge of the second sidewall 130 and connects along a back edge via the rounded top corner 125 to the bottom edge of the back wall 140 and the flat front edge 151 of the bottom wall 150 defines a third part of the opening 160 into the electrical box 100. The second sidewall 130 connects along a back edge to a second side edge of the back wall 140 and the flat front edge 131 of the second sidewall 130 defines the last side of the opening 160 into the electrical box 100.

In FIG. 56, the pair of substantially parallel grooves 112 are formed in the top wall 110 and protrude into the inside of the electrical box 100 and the grooves 112 extend from the front end 112a that is adjacent the top wall flat front edge 111 to the back end 112b that opens out through the curved corner edge between the top wall 110 and the back wall 140. Each protrusion 112c formed inside the electrical box 100 by the groove 112 extends from the solid front end portion 113 with the flat front face 113a that is contiguous with the top wall front face 111 back toward the back wall and connects with the inside of the rounded top corner 115 between the back of the top wall 110 and the top of the back wall 140. The channel 114 is formed in and through each protrusion solid front end portion 113 and into the grooves 112a, 112b and the channel 114 is configured and adapted to receive and engage fasteners from plugs, switches and the like. Each of the substantially parallel grooves 112 taper from the narrower front end 112a to the wider open back end 112b at the rounded top corner 115. The pair of raised ribs or rails 116 are formed on the top wall 110 between the first edge of the top wall 110 and the groove 112 on that side of the top wall 110. The front ends of the pair of raised ribs or rails 116 start at about the front end 112a of the groove 112 and extend backward toward and end before the back edge of the top wall, although not clearly seen in FIG. 1 due to the position of the bracket 200'. Additional details on the pair of raised ribs or rails 116 are provided above beginning with the description of FIG. 9.

Figure 58:
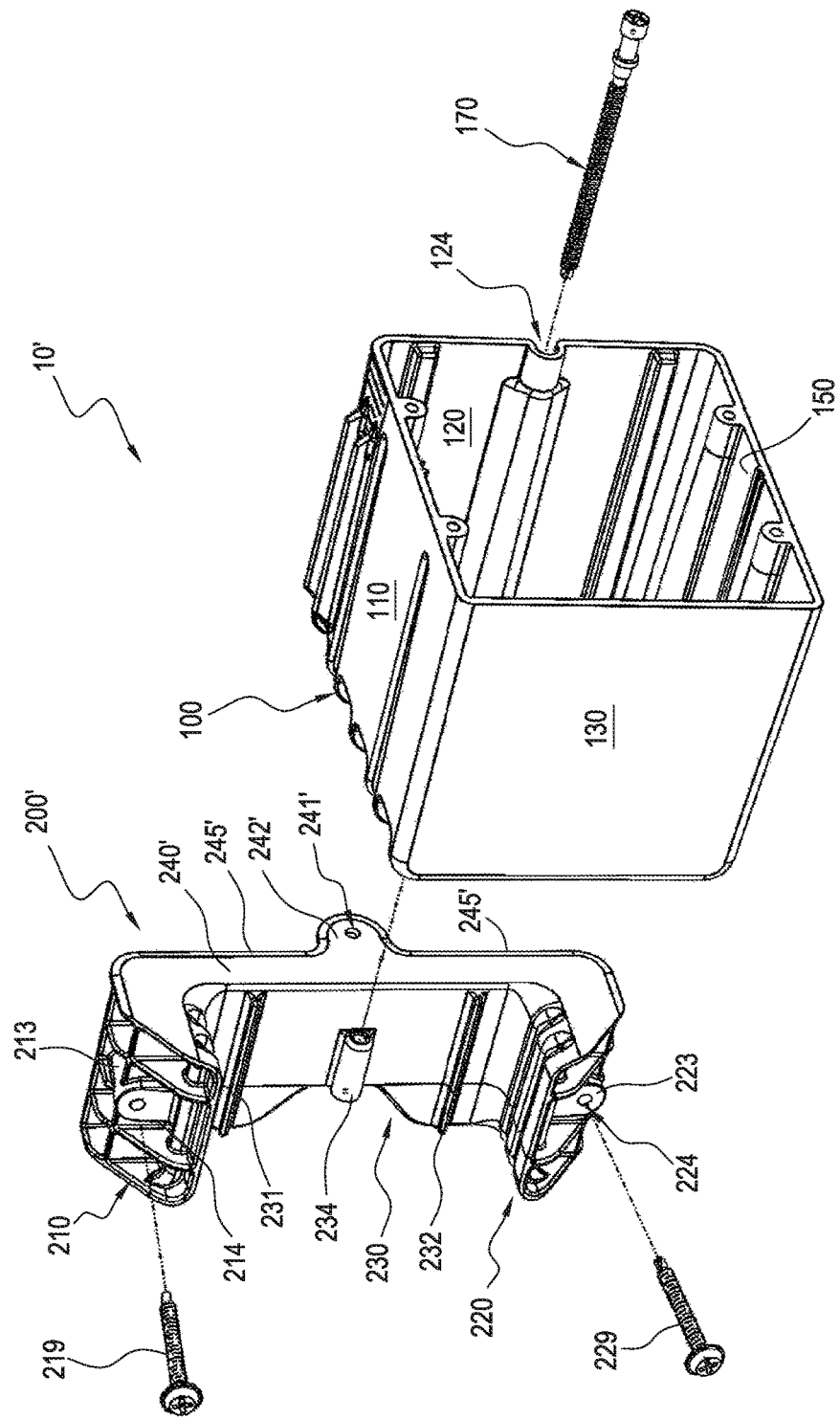
FIG. 58 is an exploded top, left perspective view of the electrical box and bracket apparatus shown adjacent to a support member of FIG. 56, in accordance with an embodiment of the disclosed subject matter.

In FIGS. 56 and 58, multiple, evenly spaced, shallow grooves or depth marks 119 are formed in the top wall 110 adjacent the front end of and substantially perpendicular to the pair of raised ribs or rails 116. Each depth mark 119 extends from the inside one of the pair of raised ribs or rails 116 and extends to and around the edge between the top wall 110 and the first sidewall 120 and extends down the entire length of the first sidewall 120 to and around the edge between the first sidewall 120 and the bottom wall 150 adjacent to the front end of and substantially perpendicular to the bottom pair of raised ribs or rails formed on the bottom wall 150 (best shown in FIG. 13). In the embodiment in FIG. 56, the depth marks 119 are spaced at about ⅛ inches apart and permit adjustment of the electrical box from about ⅛ inches up to about 1¾ inches. The pair of raised ribs or rails on the bottom wall are formed as mirror images of the pair of raised ribs or rails 116 on the top wall.

Figure 57:
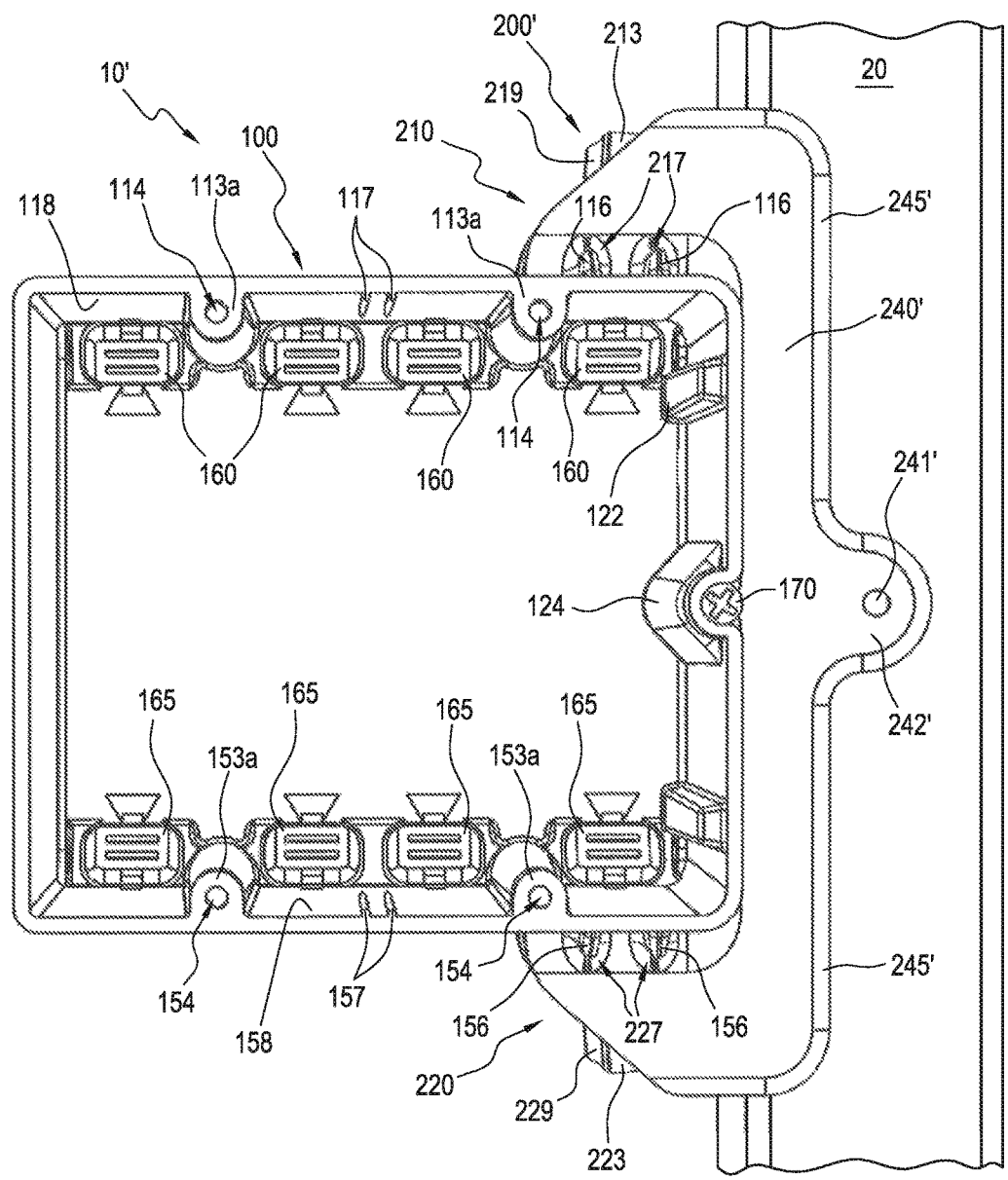
FIG. 57 is a front view of the electrical box and bracket apparatus shown attached to a support member of FIG. 56, in accordance with an embodiment of the disclosed subject matter.

In FIGS. 56, 57 and 58, the opposite pair of raised ribs 117, 157 extend from the inside surface 118 (best seen in FIG. 57) of the top wall 110 and the inside surface 158 of the bottom wall 157, respectively, and are configured and adapted to cooperatively receive and hold an optional, removable divider wall (not shown). Four top knockout openings 161 are formed in the rounded top corner 115, although only three are visible in FIG. 1, because the fourth is obscured by the bracket 200'. Four removable top knockout tabs 160 (best seen in FIG. 2) are formed in the top knockout openings 161. Similarly, four bottom knockouts 165 and bottom knockout openings 166 are formed across the rounded bottom corner 125, although only three are visible in FIG. 1, because the fourth is obscured by the second sidewall 130.

In FIG. 56, in the first sidewall 120 the inside surfaces of the pair of substantially parallel grooves 122 are shown formed in the first sidewall 120 and extend backward from just adjacent the flat front edge 121 of the first sidewall 120 to and through the corner connection between the back wall 140 and the first sidewall 120. In between the pair of substantially parallel grooves 122 the central groove 124 is also formed in the first sidewall 120 and extends backward from the flat front edge 121 of the first sidewall 120 to and through the corner connection between the back wall 140 and the first sidewall 120. The central groove is configured and adapted to receive the adjustment screw 170 with the head of the screw 170 being shown positioned in the central groove 124 and adjacent the flat front edge 121 of the first sidewall 120.

In FIG. 56, the bracket 200' includes the top arm 210 connected at a substantially perpendicular angle to the body 230 that extends toward and connects to the bottom arm 220 at a substantially perpendicular angle to the body 230 so that the top arm 210 and the bottom arm 220 are substantially parallel to each other and the bracket 200' has a substantially "U"-shape. The top arm 210 includes the plurality of gussets 211 that extend and taper down from the top arm 210 and body 230 connections to the front end of top arm 210. In the various embodiments, the gussets 211 can have a thickness of between about 70/1000 to about 86/1000 inches. The top positioning portion 213 is located in the center of the first arm 210 and between pairs of the gussets 211. The plurality of cross gussets 212 connect at substantially perpendicular angles to and between the gussets 211 and the top positioning portion 213 to provide additional stability and support. The large flange head fastener 219, for example, but not limited to, a pan head screw, is positioned through the positioning portion 213 and into the support member 20 to hold the assembly 10 in position and reduce stress on the positioning portion 213. Although not seen, the second large flange head fastener 219 is positioned through a substantially identical positioning portion on the lower arm 220 and into the support member 20 to hold the assembly 10 in position at the bottom. The flange side openings of the pair of grooves 217 are formed in and extend across the width of the inside surface of the top arm 210 to and out substantially identical back side openings of the pair of grooves 217 (not shown) and are configured and adapted to slidingly engage the pair of raised ribs or rails 116 on the top wall 110.

In FIG. 56, the bracket 200' includes a flange portion 240' on the side of the bracket adjacent to the front opening 160 of the electrical box and extending substantially perpendicularly away from a back side of the body portion 230 of the bracket, which forms a substantially right angle inside corner to be positioned against the substantially right angle outside corner of the support member 20. The flange 240' has a minimal thickness and the slightly inwardly tapering outer edge 245' and includes the single fastener opening 241' formed through it to permit the bracket 200', either with or without the electrical box 100 being attached to it, to be initially positioned against the support member 20 using one or more fasteners. The tapering outer edge 245' helps form a more even or smooth positioning of the wallboard when it is placed over the flange 240'. For example, but not limited to, in the embodiment in FIG. 1, the flange 240' can have a thickness of about 78/1000 inches. Although the fastener opening 241' is not counter-sunk to enable a fastener head to recess to about the same level as a front of the flange to minimize the thickness offset behind the wallboard, for example, but not limited to, drywall.

FIG. 57 is a front view of the electrical box and bracket apparatus 10' shown attached to a support member of FIG. 56, in accordance with an embodiment of the disclosed subject matter. In FIG. 56, the four top knockout tabs 160 and the top knockout openings 161 and the four bottom knockout tabs 165 and the bottom knockout openings 166 are shown and include substantially rounded corners with approximately 0.15 inch radii. Ends of the bottom raised ribs or rails 156 on the bottom wall 150 are seen positioned inside a bottom pair of grooves 227 formed in and extending across the width of an inside surface of the bottom arm 220 to and out substantially identical back side openings of the pair of grooves 227 (not shown) and are configured and adapted to slidingly engage the bottom pair of raised ribs or rails 156.

FIG. 58 is an exploded top, left perspective view of the electrical box and bracket apparatus 10' shown adjacent to the support member 20 of FIG. 56, in accordance with an embodiment of the disclosed subject matter. In FIG. 56, the raised cylindrical portion 234 extends from a back edge of and across the inside surface of the body portion 230 to about a middle of the body portion 230. A top channel 214 is formed in and extends through top positioning portion 213 and a bottom channel 224 is formed in and extends through top positioning portion 223.

In an embodiment of the disclosed subject matter, an apparatus includes: an electrical box being substantially rectangular and enclosed on five of six sides by contiguous wall portions and open on one of the six sides, the electrical box including a plurality of ribs formed on at least one of the five wall portions and a plurality of channels formed on at least one of the five wall portions; and a bracket having a substantially "U"-shape and including a body and top and bottom arms extending away from an inside of the body, a plurality of channels and ribs on interior surfaces of the bracket body and top and bottom arms, the plurality of the bracket channels and ribs being configured to slidingly connect with the electrical box plurality of ribs and plurality of channels and enable adjustment of the position of the electrical box relative to the bracket, and a flange extending substantially perpendicularly away from one side of a back side of the bracket, the flange including at least one opening formed there through.

In an embodiment of the disclosed subject matter, an apparatus includes: an electrical box including a top wall connected at a right end to a top end of a right side wall and connected at a left end to a top end of a left side wall, the right and left side walls depending away from the top wall toward and connecting at their bottom ends to a right end of a bottom wall and a left end of the bottom wall, respectively, with a back wall extending between and being connected to back ends of the top, right side, left side and bottom walls to enclose a back of the electrical box and front edges of the top, right side, left side and bottom walls defining a front opening into an inside of the electrical box, the top wall including a top pair of substantially parallel raised ribs located adjacent to one of the left side wall or the right side wall and extending from areas adjacent the top wall front edge backward toward and terminating adjacent to the back end of the top wall, the bottom wall including a bottom pair of substantially parallel raised ribs located opposite to the top pair of substantially parallel raised ribs and adjacent to the one left or right side wall and extending from areas adjacent the bottom wall front edge backward toward and terminating adjacent to the back end of the bottom wall, and a middle groove formed in the one left or right side wall and extending from the front wall to the back wall of the one left or right side wall; and a bracket including a top arm portion connected at an inner end to a top end of a body portion at a substantially orthogonal angle and a bottom end of the body being connected to an inner end of a bottom arm at a substantially orthogonal angle, the top arm and the bottom arm each including pairs of oppositely positioned grooves on inside surfaces of each arm and being configured to adjustably and slidingly connect with the pairs of substantially parallel raised ribs on the electrical box, and a raised, cylindrical element on an inner surface of the body portion being configured to adjustably engage with the middle groove of the electrical box.

In an embodiment of the disclosed subject matter, a method of assembling an electrical box and a bracket includes: positioning a flange side of a "U"-shaped bracket adjacent a corner edge between a back wall and a first side wall of an electrical box; sliding the bracket forward and engaging a plurality of channels formed in an inside surface of a top arm of the bracket with a plurality of ribs on an outside surface of a top wall of the electrical box, engaging a plurality of channels formed in an inside surface of a bottom arm of the bracket with a plurality of ribs on an outside surface of a bottom wall of the electrical box, engaging top and bottom grooves formed in an outside surface of the first side wall of the electrical box with top and bottom ribs formed on an inside surface of a body portion of the bracket, and engaging a central groove formed in the outside surface and between the top and bottom grooves of the first side wall of the electrical box with a raised cylindrical portion formed on the inside surface of the bracket; and inserting a screw end of an adjustment screw that is positioned in the central groove of the first side wall into a channel formed in and extending through the raised cylindrical portion.

Although the electrical box in the embodiments of the disclosed subject matter shown and described herein is depicted as a two-gang electrical box, the bracket can also be used with single-gang as well as triple- and above-gang boxes. In some of larger-gang embodiments, if needed, the top and bottom arms of the bracket can be lengthened to extend further across the top and bottom walls of the electrical box and can include additional channel pairs on the top and bottom bracket arms walls and that can engage with additional ribs formed in the top and bottom walls of the electrical box.

While the invention(s) has/have been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the invention(s) described herein.

What is claimed is:

1. An apparatus comprising:
    an electrical box being substantially rectangular and enclosed on five of six sides by contiguous wall portions and front edges of four of the contiguous wall portions define an opening, the electrical box including a first plurality of ribs formed on at least one of the five contiguous wall portions and a first, a second and a third plurality of grooves formed on a contiguous three of the five wall portions, respectively; and
    a bracket having a substantially "U"-shape and including a body, a top arm and a bottom arm extending away from an inside of the body, a plurality of bracket body ribs on an interior surface of the bracket body, a plurality of top arm grooves on an interior surface of the top arm and a plurality of bottom arm grooves on an interior surface of the bottom arm, each of the plurality of bracket body ribs being slidingly connected to the second plurality of grooves of the electrical box, the first plurality of ribs being slidingly connected to the top arm grooves to enable adjustment of the position of the electrical box relative to the bracket, and a flange extending substantially perpendicularly away from one side of a back surface of the bracket, the flange including at least one fastener opening formed there through.

2. The apparatus of claim 1, wherein the electrical box further comprises:
    a first plurality of knockouts formed between a junction of a back end of a bottom wall and a bottom end of a back wall, wherein the junction between the bottom and back walls is rounded; and
    a second plurality of knockouts formed between a junction of a back end of a top wall and a top end of a back wall, wherein the junction between the top and back walls is rounded.

3. The apparatus of claim 2, wherein the first plurality of ribs of the electrical box comprise:
    a substantially parallel top pair of ribs extending outwardly from a top surface of the top wall and extending from adjacent a front end to adjacent the back end of the top wall and adjacent a top end of a first side wall; and
    a second plurality of ribs comprising:
        a substantially parallel bottom pair of ribs extending outwardly from a bottom surface of the bottom wall and extending from adjacent a front end to adjacent the back end of the bottom wall and adjacent a bottom end of the first side wall;
        wherein a height of each of said ribs is about 3/16 inches.

4. The apparatus of claim 3, wherein the first plurality of ribs of the electrical box comprise:
    a first outer rib extending away from the top surface of the top wall at a substantially orthogonal angle and the first outer rib having opposing side walls angled at between approximately 91 to 120 degrees away from the top wall and inwardly toward opposing top edges of the first outer rib; and
    a first inner rib extending away from the top surface of the top wall at a substantially orthogonal angle and the first inner rib having an outer side wall angled at between approximately 91 to 120 degrees away from the top wall and inwardly toward an outer top edge of the first inner rib and an inner side wall angled at a substantially orthogonal angle from the top wall toward an inner top edge of the first inner rib.

5. The apparatus of claim 4, wherein the second plurality of ribs of the electrical box comprise:
    a second outer rib extending away from the bottom surface of the bottom wall at a substantially orthogonal angle and the second outer rib having opposing side walls angled at between approximately 91 to 120 degrees away from the bottom wall and inwardly toward opposing top edges of the second outer rib; and
    a second inner rib extending away from the bottom surface of the bottom wall at a substantially orthogonal angle and the second outer rib having an outer side wall angled at between approximately 91 to 120 degrees away from the bottom wall and inwardly toward an outer top edge of the second inner rib and an inner side wall angled at a substantially orthogonal angle from the bottom wall toward an inner top edge of the second inner rib.

6. The apparatus of claim 5, wherein the plurality of the top arm grooves and the plurality of bottom arm grooves of the bracket comprise:
    a substantially parallel top pair of grooves extending inwardly from and across a front end to a back end of an inner surface of the top arm; and
    a substantially parallel bottom pair of grooves extending inwardly from and across a front end to a back end of the bottom arm.

7. The apparatus of claim 6, wherein the plurality of top arm grooves of the bracket comprise:
  an inner groove extending into and laterally across an inner surface of the top arm at a substantially orthogonal angle from the inner surface of the top arm, the inner groove having a reciprocal shape to and configured to receive one of the outer ribs of the electrical box; and
  an outer groove extending into and laterally across the inner surface of the top arm at a less than orthogonal angle from the inner surface of the top arm, the outer groove having a reciprocal shape to and configured to receive the inner rib adjacent to the received one of the outer ribs of the electrical box.

8. The apparatus of claim 7, wherein the plurality of bottom arm grooves of the bracket comprise:
  an inner groove extending into and laterally across an inner surface of the bottom arm at a substantially orthogonal angle from the inner surface of the bottom arm; and
  an outer groove extending into and laterally across the inner surface of the bottom arm at a less than orthogonal angle from the inner surface of the bottom arm.

9. The apparatus of claim 8, wherein the first and second outer ribs and first and second inner grooves are reciprocally shaped and configured to slidingly engage each other.

10. The apparatus of claim 9, wherein the first and second inner ribs and first and second outer grooves are reciprocally shaped and configured to slidingly engage each other.

11. The apparatus of claim 10, wherein the second plurality of grooves of the electrical box further comprises a top groove and a substantially parallel bottom groove on the first side, each of the top and bottom grooves extending from a closed front end adjacent the front edge of the first wall to an open back end and configured to receive one of the plurality of bracket body ribs.

12. The apparatus of claim 11, wherein the plurality of bracket body ribs further comprise a top rib and a substantially parallel bottom rib on the interior surface of the bracket body with each of the top and bottom bracket body ribs extending laterally across the interior surface of the body portion and positioned to slidingly engage the top and bottom grooves of the first side wall of the electrical box.

13. The apparatus of claim 12, wherein each of the top and bottom grooves on the first side wall has a depth of at least about ⅛ inches and each of the plurality of bracket body ribs having a height of about ⅛ inches.

14. The apparatus of claim 12, wherein the electrical box further comprises an adjustment channel formed in the first side wall of the electrical box between the top and bottom grooves of the first side wall and extending from an adjustment connector opening front end of the adjustment channel formed in the front edge of the first wall to an open back end formed in a back edge of the first wall.

15. The apparatus of claim 14 further comprising an adjustment screw connected to the electrical box and the bracket to permit adjustment of the front to back positioning of the electrical box in relation to the bracket.

16. The apparatus of claim 15, wherein a head portion of the adjustment screw is rotatably connected to the adjustment connector opening front end of the adjustment channel in the electrical box and a threaded body portion of the adjustment screw is connected to an extended cylindrical portion of the bracket, the extended cylindrical portion includes an interior channel there through to receive the threaded body portion of the adjustment screw and to permit adjustment of the front to back positioning of the electrical box in relation to the bracket based on turning the screw either clockwise or counter-clockwise.

17. The apparatus of claim 1, wherein the bracket flange has a substantially straight outer edge with a substantially centrally located extended portion with the at least one fastener opening formed therein.

18. The apparatus of claim 2, wherein the knockouts have rounded corners.

19. The apparatus of claim 1, wherein the bracket flange has a substantially curved outer edge with a plurality of openings formed therein.

20. The apparatus of claim 1, wherein the bracket further comprises a top fastening portion and a bottom fastening portion, with each fastening portion including a central channel extending from a back of the fastening portion through and out a front wall of the fastening portion and configured to receive a fastener at an angle slightly less than a normal angle to a back wall of the bracket and away from the inside surface of each respective top and bottom arm of the bracket.

21. The apparatus of claim 20, wherein the angle is between about 0.1 to 10 degrees less than the normal angle to the back wall of the bracket.

22. The apparatus of claim 20, wherein the angle is between about 3 to 7 degrees less than the normal angle to the back wall of the bracket.

23. The apparatus of claim 20, wherein the angle is about 5 degrees less than the normal angle to the back wall of the bracket.

24. The apparatus of claim 20, wherein the fastener is a drill point screw with a flanged head.

25. The apparatus of claim 20, wherein the bracket further comprises a first top plurality of gussets on a first side of the top arm and substantially parallel to the top fastening portion and a second top plurality of gussets on an opposite side of the top arm and substantially parallel to the top fastening portion.

26. The apparatus of claim 25, wherein the bracket further comprises a first bottom plurality of gussets on a first side of the bottom arm and substantially parallel to the bottom fastening portion and a second bottom plurality of gussets on an opposite side of the bottom arm and substantially parallel to the bottom fastening portion.

27. The apparatus of claim 26, wherein the electrical box further comprises a plurality of cross gussets connected at perpendicular angles between the first and second plurality of gussets, an inner one of the first plurality of gussets and a side of the fastening portion, and an inner one of the second plurality of gussets and an opposite side of the fastening portion.

28. The apparatus of claim 1, wherein the bracket comprises a plastic.

29. The apparatus of claim 1, wherein the electrical box comprises:
  a plurality of depth marks extending at least from adjacent a top wall outer rib of the first plurality of ribs on to an edge of and around a top wall and on to and down a first side wall to a bottom edge of the first side wall and around and onto a bottom wall and extending to at least adjacent a bottom wall outer rib of a second plurality of ribs formed on a bottom wall opposite the first plurality of ribs of the electrical box.

30. An apparatus comprising:
  an electrical box including a top wall connected at a right end to a top end of a right side wall and connected at a left end to a top end of a left side wall, the right and left side walls depending away from the top wall toward and connecting at their bottom ends to a right end of a bottom wall and a left end of the bottom wall, respectively, with a back wall extending between and being connected to back ends of the top, right side, left side and bottom walls to enclose a back of the electrical box and front edges of the top, right side, left side and bottom walls defining a front opening into an inside of the electrical box, the top wall including a top pair of substantially parallel raised ribs located adjacent to one of the left side wall or the right side wall and extending from areas adjacent the top wall front edge backward toward and terminating adjacent to the back end of the top wall, the bottom wall including a bottom pair of substantially parallel raised ribs located opposite to the top pair of substantially parallel raised ribs and adjacent to the one left or right side wall and extending from areas adjacent the bottom wall front edge backward toward and terminating adjacent to the back end of the bottom wall, and a middle groove formed in the one left or right side wall and extending from the front edge of the left side of wall or the right side wall to the back edge wall of the one left or right side wall; and a bracket including a top arm connected at an inner end to a top end of a body portion at a substantially orthogonal angle and a bottom end of the body portion being connected to an inner end of a bottom arm at a substantially orthogonal angle, the top arm and the bottom arm each including pairs of oppositely positioned grooves on inside surfaces of each arm and being configured to adjustably and slidingly connect with the pairs of substantially parallel raised ribs on the electrical box, and a raised, cylindrical element on an inner surface of the body portion being configured to adjustably engage with the middle groove of the electrical box.

31. The apparatus of claim 30, wherein the bracket further comprises:
a first top plurality of gussets on a first side of the top arm and substantially parallel to a top fastening portion; and
a second top plurality of gussets on an opposite side of the top arm and substantially parallel to the top fastening portion.

32. The apparatus of claim 31, wherein the bracket further comprises:
a first bottom plurality of gussets on a first side of the bottom arm and substantially parallel to a bottom fastening portion; and
a second bottom plurality of gussets on an opposite side of the bottom arm and substantially parallel to the bottom fastening portion.

33. The apparatus of claim 32, wherein the bracket further comprises:
a bottom plurality of cross gussets on the bottom arm connected at perpendicular angles between the first and second bottom plurality of gussets, an inner one of the first bottom plurality of gussets, an inner one of the first bottom plurality of gussets and a side of the fastening portion, and an inner one of the second bottom plurality of gussets and an opposite side of the fastening portion.

34. The apparatus of claim 33, wherein the bracket further comprises:
a top plurality of cross gussets on the top arm connected at perpendicular angles between the first and second top plurality of gussets, an inner one of the first top plurality of gussets and the side of the fastening portion, and an inner one of the second top plurality of gussets and the opposite side of the fastening portion.

35. The apparatus of claim 34, wherein the bracket comprises:
a plurality of depth marks extending at least from adjacent a top wall outer rib of the top pair of substantially raised ribs on to an edge of and around a top wall and on to and down a left side wall to a bottom edge of the first side wall and around and onto the bottom wall and extending to at least adjacent a bottom wall outer rib of the bottom pair of substantially raised ribs of the electrical box.

36. A method of assembling an electrical box and a bracket, the method comprising:
positioning a flange on a side of a "U"-shaped bracket adjacent a corner edge of the electrical box between a back wall and a first side wall of an electrical box;
sliding the bracket forward and engaging a top plurality of grooves formed in an inside surface of a top arm of the bracket with a top plurality of ribs on an outside surface of a top wall of the electrical box, engaging a bottom plurality of grooves formed in an inside surface of a bottom arm of the bracket with a bottom plurality of ribs on an outside surface of a bottom wall of the electrical box, engaging a top groove and a bottom groove formed in an outside surface of the first side wall of the electrical box with a top rib and a bottom rib formed on an inside surface of a body portion of the bracket, and engaging a central groove formed in the outside surface and between the top and bottom grooves of the first side wall of the electrical box with a raised cylindrical portion formed on the inside surface of the bracket; and
inserting a screw end of an adjustment screw that is positioned in the central groove of the first side wall of the electrical box into a channel formed in and extending through the raised cylindrical portion of the bracket.

37. The method of assembling of claim 36 further comprising:
inserting bracket fasteners into a first channel formed through a first positioning portion on a top arm of the bracket and into a second channel formed through a second positioning portion on a bottom arm of the bracket.

38. A method of installing the electrical box and bracket assembly assembled according to the method of claim 37, the method of installing comprising:
positioning an outer side and the flange of the bracket of the electrical box and bracket assembly against a corner of a support member;
attaching the electrical box and bracket assembly to the support member by inserting at least one flange fastener through at least one opening formed through the flange and into the support member; and
fastening the assembly to the support member by screwing the bracket fasteners through the first and second channels in the first positioning portion on the top arm of the bracket and in the second positioning portion on the bottom arm of the bracket and into the support member.

39. The method of installing the electrical box and bracket assembly of claim 38 further comprising:
as necessary, adjusting the adjustment screw to position the electrical box relative to the bracket and support member.

* * * * *